Figure 19:
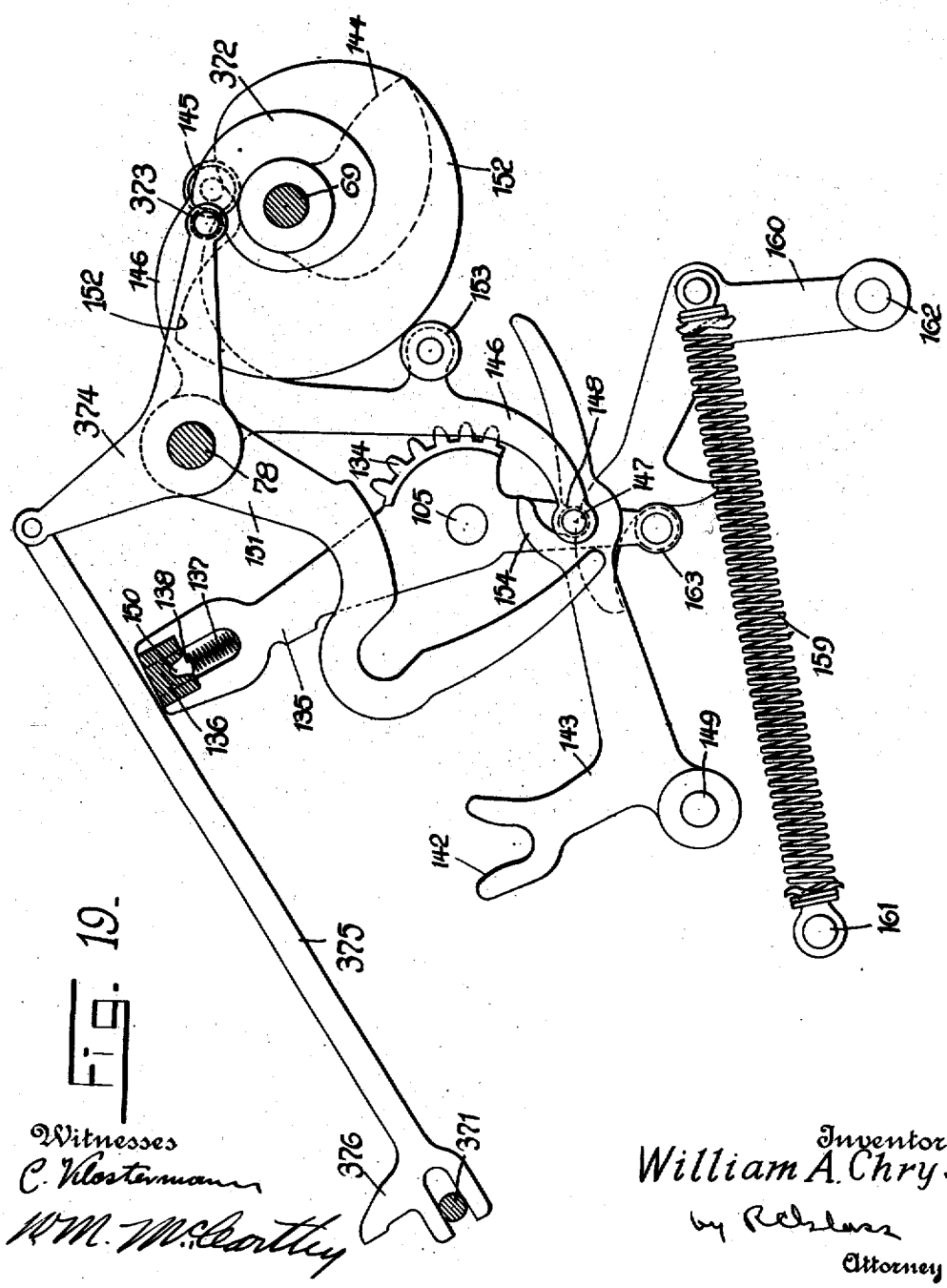

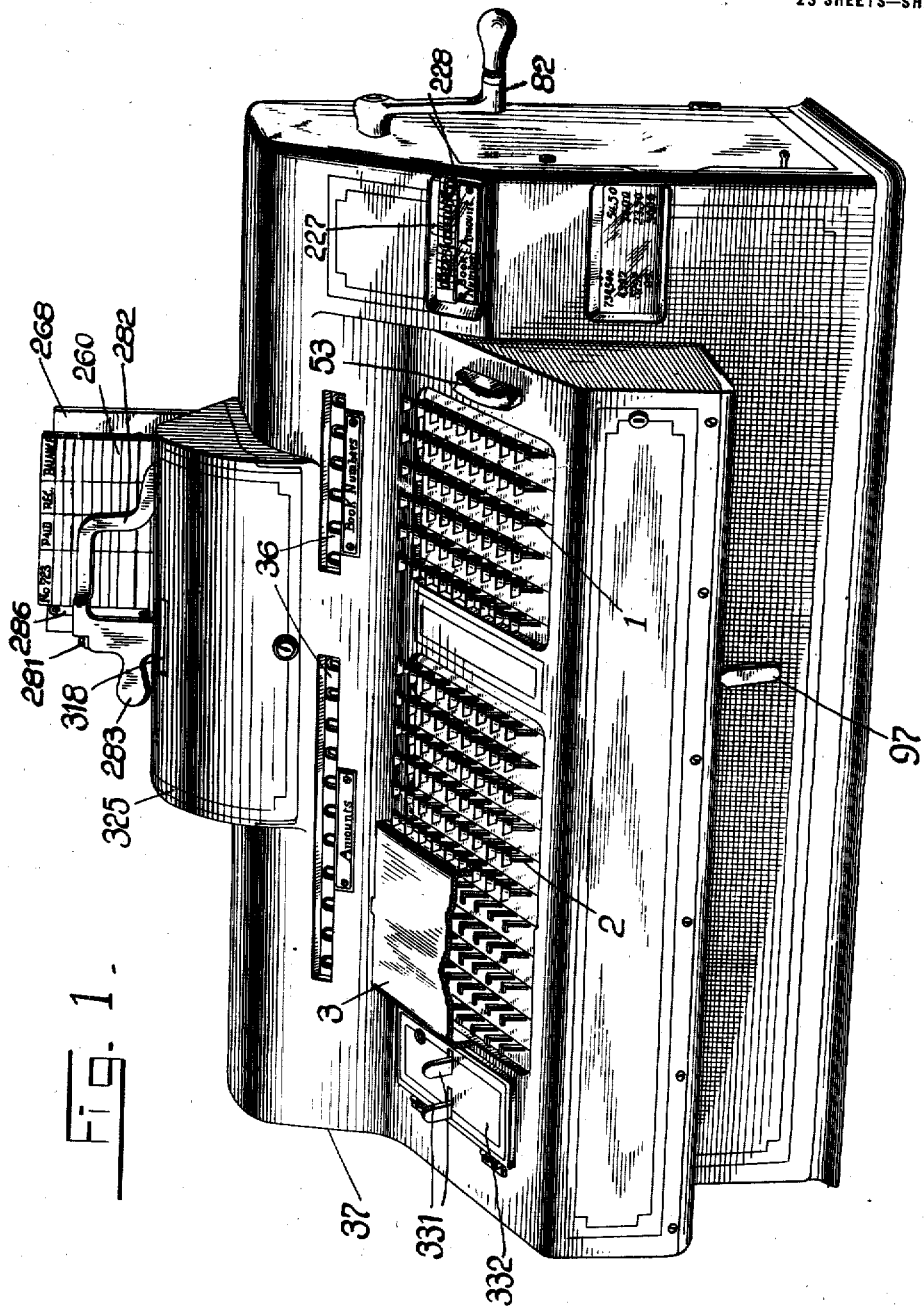

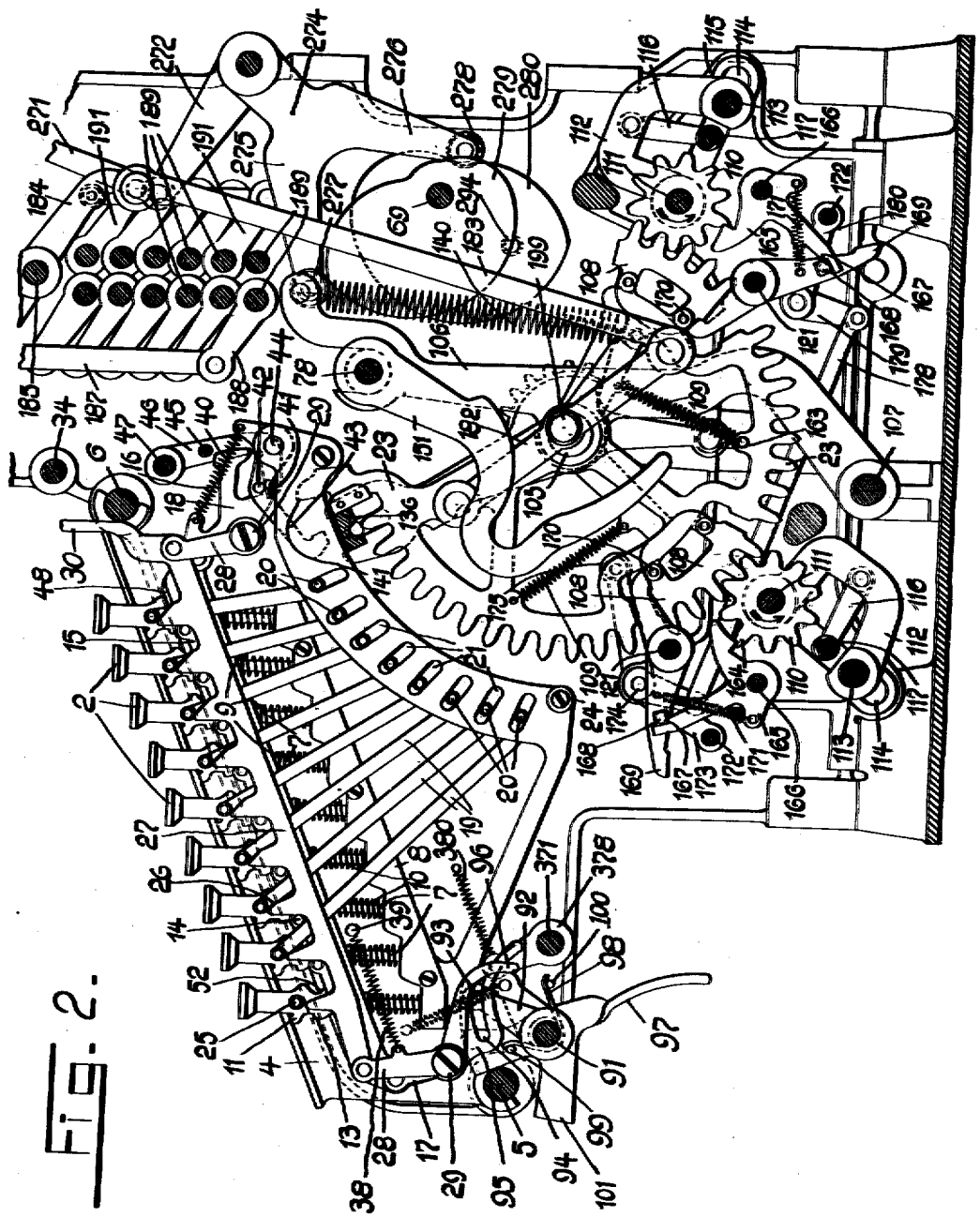

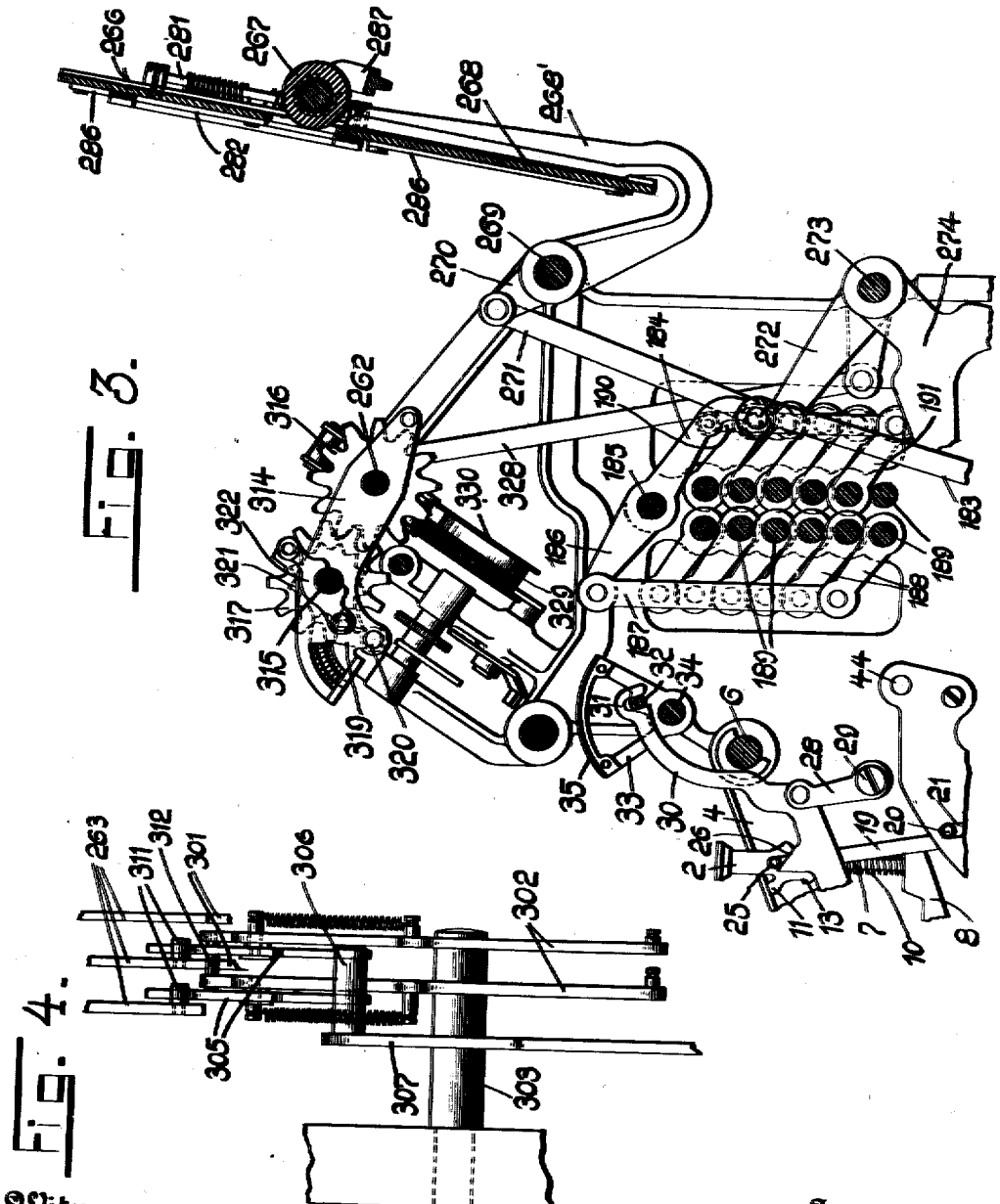

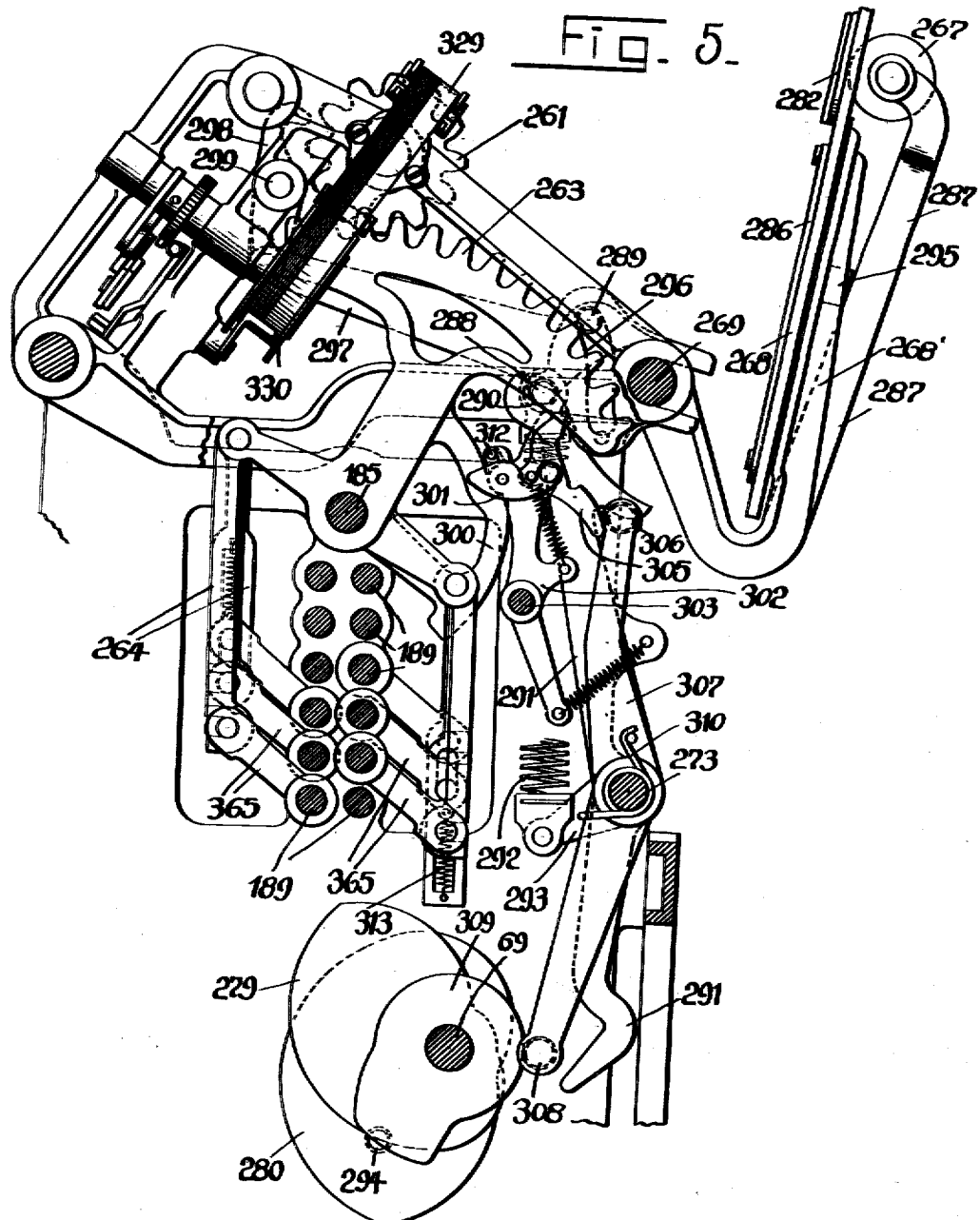

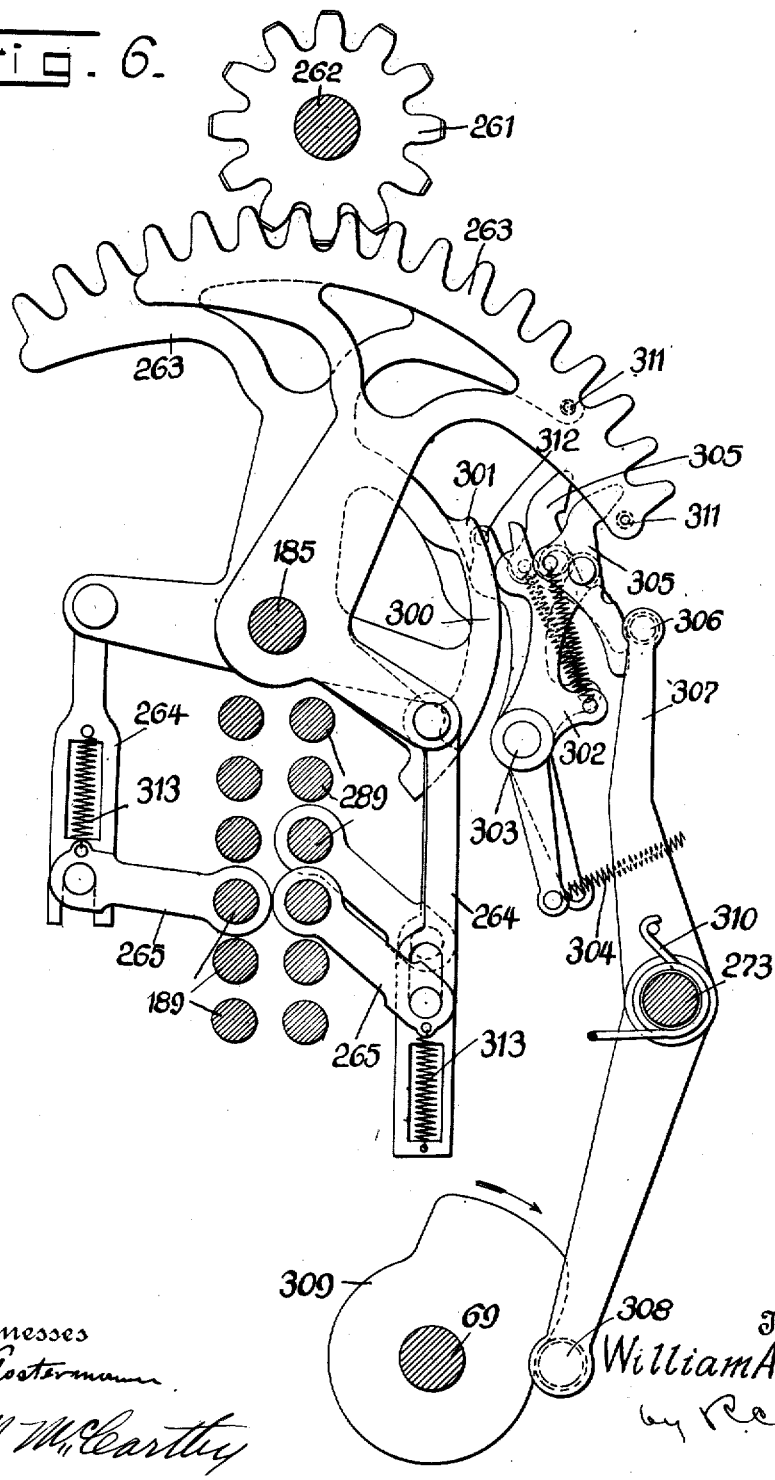

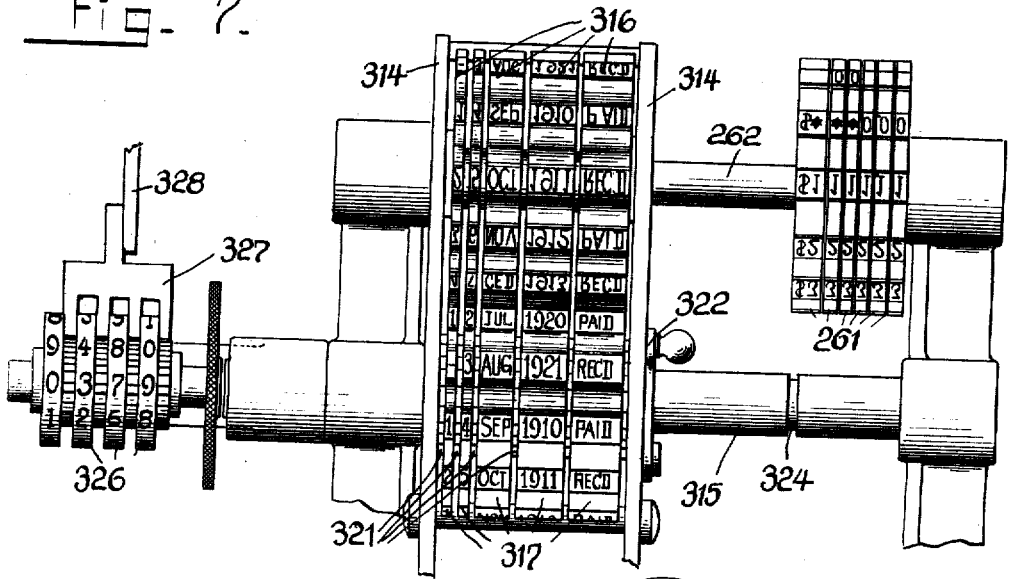

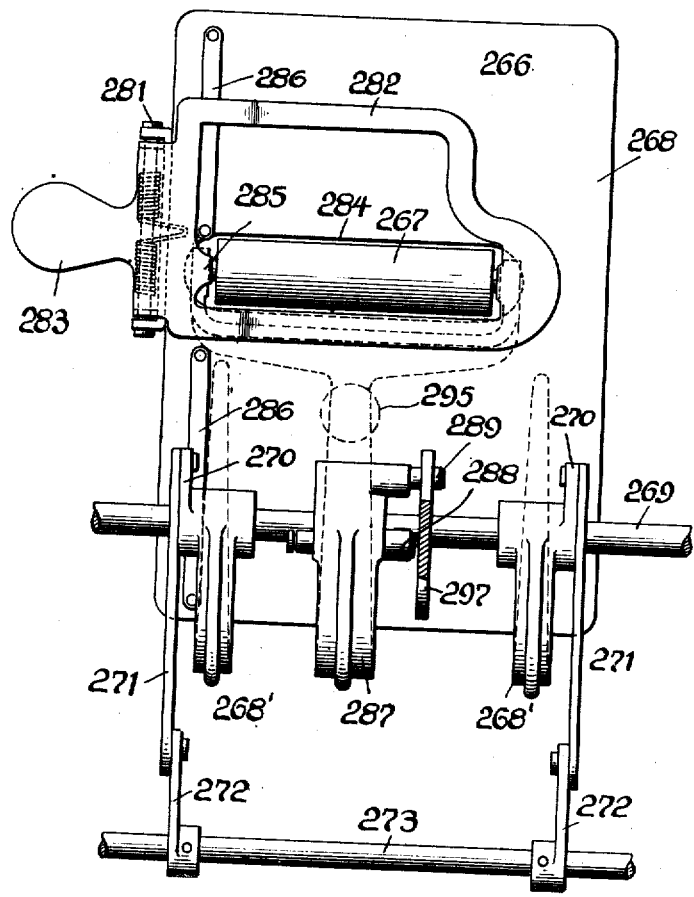

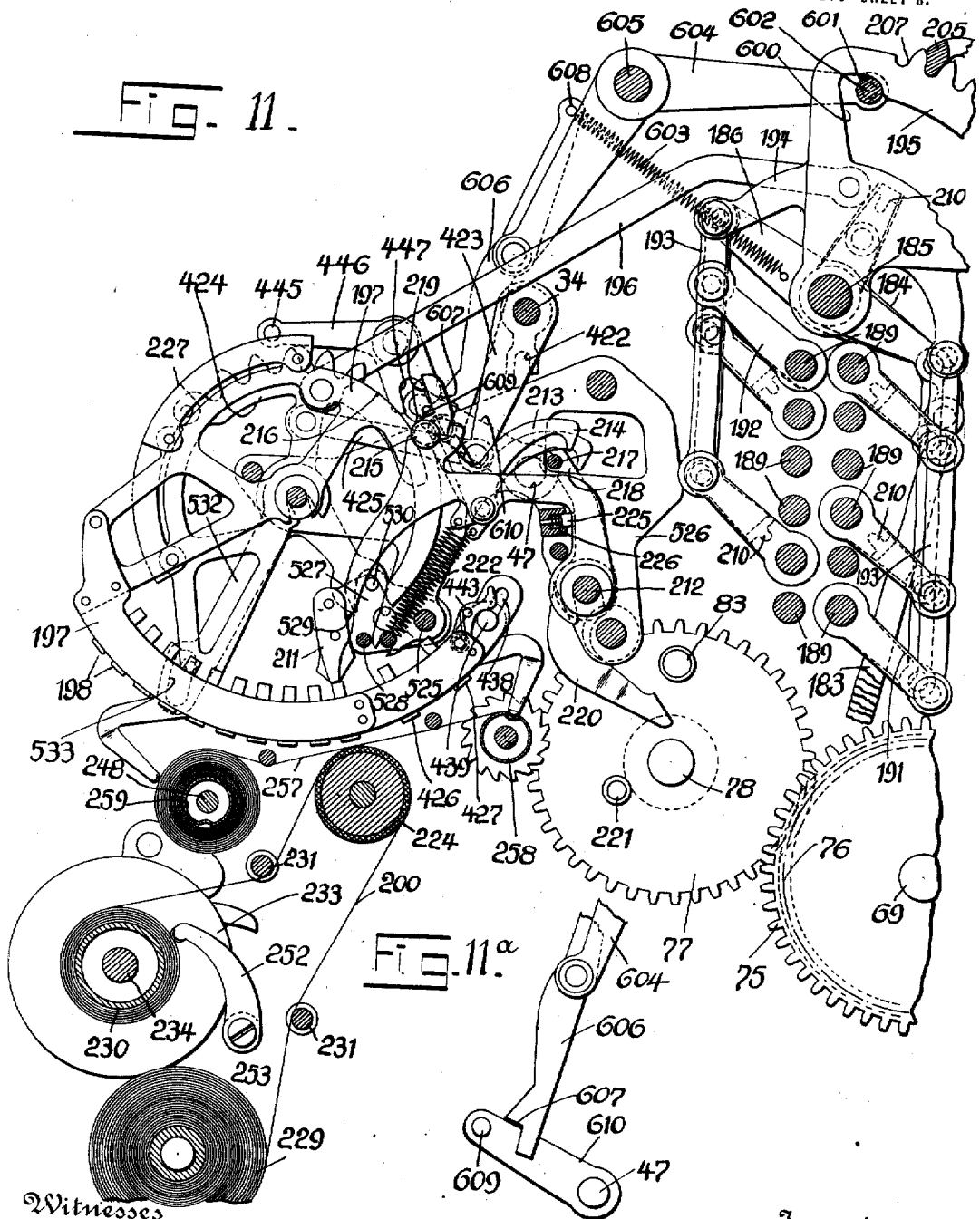

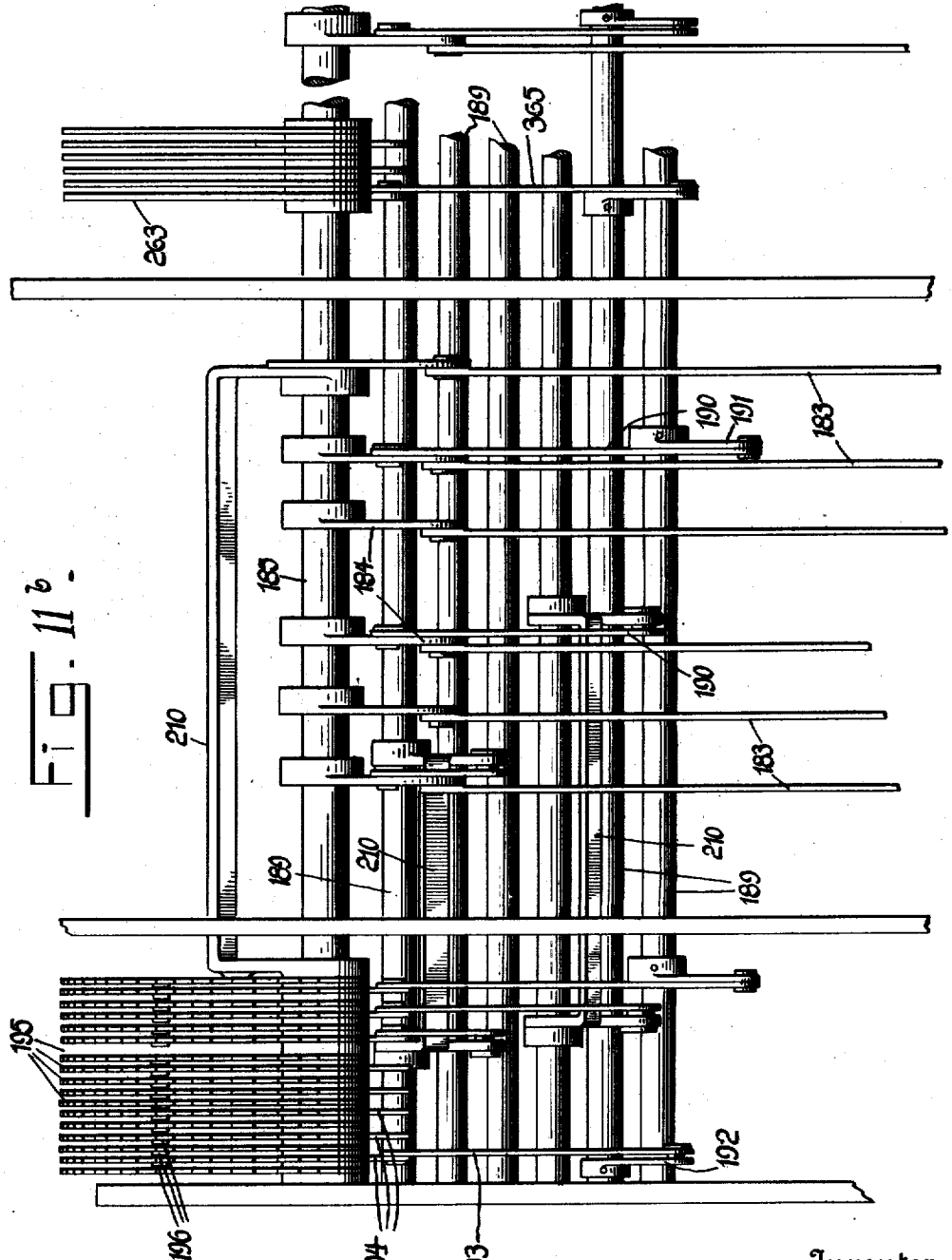

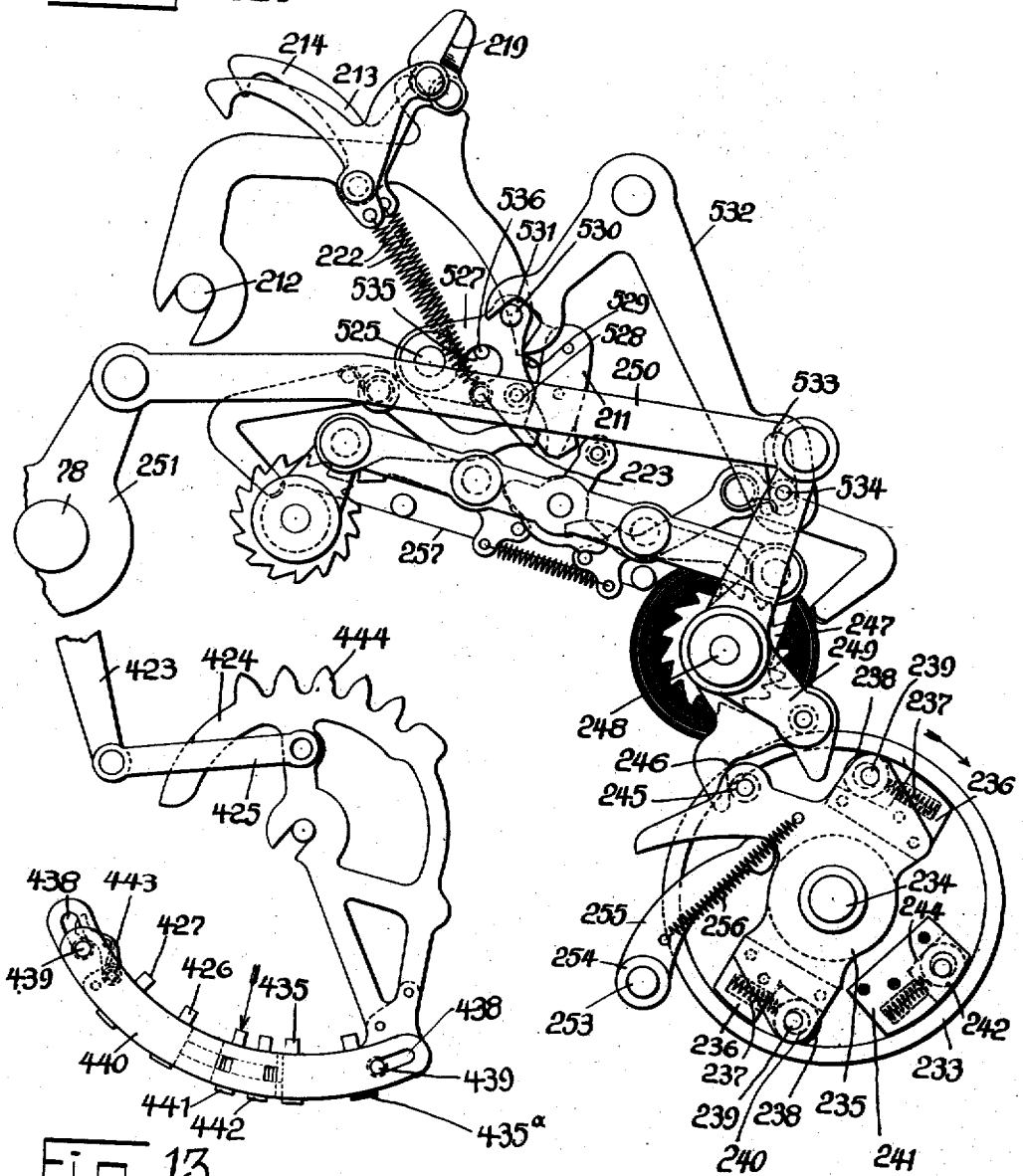

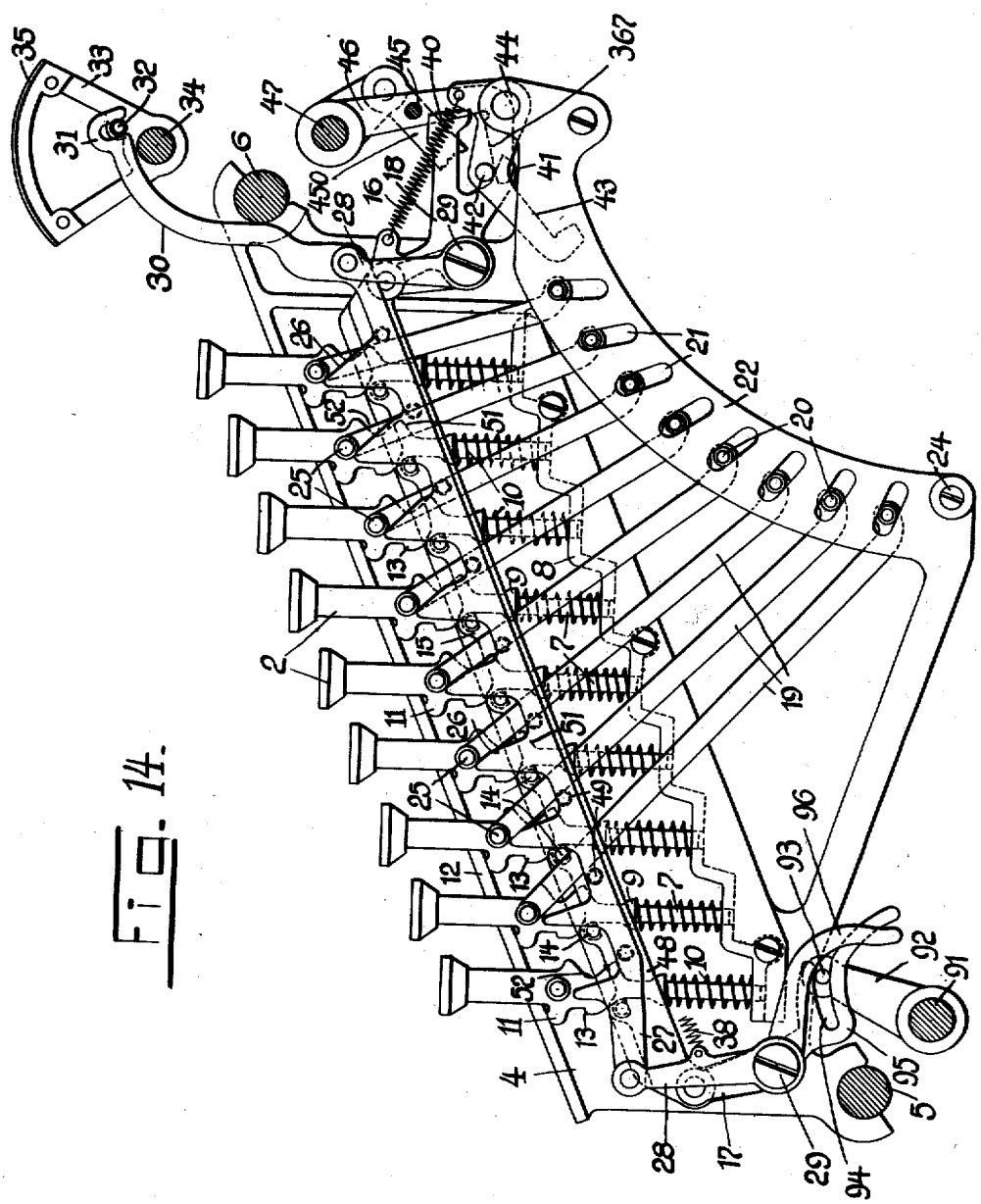

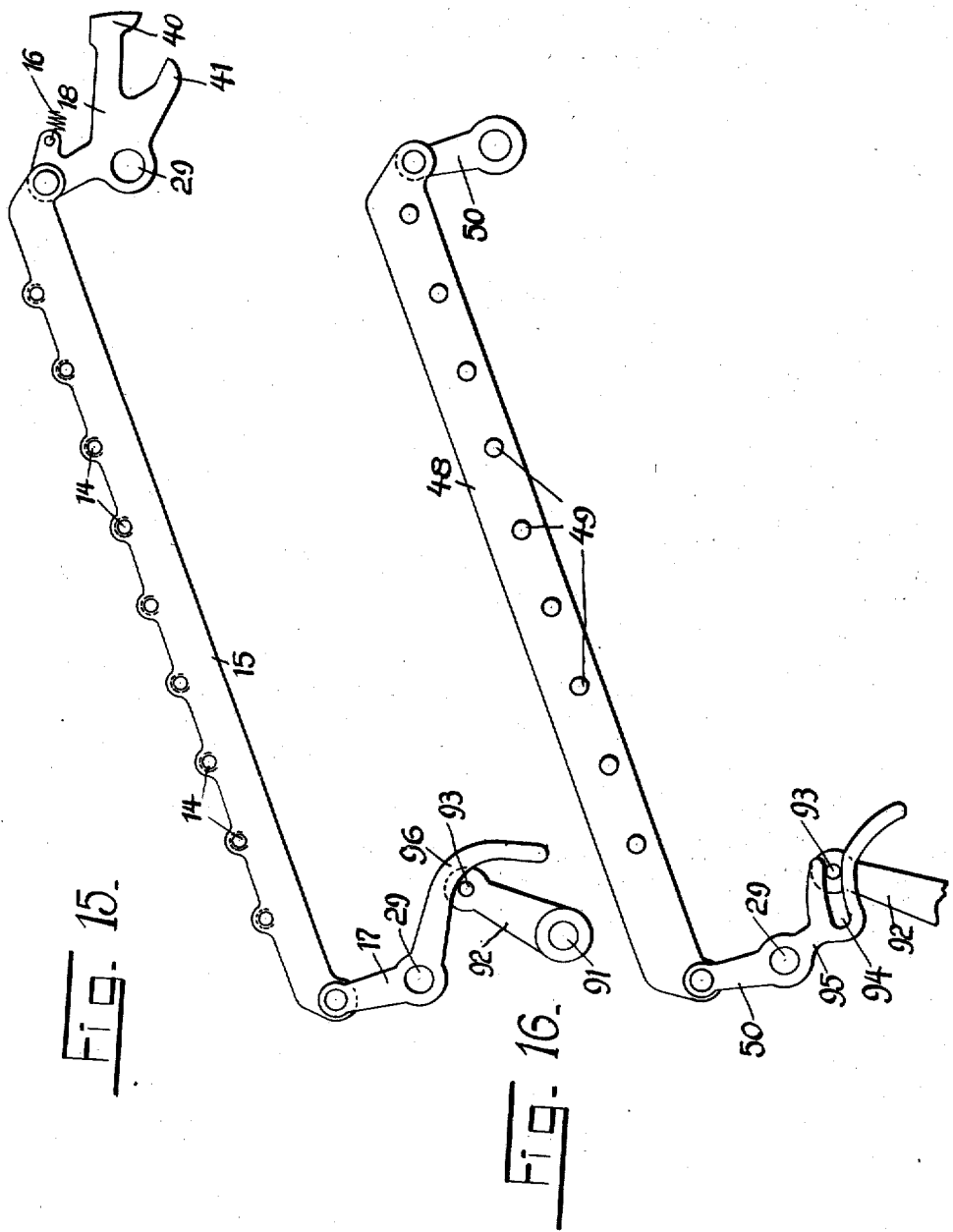

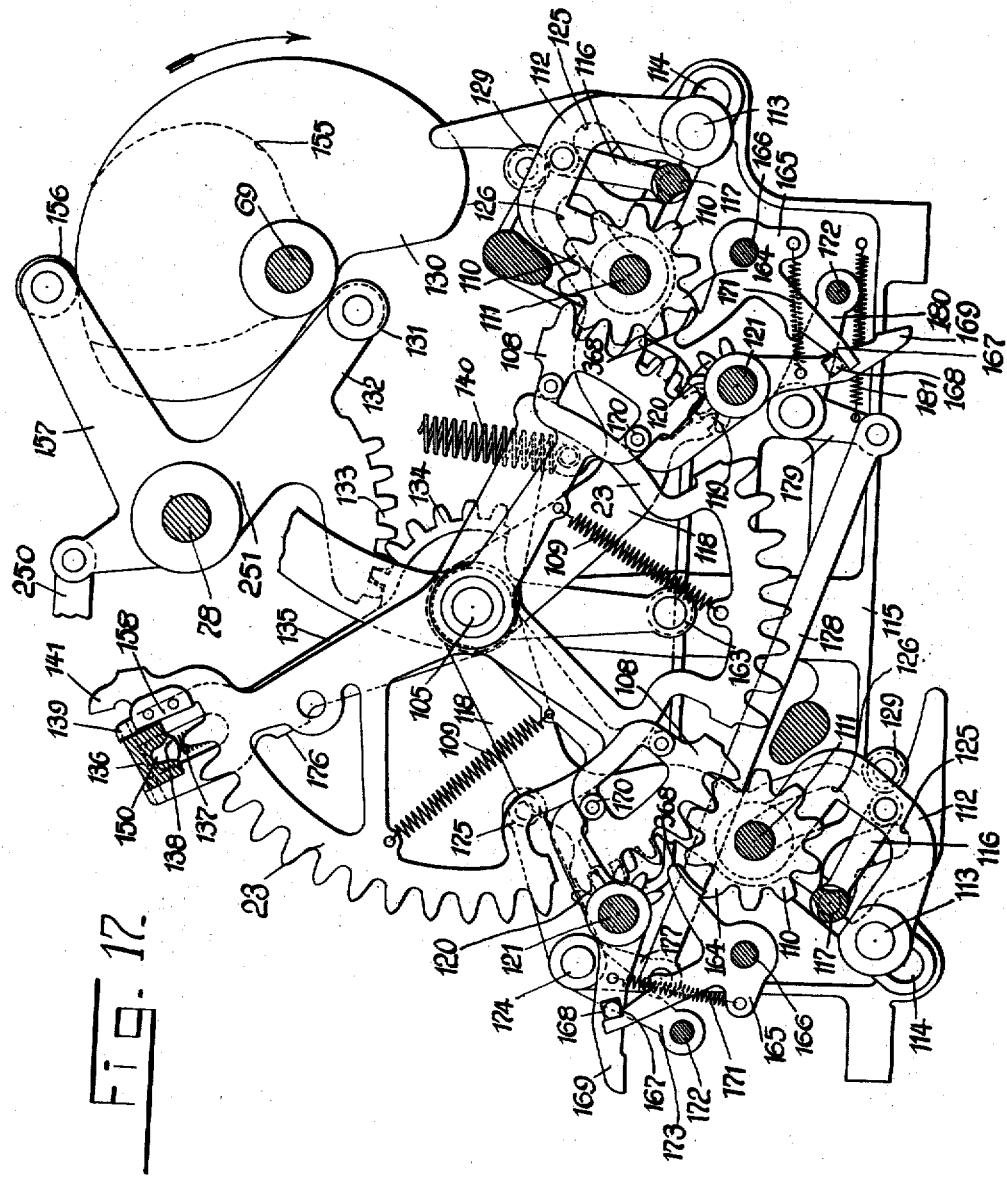

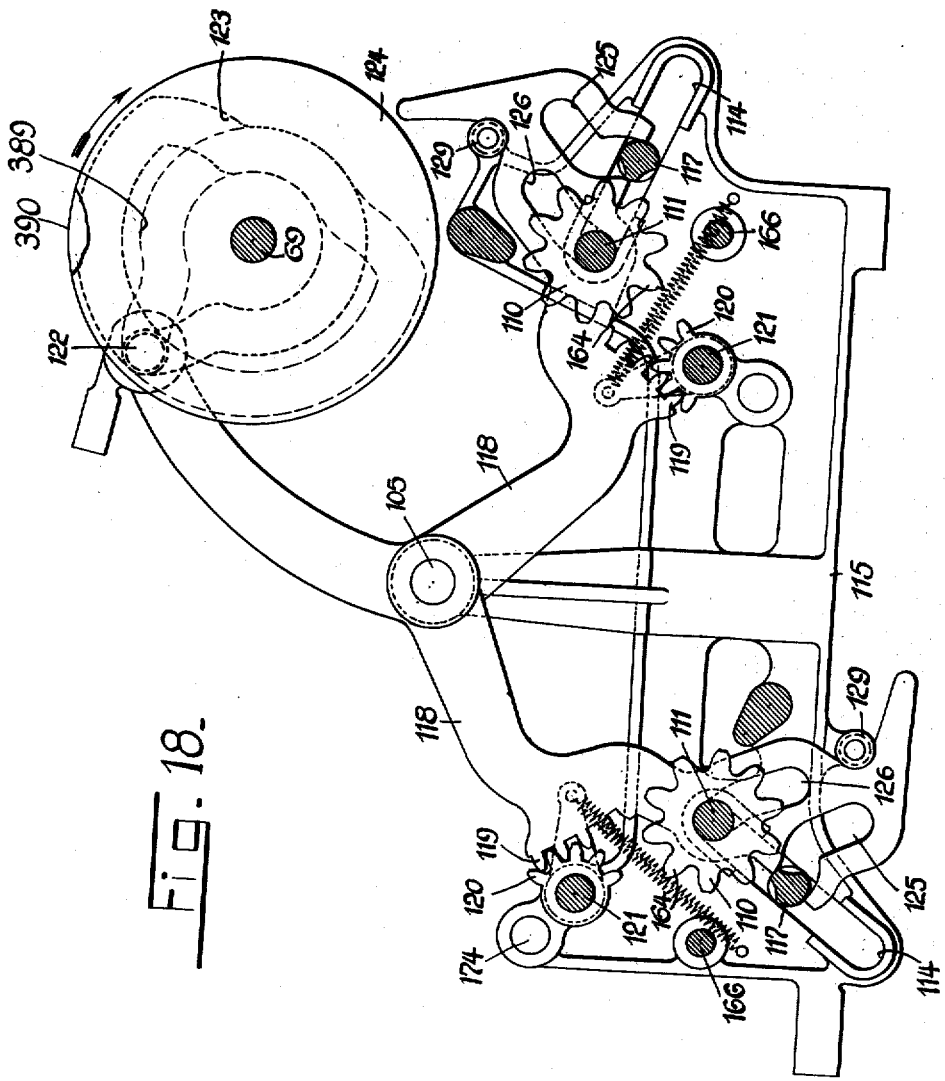

W. A. CHRYST.
CASH REGISTER.
APPLICATION FILED SEPT. 21, 1911.

1,198,418.

Patented Sept. 19, 1916.
23 SHEETS—SHEET 15.

Witnesses
C. Klostermann
WM. McCarthy

Inventor
William A. Chryst
by Rehlass
Attorney

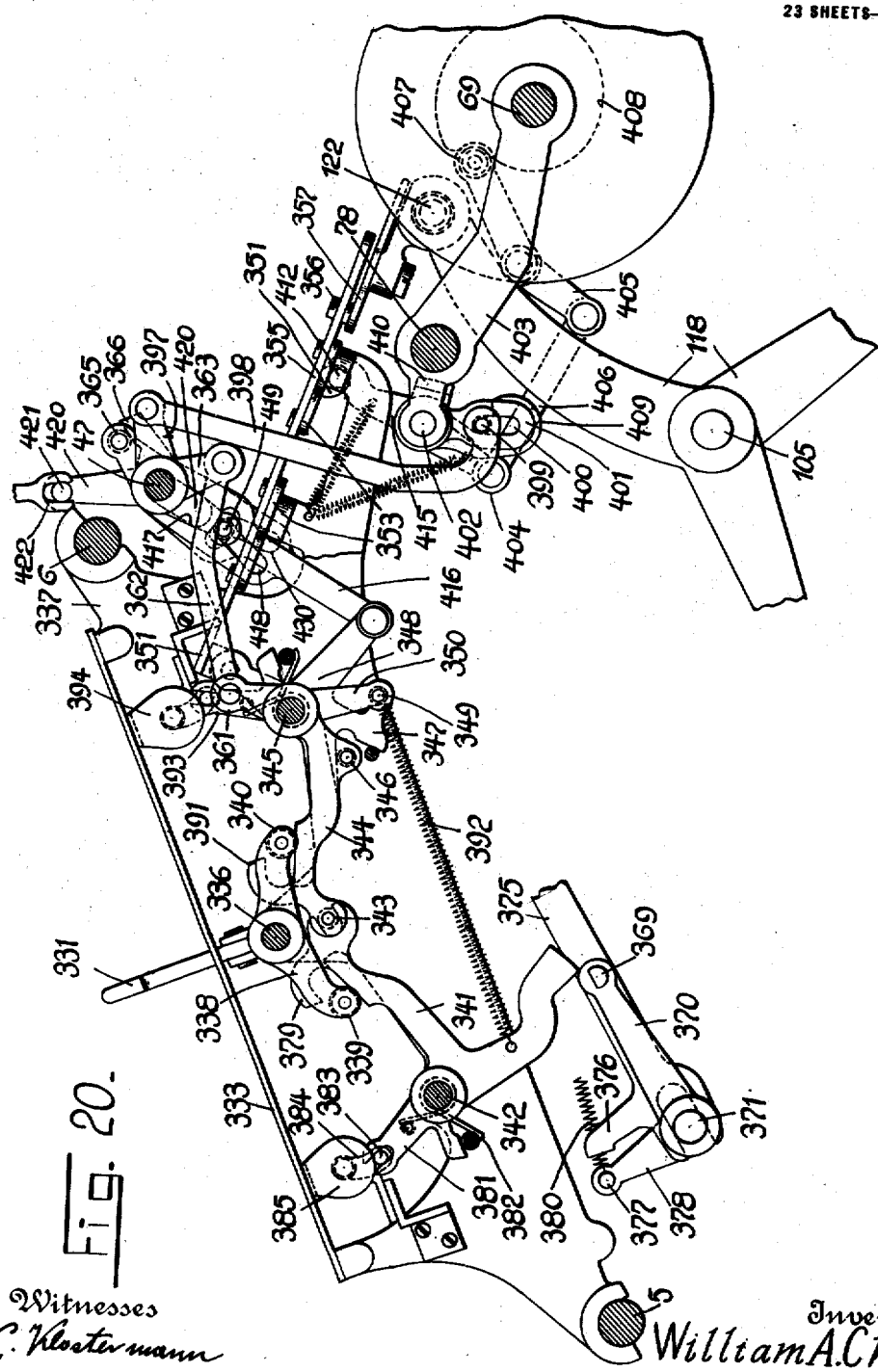

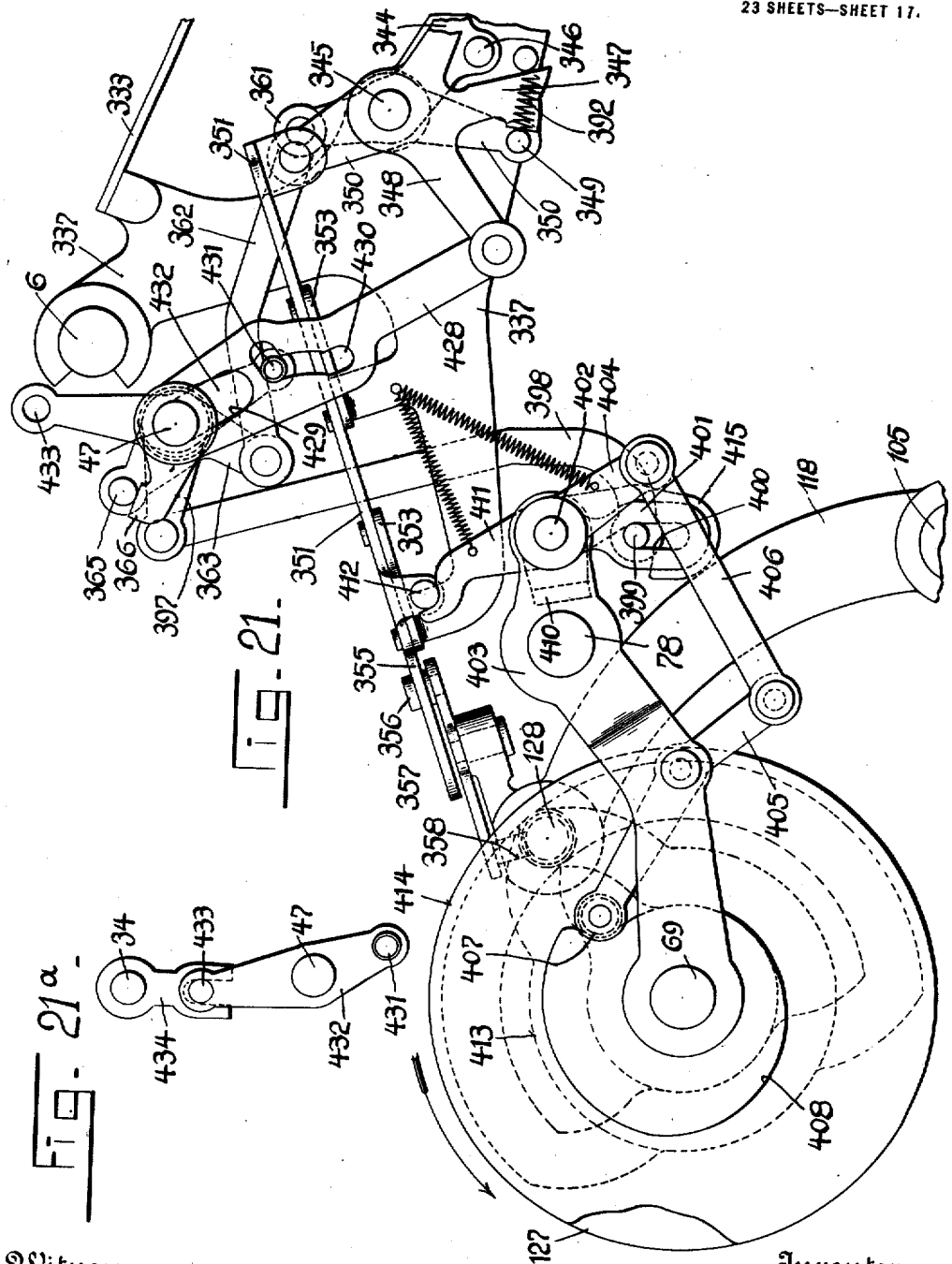

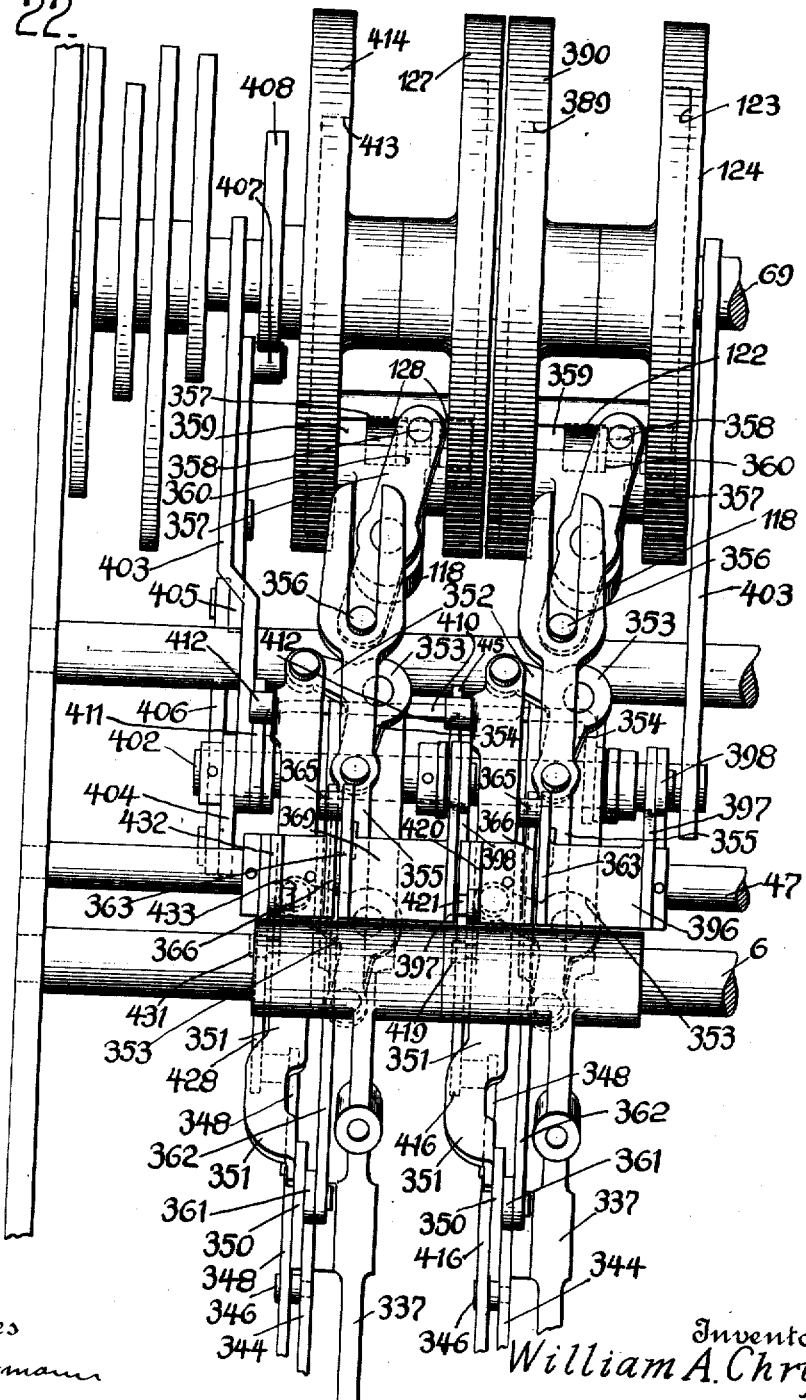

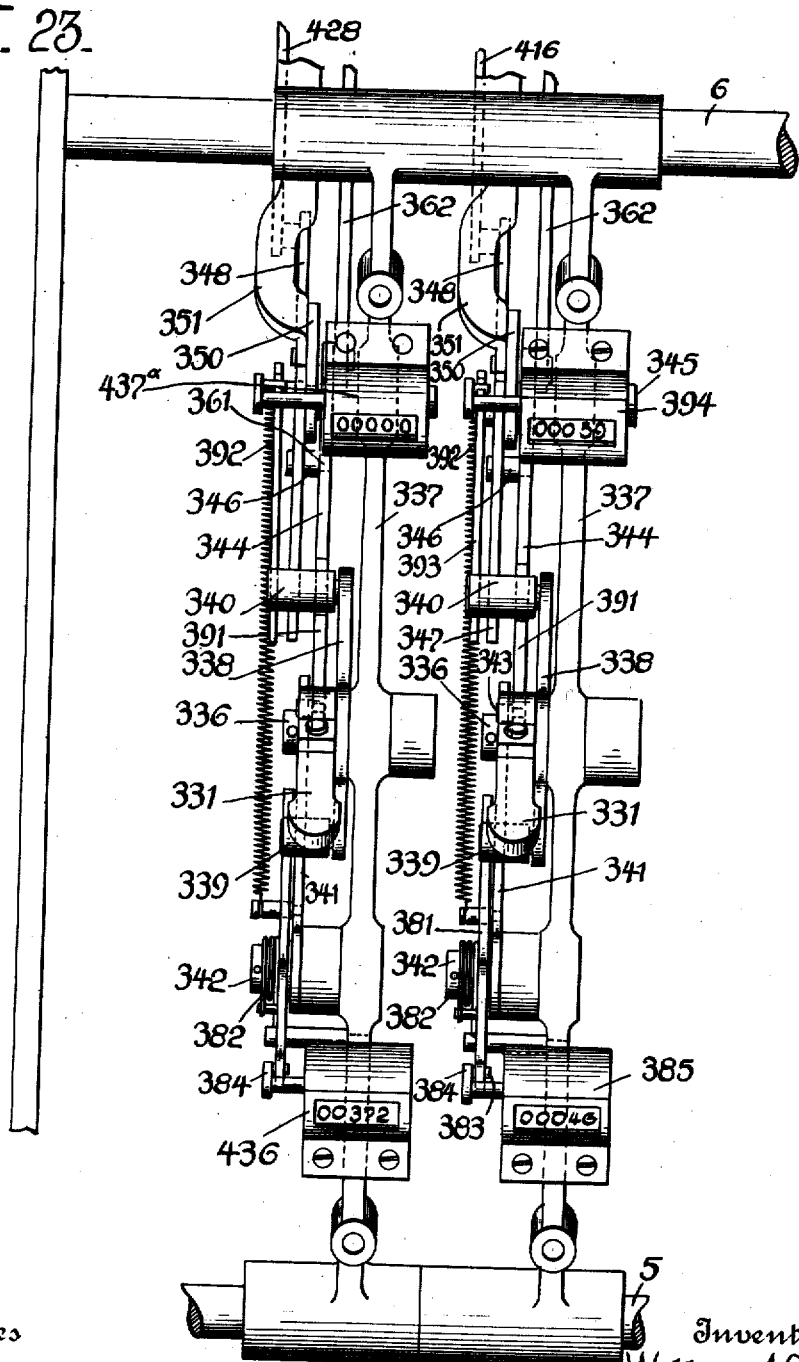

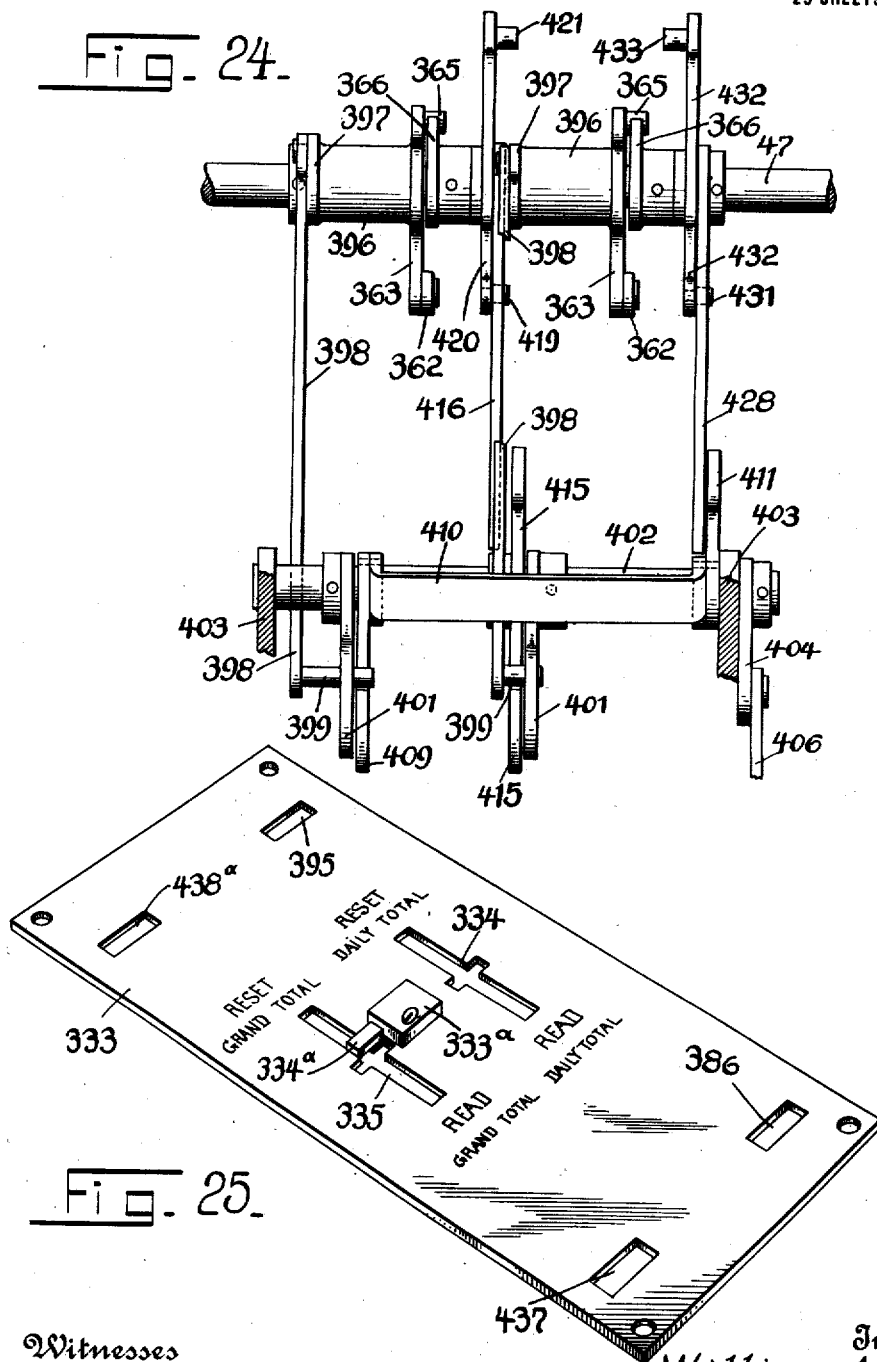

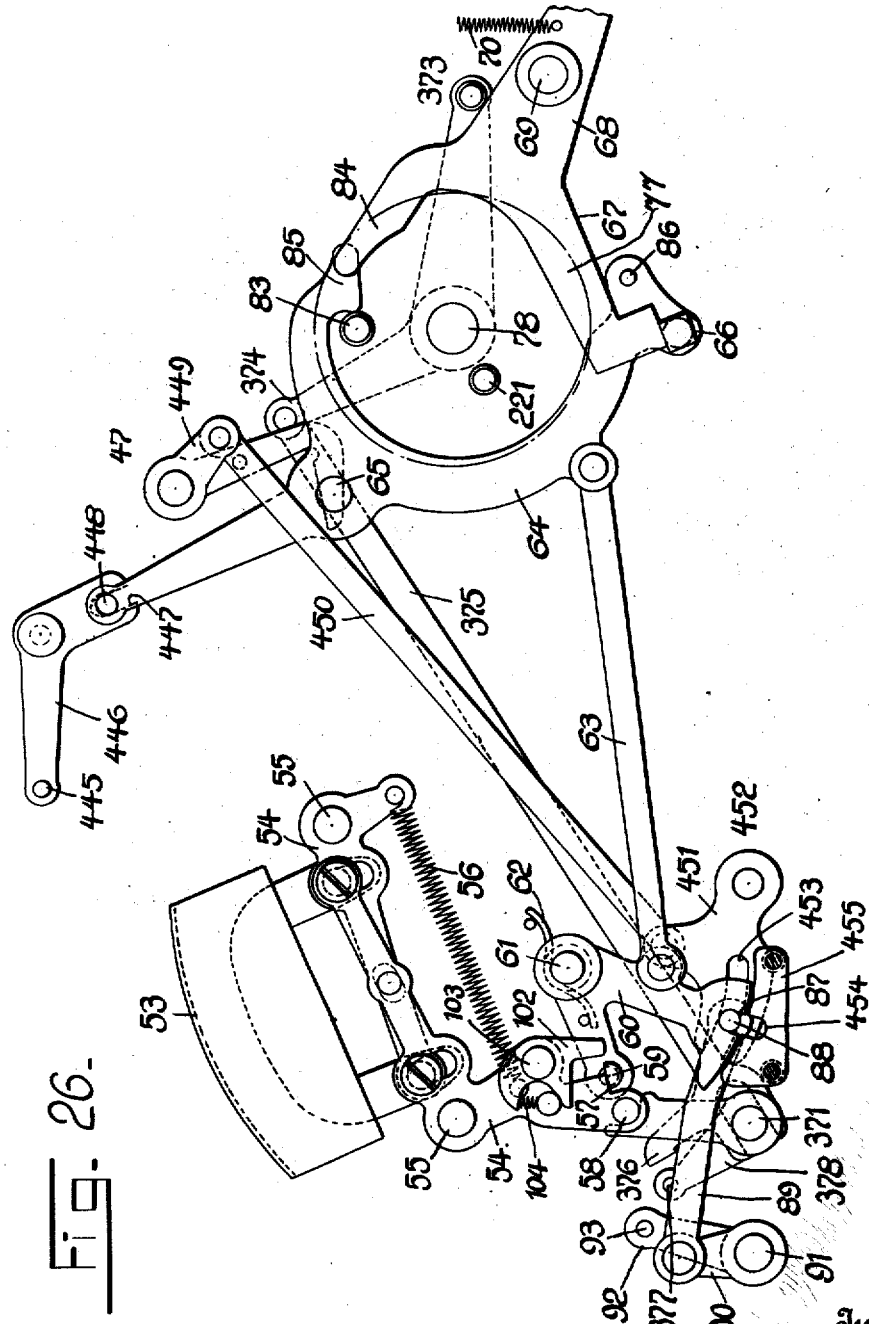

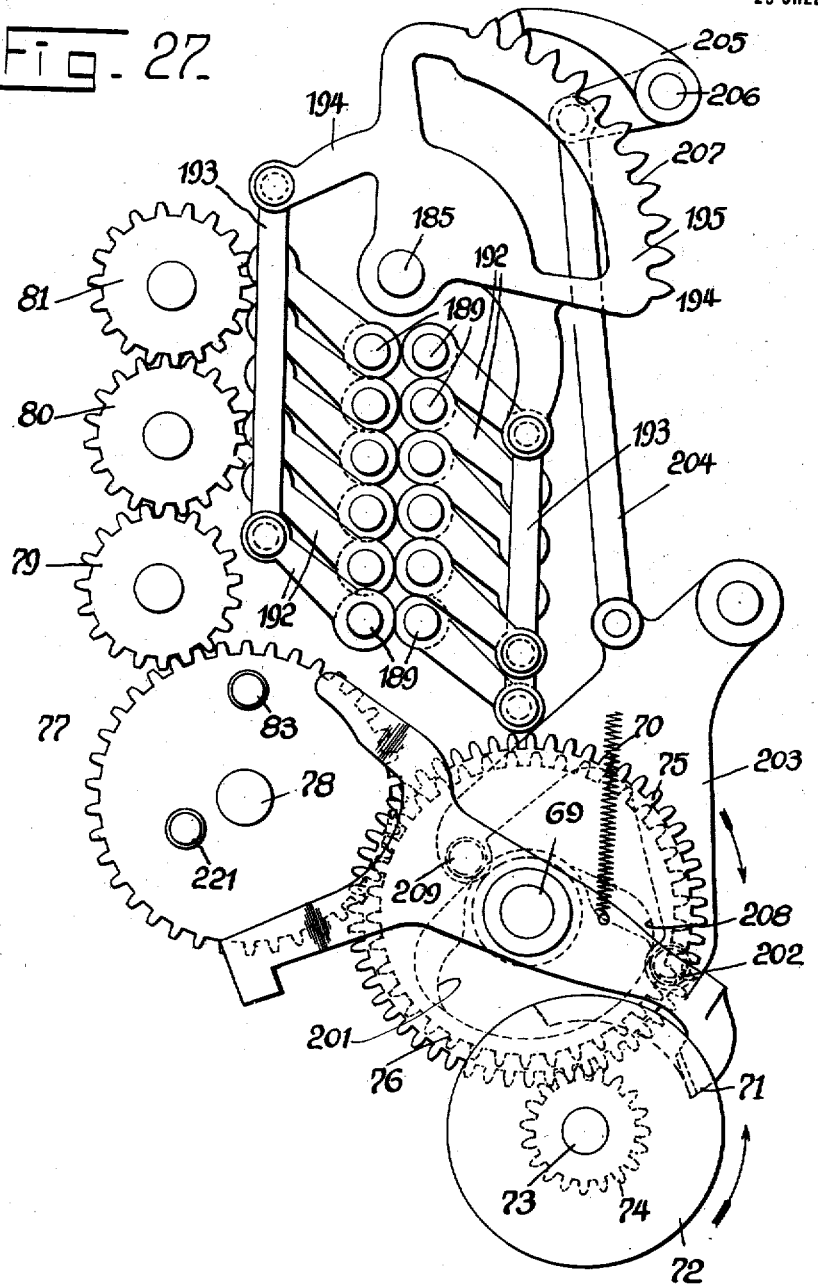

W. A. CHRYST.
CASH REGISTER.
APPLICATION FILED SEPT. 21, 1911.

1,198,418.

Patented Sept. 19, 1916.
23 SHEETS—SHEET 23.

Witnesses
H. F. Sadgebury
W. M. McCarthy

Inventor
William A. Chryst
by
C. H. Braselton
Attorneys

UNITED STATES PATENT OFFICE.

WILLIAM A. CHRYST, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,198,418.　　　Specification of Letters Patent.　　Patented Sept. 19, 1916.

Application filed September 21, 1911. Serial No. 650,584.

*To all whom it may concern:*

Be it known that I, WILLIAM A. CHRYST, a citizen of the United States, residing at Dayton, in the county of Montgomery and State of Ohio, have invented certain new and useful Improvements in Cash-Registers, of which I declare the following to be a full, clear, and exact description.

This invention discloses a new type of accounting machine in which a plurality of entries are made during a single operation of the machine.

In savings associations or like institutions at the present time whenever a depositor desires to withdraw or deposit an amount, he presents his pass book in which the entry is made and a memorandum of the same is made by the teller upon a loose slip. From these slips the proper entries are posted to the ledger at the end of the business day. With this system it will be seen that there is great risk of losing one of the loose slip memoranda or of the teller inadvertently entering on a depositor's pass book an amount differing from that upon the memorandum slip.

It is the principal object of this invention to provide a machine in which similar entries are made of the amount deposited or withdrawn upon the depositor's pass book and upon a record strip during a single operation of the machine, the latter being stored in the machine, thereby avoiding the possibility of wrong entries being made or the loss of a memorandum slip.

Another object of this invention is to provide a machine with an accumulating mechanism comprising a plurality of totalizers from any one of which may be obtained a record of the totals shown thereon and either retaining or clearing the totalizer of said total, with manipulative devices for determining the kind of total and the totalizer from which it is to be obtained while rendering the rest of the totalizers inoperative.

Another object of this invention is to provide the record strip recording mechanism with a special type carrier for designating the kind of total and the totalizer from which it is recorded.

A further object of this invention is to provide means for moving the totalizers into and out of engagement with their actuators, with alining mechanism for engaging with the totalizers previous to their disengagement from the actuators and which alining mechanism is withdrawn from engagement with the totalizers after the totalizers are reëngaged with the actuators.

Another object of this invention is to provide improved actuators for the totalizers, which are made of two parts, one part of said actuators being movable independently of the other part for effecting a transfer.

A further object of this invention is to provide a member for restoring the actuators to their normal position, which member is capable of being moved to aline the actuators previous to their being restored to normal position.

A further object of this invention is to provide an improved form of book or record material holder which normally stands out of operative relation with the type carriers for recording thereon, and is brought into such operative relation on the operation of the machine, after which a platen is operated to take an impression upon the book from the type carriers.

A further object of this invention is to provide an improved form of mechanism for bringing the zero type characters into printing position.

Another object is to provide devices for equalizing the feed of the record strip regardless of the size of the roll upon which the strip is stored.

Another object is to provide an improved form of operating devices for the hammers for taking an impression from one set of the type carriers.

A still further object is to provide an improved form of interlocking mechanism between the amount keys and the totalizing manipulative devices.

With these and incidental objects in view, the invention consists in certain novel features of construction and combinations of parts, the essential elements of which are set forth in the appended claims, and a preferred form of embodiment of which is hereinafter described with reference to the drawings which accompany and form part of this specification.

Figure 28:
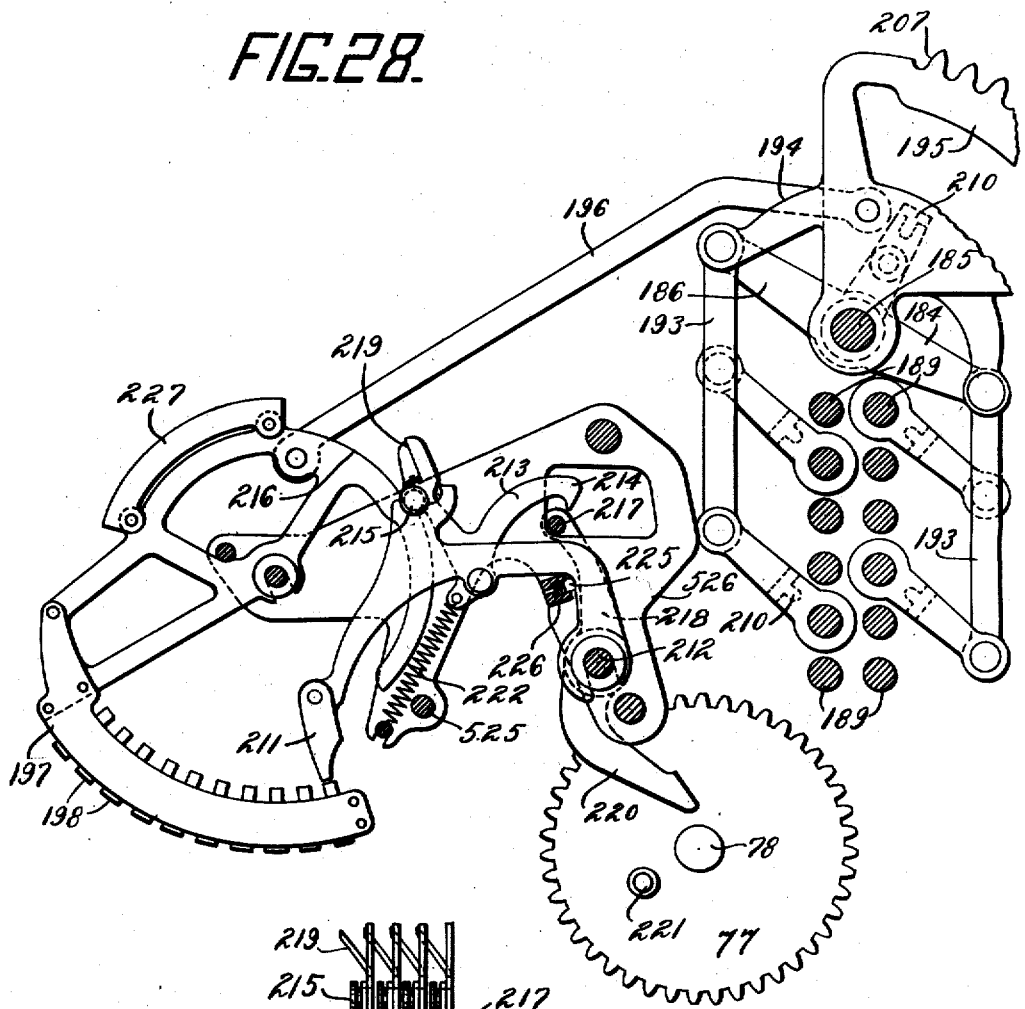
Figure 29:
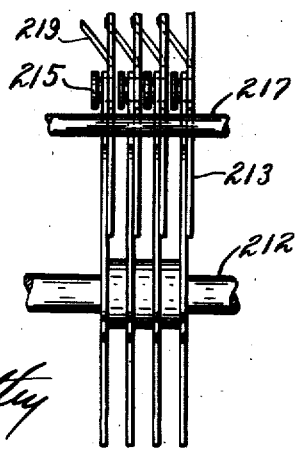

Figure 1 is a perspective view of the invention. Fig. 2 is a central transverse sectional view taken alongside of one of the amount banks of keys with the book printing mechanism left off. Fig. 3 is a sectional view of the upper part of the machine or of the book printing mechanism, which is left off of Fig. 2. Fig. 4 is a rear elevation of a portion of mechanism for bringing the zero characters of the type carriers into printing position. Fig. 5 is a view somewhat similar to Fig. 3 slightly enlarged and taken to one side of the book printing mechanism. Fig. 6 is an enlarged sectional view showing mechanism for positioning the zero characters partially operated. Fig. 7 is a top plan view of the date and amount type carriers for recording upon the book. Fig. 8 is a partial plan view of one of the leaves of the book with several entries made thereon. Fig. 9 is a partial plan view of the record strip. Fig. 10 is a front elevation of the book holder and platen coöperating therewith. Fig. 11 is a sectional view through the record strip recording mechanism located at the right hand side of the machine. Fig. 11ª is a detail view of the devices for preventing the operation of the total manipulative devices when the type carriers are out of normal position. Fig. 11ᵇ is a partial rear elevation of the shafts and intervening connections for setting the type carriers. Fig. 12 is an enlarged view of the mechanism for feeding the record strip and the inking ribbon. Fig. 13 is a detail view of the special type carrier for recording characters indicating a total and the totalizer from which it is obtained. Fig. 14 is an enlarged sectional view through the keyboard. Figs. 15 and 16 are detail side elevations of the detents coöperating with the keys. Fig. 17 is an enlarged sectional view of the lower part of the machine showing the totalizers and actuators therefor. Fig. 18 is an enlarged sectional view showing the mechanism for moving the totalizers into and out of engagement with the actuators. Fig. 19 is an enlarged sectional view of the mechanism for operating the restoring and alining frame for the actuators. Fig. 20 is a detail sectional view of the mechanism for controlling the recording of the totals. Fig. 21 is an enlarged sectional view of the rear portion of the mechanism shown in Fig. 20 but looking in the opposite direction. Fig. 21ª is a detail view of a part of the devices for positioning the special type carrier in the recording of totals. Fig. 22 is a top plan view of the mechanism shown in Fig. 21. Fig. 23 is an enlarged top plan view of the mechanism shown in the forward part of Fig. 20. Fig. 24 is a rear elevation of a portion of the mechanism for controlling the selecting of the totalizer from which a total is to be recorded. Fig. 25 is a perspective view of the index plate which fits over the manipulative devices controlling the recording of the totals. Fig. 26 is a side elevation of the motor key and devices coöperating therewith. Fig. 27 is an end elevation of the operating gearing. Fig. 28 is an end elevation of the book number type carriers and the operating mechanism for the printing hammers of said type carriers. Fig. 29 is a rear elevation of the operating mechanism for the printing hammers of the amount and book number type carriers showing the offsets for operating the hammers of lower denomination when a type carrier of higher denomination only is used.

Described in general terms the machine embodying the invention comprises a plurality of banks of amount keys and number keys, the latter keys being used for recording the numbers assigned to the pass books. Upon the depression of these keys, indicators will be brought into view for displaying the amount to be recorded and the number of the book. Upon the further operation of the machine by a motor or an operating crank handle, actuators will be positioned distances determined by the amount keys depressed, after which a plurality of totalizers will be moved into engagement with the said actuators so that upon their return to normal position the actuators will actuate said totalizers. The book number keys also control actuators but they do not coöperate with the totalizers as they are mounted to one side of said totalizers. The above sets of actuators control devices for positioning type carriers for recording amounts and book numbers upon a record strip. During the positioning of the amount type carriers for recording upon the record strip another set of type carriers will be positioned for recording upon the depositor's pass book, which previous to the operation of the machine has been inserted in a suitable book-holder. Adjacent to the amount type carriers which print upon the book, is located a series of print type carriers for recording the date upon the depositor's pass book and also a special type carrier for printing a character designating whether the amount has been withdrawn or deposited. These latter mentioned type carriers, that is, the date and transaction carriers are adjustable laterally relative to the amount type carriers so that the amount received will be printed in a different column from the amount paid out. It might be here mentioned that one each of this type of machine is arranged to be used by the receiving and paying tellers, in which case, after the dating and transaction type carriers have been properly adjusted, there would be no need of moving said type carriers laterally, as all of the entries recorded in either machine would be of the same kind. The type carriers for recording the amounts and book numbers upon the record strip are left in their adjusted position till the succeeding operation of the machine, and attached to these type carriers are indicator plates which are arranged to display the book number and the amount recorded upon the last operation of the machine. Suitable manipulative devices extend through the cabinet adjacent to the amount keys and are normally under lock and key so that only the proper official may operate the said devices. These manipulative devices control the recording of the sub-total and the grand total from the totalizers and incidentally control the positioning of a special type carrier for identifying the kind of total and the totalizer from which it is obtained. With this general statement of the functions performed by the machine, a more detailed description of the various parts for accomplishing these functions will now be given.

*Keyboard mechanism.*

Referring to Figs. 1, 2, 14, 15 and 16 the keyboard mechanism will now be described. As shown in Fig. 1, there are a plurality of banks of keys 1 which are used in setting up the numbers of the depositors' books and adjacent thereto are similar banks of keys 2 which are used in setting up amounts either paid out or received by the bank. A portion of the amount keys, which are not normally used, are located beneath a hood 3 which hood may be detached when it is found necessary to use these keys which are of higher denomination. The operation of each bank of these keys and the mechanism controlled thereby is identical and a description of one bank, it is thought, will be sufficient for all of them. In the sectional views, Figs. 2 and 14, the keys shown therein represent the amount keys 2 and are vertically movable in a frame 4 which is suitably supported by cross rods 5 and 6. These keys are provided with reduced portions 7 at their lower ends which pass through suitable recesses in a plate 8 forming a part of the key frame. Between this plate 8 and shoulders 9 formed by reducing the lower ends of the keys, are located coil springs 10 which normally hold said keys 2 in their uppermost position. These keys are limited in their upward movement by projections 11 formed thereon which contact with the under side of a plate 12 through which the upper end of the keys project. These keys have formed on their forward edges shoulders 13 which, when any one of said keys is depressed, is arranged to engage with a stud 14 formed upon a slide 15 and move said slide forwardly against the tension of a spring 16 until said key is fully depressed, when the slide will be slightly retracted by the spring 16 so that the stud 14 will pass over the shoulder 13 of the depressed key and hold said key in its depressed position. If a wrong key has been depressed by mistake, the error may be corrected by simply depressing the right key in the proper bank of keys. This slide 15 is mounted upon links 17 and 18 which in turn are pivoted to the key frame 4. Connected to the eight rearmost keys of each bank are links 19, the lower ends of which are provided with studs 20 that are guided by slots 21 formed in a plate 22 which plate forms a part of the key frame 4. These studs 20 act as stops for differentially movable actuators 23 while a stationary stud 24 controls the movement of said actuators when the foremost or the ninth key is operated. With this stationary stop it is not necessary to provide said ninth key with a link 19 and a stud 20. The pins which secure the upper ends of the links 19 to the keys 2 are provided with rollers 25, which coöperate with inclines 26 of different angles, formed upon a plate 27 that is supported by links 28. These links are pivotally mounted upon the key frame 4 by studs 29, which also act as pivots for the previously described links 17 and 18. Each of the plates 27 has an upward and rearward extension 30 which, at its extreme end, is provided with a hook portion 31 that extends over a roller 32 projecting from a segmental indicator plate 33. These indicator plates 33 are mounted upon a cross rod 34 suitably supported in the machine frame and are provided with plates 35 bearing numerals which are arranged to be exposed singly through suitable openings 36 in the cabinet 37 of the machine. These indicators 35 are shown as being directly actuated by the keys 2 but are not necessarily so actuated as said keys instead of directly actuating said indicators may act as stops therefor. When the keys are released, as hereinafter described, the plates 27 and indicators 35 are returned to their normal or zero position by a spring 38, the ends of which are connected to the link 28 and a stud 39 projecting from the key frame 4. Each of the links 18 supporting the latching detent plates 15 has a forked rearward extension which is provided with prongs 40 and 41. The prong 41 of each of the links 18 normally projects under a pin 42 projecting from a zero stop 43 for the actuators 23. These zero stops 43 are pivoted as at 44 to the plates 22, which form part of the key frame 4 and are held in their normal positions by the springs 16, the ends of which are connected to the links 18 and said zero stops 43. Upon the operation of one of the keys the zero stop 43 of that particular bank will be elevated by the rocking of the link 18 which is caused by the forward movement of the detent latching plate 15, thereby withdrawing said zero stop from the path of movement of the actuator 23 controlled thereby. This operation of the link 18 by the depression of one of the keys will elevate the prong 40 of said link in the path of a cross rod 45 which is supported by downwardly extending arms 46 secured to a shaft 47 and thereby prevent the operation of said shaft whenever a key is depressed. This shaft is rocked during the total recording operation and from this it will be seen that it is impossible to record a total while any of the keys are depressed. Adjacent to the keys of each bank is a plate 48 which is provided with locking studs 49, one for each key of that particular bank. Each plate is pivoted upon links 50 which are secured to the key frame 4 by the previously described studs 29. The studs 49 will pass below shoulders 51 of the unoperated keys upon the operation of the machine and thereby lock said keys from being depressed. The studs 49 coöperating with the operated keys will pass into recesses 52 formed in the rear edge of the keys and also lock the operated keys from being released. The actuation of this locking plate 48 by the operation of the machine will be hereinafter more fully described.

Operating mechanism.

The machine is constructed to be operated either manually or by suitable motor and in either case it is normally locked until a push button or motor key 53 is depressed, see Figs. 1 and 26. This motor key 53 is connected to the ends of the two long arms of a pair of bell crank levers 54 which are suitably pivoted as at 55 upon the machine frame. The short arms of these bell cranks are connected by a spring 56, which through the connection of the long arms with the push button normally holds the push button 53 elevated. The long arms of the bell cranks 54 project in opposite directions in a manner causing them to overlap intermediate their ends at which intermediate point they are connected by a slot and pin connection shown in Fig. 26. Each arm is furthermore provided with a slot in which plays the pivot connecting the end of the other arm with the push button. The forward lever 54, see Fig. 26, has a downward extension which at its lower end is provided with a shoulder 57 and a pin 58. The shoulder 57 normally stands above a flat sided stud 59 projecting from one arm of a bell crank lever 60, which is pivoted as at 61 to the machine frame and has a coil spring 62 which normally holds the flat side of the stud 59 in contact with the shoulder 57 of the forward link 54. Connected to the bell crank 60 is the forward end of a link 63, the rearward end of which is connected to a lever 64 pivoted as at 65 to the machine frame. This lever 64 at its lower end is provided with a stud 66 on the upper side of which rests an arm 67 of a Y shaped lever 68, which is pivoted upon a main operating shaft 69. This lever 68 is held in this position by a coil spring 70 with the rear end of said lever in a notch 71 formed in a disk 72 which is secured to a shaft 73 (Fig. 27). The disk 72 is adapted to be associated with the clutch device of a motor mechanism not shown herein, but preferably of the type set forth in a co-pending application of Charles F. Kettering and the present applicant, Serial No. 394,187, filed Sept. 23, 1907. It is obvious however that the shaft 73 may be connected to any suitable shaft form of motor and rotated thereby. This shaft 73 carries a pinion 74 which meshes with a gear wheel 75 secured to the main operating shaft 69. Attached to this gear wheel 75 is a smaller gear wheel 76 which meshes with a similar gear wheel 77 mounted upon a stud 78 projecting from one of the side frames of the machine. Meshing with this gear 77 is a pinion 79 which meshes with a similar pinion 80 and the latter in turn meshing with a pinion 81 of the same pitch as the pinions 79 and 80. This gearing is so proportioned that three revolutions of the pinion 74 rotates the gears 75, 76 and 77 a complete revolution and the gear 77 imparts to the pinions 79, 80 and 81 two revolutions. When the machine is manually operated a crank handle 82, see Fig. 1, is suitably secured to the pinion 81 and two rotations of the said crank handle through the above described gearing will rotate the main shaft 69 one complete rotation, while three revolutions will be imparted to the gear 73 carrying the locking disk 72.

From the above description it will be seen that upon the operation of the push button or motor release key 53, the forward parallel link 54 will be rocked in a clockwise direction which will carry the shoulder 57, formed upon the lower end of the said link 54, out of engagement with the stud 59 projecting from the bell crank 60, so that the coil spring 62 will force said bell crank in a clockwise direction and through the link 63 rock the lever 64 in a similar direction about the stud 65. This movement of the lever 64 will withdraw the stud 66 projecting therefrom from beneath the arm 67 of the Y shaped lever 68, which will permit the spring 70 to rock said lever so as to carry the rear end thereof out of engagement with notch 71 formed upon the locking disk 72 and thereby release the machine. In electrically operated machines contacts will be closed simultaneously with the release of the machine for energizing the motor which will drive the main operating shaft 69 by the previously described gearing. Near the end of rotation of the gear 77 a roller 83 carried thereby, see Figs. 26 and 27, will contact with a prong 84 of the Y shaped locking lever 68 and rock said lever against the tension of the spring 70 so that its rearward end will engage with the notch 71 of the locking disk 72. During this restoration of the rocking lever 68 the roller 83 will engage with the rearward extension 85 of the lever 64 and rock said lever in an anti-clockwise direction. This movement of the lever 64 will, through the link 63, restore the bell crank 60 to its normal position, which will permit the forward bell crank lever 54 to return to its normal position by its spring 56, with the shoulder 57 formed on said bell crank above the stud 59 projecting from the bell crank 60. This movement of the lever 64 will also carry the stud 66 projecting therefrom beneath the arm 67 of the locking lever 68 and thereby latch the said lever in locking position. The rocking movement of the lever 68 when said lever is released is limited by a pin 86 projecting from the lever 64, which passes under the arm 67 of the said locking lever 68 and thereby supports said lever against the tension of its spring 70 after the roller 83 passes the forward end of the prong 84. From the shape of the extension 85 of the lever 64 it will be seen that the roller 83 carried by the gear 77 will return said lever and the bell crank 60 connected thereto slightly beyond its normal position, so as to insure the return of the stud 59 carried by the bell crank 60 below the shoulder 57 formed upon the link 54. The return of the lever 64 and the bell crank 60 to their normal position by the roller 83 projecting from the gear 77 is also utilized to release the depressed book number and amount keys.

The lower edge of the vertical arm of the bell crank 60 is provided with a recess 87 into which extends a pin 88 projecting from the rear end of a link 89, the forward end of which is connected to upright arm 90 secured to a rock shaft 91 supported by the machine frames. Secured to the shaft 91 and extending upwardly therefrom is a series of arms 92, which support a rod 93 at their upper ends. This rod 93 passes through slots 94 formed in extensions 95 of the forward links 50, which support the locking detent 48 and this rod also lies adjacent to the under side of rearward extensions 96 of the links 17, which support the forward ends of the slides or detents 15, which latch the number and amount keys in their depressed positions as fully shown in Figs. 2, 14, 15 and 16. As the bell crank 60 is rocked in a clockwise direction upon the operation of the push button 53 by the spring 62 it will, through the link 89, see Fig. 26, rock the shaft 91 in an anti-clockwise direction, which movement of the shaft, through the arms 92 and rod 93, will rock the links 50, supporting the forward ends of the locking plates 48, in an anti-clockwise direction. This movement of the links 50 will carry the studs 49 of the locking plates 48 beneath the shoulders 51 of the unoperated keys and thereby lock said keys in their elevated position while the studs 49 of said plates adjacent to the operated keys will pass into recesses 52 thereof and lock said keys in their depressed positions. Upon the excess return movement of the bell crank 60 caused by the roller 83, projecting from the gear 77, at the end of the rotation of said gear, the rock shaft 91 will be rocked to such an extent in a clockwise direction that the rod 93, carried by the arms 92 projecting from said rock shaft, will engage with the under side of extensions 96 of the links 17 supporting the latching plates or detents 15 and rock said links in an anti-clockwise direction. This movement of the links 17 will withdraw the studs 14, carried by said plates 15, from engagement with the shoulders 13 of the depressed keys and thereby release said keys, so that their springs 10 will return them to their normal upper position. This movement of the rock shaft 91 in a clockwise direction to release the keys through the arms 92 and rod 93, will return the locking slides or detents 48 to their normal position so that the studs 49 projecting from the detents 48 will not interfere with the return of the keys to their normal position.

A lever 97 (Fig. 2) is centrally pivoted upon the rock shaft 91 and the downwardly extending portion of said lever projects through the cabinet 37, as shown in Fig. 1, while the upper portion of said lever rests against the cross rod 5. The lever is held in this position shown in Fig. 2, by a spring 98 coiled about the shaft 91 and having its ends contacting with pins 99 and 100, the former projecting from the upward portion of the lever 97, while the latter projects from one of the frames of the machine. If the wrong keys have been depressed all of said keys may be simultaneously released by pulling forward on the lower end of the lever 97 which will carry the upper end of said lever into contact with the rod 93 supported by the arms 92 secured to the shaft 91 and the further forward movement of the lower portion of said lever will rock the shaft 91 in the same direction, which, through the rod 93 acting on the underside of extensions 96, will release the depressed keys. Upon the release of the lower portion of the lever 97 it will be returned to its normal position, as shown in Fig. 2, by the coil spring 98. The said lever 97 has a forward extension 101 which is arranged to contact with the rod 5 and thereby limit the movement of said lever.

The forward link 54 supporting the push button 53 is provided with a flip pawl 102 (Fig. 26) which is arranged to prevent repeated operations of the machine by holding the key or push button 53 in its depressed position. The lower end of this flip pawl projects slightly below the shoulder 57 of the link 54 so that when said link is rocked about its pivot 55, upon the depression of the key or push button 53, the said flip pawl will contact with the stud 59 and be rocked about its pivotal point 103 against the tension of a spring 104, thereby permitting the said stud to pass along the rear edge of the lever 54. Upon the return of the bell crank 60 by the roller 83, its stud 59 will be carried beyond its normal position to a position below the lower edge of the flip pawl 102, which will permit said pawl to pass above the stud 59 and thereby hold the bell crank 60 in the position to which it has been returned, so that if the push button 53 is held depressed, the machine will remain locked. When the push button is released the spring 56 will restore the same to its normal position by rocking the links 54 about their pivotal points 55, which movement will carry the shoulder 57 of the forward link above the stud 59 and thereby latch the bell crank 60 in its normal position, which may then be released by an operation of the push button 53.

*Accumulating mechanism.*

The accumulating mechanism comprises a plurality of totalizers which are arranged to be brought into and out of engagement with the actuators. These totalizers as shown represent a daily totalizer and a grand totalizer, the daily totalizer being arranged to be reset to zero at the end of each day, while the grand totalizer is arranged to run on indefinitely. Both of said totalizers are normally in engagement with the actuators and in the entering of items on said totalizers, they are adapted to be moved simultaneously out of engagement previous to the positioning of the actuators, after which they are returned to engagement with said actuators and the actuators are then restored to normal position, thereby operating both of said totalizers. The actuators 23 of these totalizers are mounted upon studs 105, see Figs. 2 and 17, which studs project from standards 106 supported at their lower ends by a cross rod 107, while at their upper ends they are bifurcated to straddle the shaft 78. These actuators 23 carry auxiliary actuators 108, which are also mounted upon the studs 105 and are connected to the main actuators 23 by springs 109. These auxiliary actuators are normally in engagement with the totalizer elements 110. The elements 110 of each totalizer are mounted upon a transverse rod 111 which is mounted in a frame 112, this frame 112 being also provided with a rod 113 similar to the rod 111 upon which the totalizer elements are mounted. These rods project through the frame 112 and into elongated slots 114 (Fig. 18) of side frames 115 which support and guide the totalizer frames 112. Pivotally mounted upon each of the totalizer frames 112 are arms 116 which support an alining bar 117. Centrally pivoted levers 118 (Figs. 17 and 18) are mounted near the left hand side of the machine upon a stud 105, and the downwardly extending portions of these levers extend in opposite directions and are arranged to shift the frames 112 carrying the totalizer elements, so that said elements will be moved into and out of engagement with the actuators. The forwardly extending member of one of the levers 118 is provided with a segmental rack 119 which meshes with a mutilated pinion 120 secured to a rock shaft 121 suitably supported in the frame 115 supporting the totalizer frames 112. On the right hand end of this shaft 121 at the other side of the machine there is provided a similar pinion 120 which meshes with a rack similar to the rack 119 formed upon an arm 118 which is pivoted to a stud 105 on the right hand side of the machine. The purpose of thus connecting the levers 118 located at opposite ends of the machine is that when one of said levers is moved the other one will also be moved. The upwardly extending portion of one of the left hand levers 118 is provided with a laterally movable roller 122 which normally rests in a cam groove 123 formed in a disk 124 secured to the main operating shaft 69. The extreme lower portion of each one of the levers 118 is provided with cam slots 125 and 126, in the former of which projects the alining bar 117 while in the latter projects the ends of the rod 111 supporting the elements 110 of one of the totalizers. The shape of the cam groove 123 formed in the disk 124 is such that upon the beginning of rotation of the shaft 69 the lever 118 coöperating with the forward or daily totalizer will be rocked in a clockwise direction about its stud 105, which movement will be conveyed to its right hand lever through the pinion 120 and shaft 121. The first movement of the levers 118 coöperating with the daily totalizer in a clockwise direction will, through the cam slots 125 formed in the lower ends thereof, rock the alining bar 117 into engagement with the totalizer elements, after which the cam slots 126 will act upon the rod 111 and move the frame 112 supporting the rod 111 in a radial direction from the pivotal studs 105, thereby carrying the totalizer elements out of engagement with the actuators. During this movement of the totalizer the alining bar 117, which is carried by the frame 112, will, due to the shape of the slots 125 and 126 move with the totalizer elements, so as to prevent an accidental displacement of said elements while they are out of engagement with the actuators. The lever 118 which coöperates with the rearward or grand totalizer is of the same identical construction as the lever 118 which extends forwardly and coöperates with the daily totalizer, and this grand totalizer lever 118 is actuated by a disk 127, which has a cam groove formed therein similar to the cam groove 123 formed in the disk 124, and normally projecting in this groove of the cam disk is a longitudinal roller 128 (Fig. 22). Grooved rollers 129 project from the frame 115 supporting the totalizers and act as guides for the lower ends of the levers 118, as plainly shown in Figs. 17 and 18.

Immediately after the withdrawal of the totalizers from engagement with the actuators, a cam 130 (Fig. 17) secured to the shaft 69 will engage with a roller 131 projecting from one arm 132 of a lever which is loosely mounted upon the shaft 78 and rock said lever in a clockwise direction. The arm 132 is provided with a segmental rack portion 133, which engages with a rack portion 134 of an arm 135, which is pivoted upon one of the studs 105. The outer end of the arm 135 is forked and within this forked portion is slidably mounted a transverse bar 136. This bar extends across the machine and is supported at its other end by an arm similar to the arm 135, which in turn is actuated by a lever having a rack portion similar to the portion 133 and which in turn is actuated by a cam similar to the cam 130 secured to the shaft 69. Springs 137 seated in the fork portion of the arms 135 contact with studs 138 projecting from the cross bar 136 and normally hold said cross bar in its outermost position against pins 139 mounted in the extreme outer end of the forked portions of the arms 135. From this it will be seen that immediately after the withdrawal of the totalizers from engagement with the actuating racks, the frame comprising the arms 135 and the cross bar 136 will be rocked in an anti-clockwise direction about its pivotal studs 105. This operation of the frame will permit the movement of the actuators by springs 140, the ends of which are connected to the actuators 23 and pins projecting from the upper ends of the standards 106 (Fig. 2). In the banks in which no keys have been depressed, projections 141 of the actuators 23 will contact with the zero stops 43, while in the banks in which keys have been depressed the actuators will move on until arrested by the studs 20 projecting from the links 19 connected to the depressed key, it being understood that the operation of any of the keys will withdraw the stop 43 of that particular bank from the path of the projection 141, as previously described.

The frame composed of the arms 135 and the cross bar 136 is given an invariable reciprocatory movement at each operation of the machine and is used for restoring the actuators 23 as hereinafter described. As the said frame nears the end of its movement in one direction the lugs 138 projecting from the bar 136 will pass into forked portions 142 of levers 143 of which there is only one shown (Fig. 19). Immediately after the bar 136 reaches the limit of its movement in a downward direction, by which time the actuators 23 have been positioned, a cam 144, secured to the shaft 69, will engage with a roller 145 projecting from the horizontal arm of a bell crank lever 146 which is secured to the shaft 78 and rock said bell crank lever 146 and the shaft 78 in an anti-clockwise direction. This movement of the bell crank 146, through a roller 147 carried at the extreme downward end of the vertical arm of the bell crank 146 engaging with an inclined portion 148, will rock the lever 143 in a clockwise direction about its pivotal point 149, and the further movement of the bell crank 146 by its cam 144 will hold the lever 143 in its operated position by the roller 147 passing along the curved surface of the portion of the lever 143, which at this time is concentric to the shaft 78. It is to be understood that at each end of the machine there is one of the levers 143 and a bell crank 146 for operating said lever. This rocking of the levers 143 by the cams 144 and the bell cranks 146 will carry the bar 136 in a radial direction toward the pivotal studs 105, which movement will aline the actuators 23 by alining groove 150 formed in said bar embracing one of the teeth of the actuators 23. The bar 136 will be held in this position against the tension of the springs 137 until hook arms 151, secured to the rock shaft 78, position type carriers, the movement of which is determined by the position of the said actuators as more fully hereinafter described.

After the type carriers have been positioned, cams 152, which are adjacent to the cams 144, secured to the shaft 69 operate upon rollers 153 (only one of which is shown) carried by the downwardly extending arms of the bell cranks 146 and restore said bell cranks to normal position. Just previous to the return to normal position, the rollers 147, carried by the extreme downward end of the bell cranks 146, will engage with hook portions 154 projecting from the levers 143 and restore said levers to their normal position, thereby withdrawing the bar 136 from engagement with the teeth of the actuators. Immediately after the withdrawal of the bar 136 from engagement with the actuator teeth, cams 155 secured to the shaft 69 adjacent to the cams 130 and located at opposite ends of the machine (Fig. 17) will engage with rollers 156 projecting from arms 157 of restoring levers 251, the latter having the arms 132, which support the rollers 131 and which are further provided with rack portions 133, and thereby rock said levers in an anti-clockwise direction, which movement will return the frame composed of the arms 135 and the cross bar 136 to normal position. During the return movement of the restoring frame, the bar 136 thereof will contact with extensions 158 of the actuators and return said actuators to their normal position, as shown in Figs. 2 and 17. This return movement of the restoring frame is assisted by springs 159, only one being shown, the ends of which are connected to levers 160 and to studs 161 projecting from the machine frame. These levers 160 are pivoted upon studs 162 (Fig. 19) and the free ends thereof engage with rollers 163 projecting from downward extensions of the arms 135 of the restoring frame, it being understood that there is one of these levers 160 on each side of the machine which coöperates with the roller 163 projecting from each of the side arms 135 of the restoring frame.

By reference to Fig. 2 it will be noticed that upon each operation of the machine the main actuators 23 are all moved one step by springs 140 independent of the auxiliary actuators 108, the springs 109 in the meantime holding the auxiliary actuators from movement. This independent movement of the main actuators is for the purpose of effecting the transfer as hereinafter described.

Each of the totalizer elements 110 (Figs. 2 and 17) is provided with an enlarged tooth 164 which, when said elements are rotated in the direction of the arrows shown in said figures, will rock a retaining pawl 165, which is pivotally mounted upon a cross rod 166 suitably mounted in the frame 115 supporting the totalizer frames. Each of the pawls 165 is of a bell crank formation and one arm thereof is provided near its outer end with a shoulder 167, which engages with a lug 168 projecting from a centrally pivoted lever 169, which is loosely mounted upon the rock shaft 121 and holds said lever in the position shown in said figures. Upon the return of the actuators 23 to normal position by the cross rod 136, the rearwardly extending portion of the levers 169 will stand in the path of studs 170 projecting from the auxiliary actuators 108 of the next higher actuators and arrest said auxiliary actuators against the tension of springs 109 which connect the main and auxiliary actuators during the last increment of movement of the main actuators 23. When a transfer is to take place the enlarged tooth 164 of one of the totalizer elements 110 will engage with its companion retaining pawl 165 and rock said pawl in an anti-clockwise direction as the totalizer element moves from nine to zero. This movement of the retaining pawl 165 will carry the shoulder 167 formed thereon from engagement with the lug 168 of the lever 169 and a spring 171 will rock the lever 169 in an anti-clockwise direction, the ends of this spring being connected to the retaining pawl 165 and the lever 169. With the rear end of the arresting lever 169 withdrawn from the path of movement of the stud 170 carried by the auxiliary actuator of the next higher denomination, it will be seen that the main actuator 23 and the auxiliary actuator will move as one piece to the limit of return movement imparted to the main actuator by the restoring frame, and thereby effect the transfer. The main actuator 23 and the auxiliary actuator 108 stand in the same vertical plane and both parts are used for actuating their respective totalizer elements.

The broad principle of moving an actuator an additional step to effect the transfer is old, but it is believed that the construction herein disclosed is new. With this construction very light springs connecting the auxiliary and main actuators may be used without any danger of skipping the transfer, as the auxiliary actuators are of very light construction and are easily moved, whereas in all former constructions known to the applicant the entire actuator is moved an additional step, thereby greatly increasing the danger of skipping the transfer during an operation of the machine, due to the weight of the actuator.

The actuators 23 are constructed so as to actuate both the daily and the grand totalizers and for each actuator there is provided two auxiliary actuators for effecting a transfer between the different denominational elements of each totalizer. This is necessary as the daily totalizer is reset at the close of the day's business, as previously stated, while the grand totalizer is continued indefinitely. It will be seen from this that transfers between the elements of the different totalizers are required upon different operations of the machine and consequently separate auxiliary actuators 108 are necessary for each totalizer. The tripping and arresting devices employed in the transfer movement for each totalizer are identical and the same reference numerals are employed for designating the same parts of each totalizer.

After a transfer has taken place the arresting levers 169 are returned to their normal position upon a succeeding operation of the machine, and the retaining pawls 165 are rocked by the springs 171, so that the shoulders 167 formed on said pawl will engage with the lugs 168 and hold the arresting levers in their normal position. The return of said levers 169 is accomplished in the following manner: A cross rod 172 is supported by arms 173, only one of which is shown, which are centrally pivoted, as at 174, to the frame 115 supporting the totalizers. The rearward extension of these arms 173 are provided with rollers 175 which are arranged to be engaged by the under edge 176 of the side arms 135 of the restoring frame as said frame nears the end of its downward movement at each operation of the machine. These side arms 135 will rock the arms 173 supporting the rod 172 in a clockwise direction so that the said rod 172 will engage with the released arresting levers 169 and restore them to normal position until they are latched by the shoulders 167 of the retaining pawls 165. The hub of each of the arms 173 supporting the cross rod 172 is provided with a downwardly extending arm 177 to which are connected the forward ends of links 178, only one of which is shown, the rearward ends of said links being fastened to arms 179 which are fastened to the hubs supporting arms 180 which in turn carry a cross rod similar to the cross rods 172 carried by the arms 173. This cross rod supported by the arms 180 is for a purpose similar to that of the cross rod 172 carried by the arms 173 and by an inspection of the Fig. 17 it will be seen that the arms supporting the rods 172 are simultaneously operated for the purpose described. A spring 181 is connected to each arm 179 and restores the rods 172 to their normal position, as shown in Fig. 17.

Instead of the enlarged teeth 164 of the totalizer elements 110 which are used for tripping the retaining pawls 165, pins projecting from the side of one of the teeth may be employed. The depth of the teeth of the actuators 23 and 108 is sufficient to permit the free rotation of the totalizer pinions 110 carrying the enlarged teeth 164.

*Recording mechanism.*

The description of the recording mechanism will be divided into two sub-headings; first, the record strip printer, the strip of which is retained in the machine and from which may be posted the items entered upon the machine, and, second, the book printer which is designed to record the amount deposited or withdrawn upon an inserted book or any other record material which may be inserted in and withdrawn from the machine freely.

*Record strip printer.*—Upon the record strip is recorded all of the items entered in the machine, and the sub and grand totals of each of the totalizers. These type carriers are in the form of segmental plates and are provided with a series of plungers each bearing a type character. After the type carriers have been positioned properly, individual hammers will be released which actuate the type plungers to record upon the record strip the amount designated by the positioned type carriers. These type carriers are connected through suitable intervening mechanism to the actuators 23, which mechanism will now be described.

Each of the actuators 23 has pivoted thereto an arm 182, (Fig. 2) which at its free end is connected to the lower end of a link 183, the upper end of said link being secured to an arm 184 pivotally mounted upon a transverse shaft 185 suitably mounted in the machine frame. Some of these arms 184 have forward extensions 186 (Fig. 3) to which are connected the upper ends of downwardly extending links 187, the lower end of the latter being secured to arms 188, which are secured to a row of transverse shafts 189, which are similar to the shaft 185 and are suitably supported by the machine frame. The arms 184 which do not extend forwardly have fastened thereto links 190, the lower ends of which are secured to arms 191 projecting from a second set of shafts similar to the shafts 189. These shafts 189 extend to the right hand side of the machine and have arms 192 projecting therefrom (Figs. 11 and 28) which are connected by links 193 to arms 194 of segmental plates 195. Pivoted to each of the segmental plates 195 is the rear end of a link 196, the forward end of which is connected to a type carrier 197 having plungers 198 bearing characters representing amounts.

After the actuators 23 have been positioned, as previously described, and the combined alining and restoring bar 136 has been moved in engagement with said actuators to aline them, the hook arms 151 will be rocked as described in connection with Fig. 19 and the hook portion of said arms will embrace rollers 199 carried by the arms 182 and adjust said links to positions determined by the previous movement of the actuators 23. This movement of the arms 182 will, through the previously described connections, set the type carriers 197 so as to bring the type plungers 198, corresponding to the keys depressed, in position to print upon a record strip 200, after which a cam 201 (Fig. 27) will engage with a roller 202 projecting from a forked arm 203, which is suitably pivoted upon the machine frame, and rock said arm in an anti-clockwise direction. This movement of the arm 203 will, through a link 204, rock an alining frame 205, which is pivoted as at 206 on the machine frame, into engagement with teeth 207 formed upon the segmental plates 195 (Fig. 11) and thereby hold said plates and type carriers 197 connected thereto in their adjusted position during the rest of the operation of the machine. Upon the beginning of the succeeding operation of the machine, cam 208, see Fig. 27, will engage with roller 209 projecting from the other prong of the lever 203 and rock said lever in a clockwise direction, which will, through link 204, rock the alining frame 205 in a similar direction and thereby withdraw the said frame from and engagement with the teeth 207 of the segmental plates 195, so that the said plates and type carriers 197 connected thereto may be adjusted as previously described. The above described type carriers are the amount type carriers and in order to employ the minimum number of shafts 189 the book number type carriers, which are identical with the amount type carriers, are connected to the segmental plates 195 in a similar manner to the said amount type carriers and these plates in turn are connected to yoke shaped frames 210, which are loosely mounted upon the shafts 185 and 189. This is true with the exception of the lower one of the right hand row of shafts 189 as viewed in Fig. 11 which shaft is connected to the type carrier similarly to the amount type carriers. When the amount and book number type carriers are positioned, the type plungers 198 corresponding to the depressed keys are positioned beneath individual hammers 211, which are pivoted upon a rod 212 supported by the machine frame. These hammers 211 are provided with bell crank pawls 213, each of which has a hook portion 214 and a roller 215. These rollers of the pawls 213 normally rest in reduced portions 216 of the type carriers, so that when one of the type carriers is moved, its companion pawl 213 will be rocked about its pivotal point so as to carry its hook portion 214 in the path of a rod 217 of an operating frame 218, which is pivoted upon the rod 212, upon which is also pivoted the type hammers 211. Each of the pawls 213 has an offset 219 which engages with the pawl carried by the type hammer of the next lower denomination so that when one type hammer of a higher denomination is moved, the pawls of the type carriers of a lower denomination will, through the offsets 219, rock the pawls 213 carried by the type hammers of the lower denomination into the path of movement of the rod 217 of the operating frame 218. One of the arms of this frame has an extension 220, which is in the path of movement of a pin 221 projecting from the gear 77 (Fig. 28). This arm 220 is offset so as not to be operated by the roller 83, but roller 221 is of sufficient length to engage and rock the frame 218 upon each operation of the machine. The movement of the frame 218 by the roller 221 will retract the hammers 211 of all the type carriers, the hook portion of whose pawls have been projected in the path of movement of the cross rod 217 of said operating frame. This retracting of the hammers will tension springs 222 connected to a cross rod 223, supported by the machine frame, and the pawls 213 so that when the roller 221 passes out of contact with the arm 220 of the operating frame 218, the springs 222 will carry the hammers into contact with the type plungers 198 and force said plungers against a platen 224, so as to record upon the record strip 200 which is interposed between the platen and the type plungers 198. After the printing blow has taken place, the hammers 211 are slightly retracted by spring pressed plungers 225, which are supported in a cross bar 226 suitably supported by the machine frame. The type carrier 197 of the units book number is not provided with the flange 219 so that said book number type carrier may be operated without affecting the amount type carrier of the highest denomination, which is adjacent to the units book number type carrier. Both the book number type carriers and the amount type carriers are provided with indicator plates 227 bearing a plurality of numerals which are arranged to be exposed singly through a suitable opening 228 as shown in Fig. 1 of the drawings.

The record strip 200 is fed from a supply roll 229, which is mounted beneath the type carriers 198 to a storage roll 230, also suitably mounted below the type carriers (Fig. 11). The strip 200 in passing from the supply roll 229 to the storage roll 230 passes around guide pins 231 and a platen 224. The storage roll 230 has attached thereto one member 233 of a clutch, which member is in the form of a drum. Loosely mounted upon the stub shaft 234, upon which is mounted also the storage roll 230, is the other member 235 of the clutch, as shown in Fig. 12. This member is centrally pivoted upon the stub shaft 234 and carries blocks 236 in which are seated springs 237. These springs normally force rollers 238 into contact with the inner surface of the clutch member 233 and inclined portions of the blocks 236, so that when member 235 of the clutch is rotated clockwise, as shown in Fig. 12, the rollers 238 will impinge against the inner surface of the member 233 and the inclined portion of the blocks 236 carried by the clutch member 235, and thereby move the member 233 and the storage roll 230 in a similar or clockwise direction. Upon the return of the member 235 the rollers 238 slide idly along the inner surface of the member 233. Pins 239 project from the clutch member 235 into recesses 240 of the rollers 238 and are simply used for mounting the rollers 238 preparatory to connecting the driving member 235 with the driven member 233 of the clutch.

A block 241, similar to the blocks 236 carried by the driving member 235 of the clutch, is mounted upon the frame work of the machine and is provided with a roller 242 which plays between the inner surface of the driven member 233 of the clutch and an inclined portion 244 of the block. The portion 244 of the block 241 is inclined similarly to the corresponding portions formed upon the blocks 236 carried by the driving member. The purpose of this block and roller is for retaining the driven member 233 and the storage roller 230, to which it is connected, in its advanced position, against the possibility of the driving member 235 returning the driven member upon the return movement of said driving member.

The driving member 235 is provided with a roller 245 with which the forked portion 246 of a lever 247 is arranged to engage. This lever is mounted upon a stud 248 projecting from the machine frame and has fastened thereto one portion of a bell crank lever 249, which is also pivoted upon the stud 248. The upper end of the vertical arm of the bell crank 249 is connected to one end of a link 250, the other end of which is connected to one of the restoring levers 251 which is provided with the arms 132 and 157, as shown in Fig. 17, for operating the restoring frame for the actuators. From this it will be seen that the bell crank 249, shown in Fig. 12, will be given an invariable excursion upon each operation of the machine and the fork lever 246, which is connected to said bell crank 249, will actuate the driving member 235 of the feeding clutch. The recess of the forked member 246 of the lever 247 is much larger than the roller 245 of the driving member so that said driving member 235 may have a variable movement for the purpose to be now described.

Resting upon the storage roll 230 (Fig. 11) is one end of an arm 252 which is mounted upon a stud 253 projecting from the machine frame and connected by a sleeve 254 to a similar arm 255, see Fig. 12, the upper end of which normally rests beneath the edge of a forward extension of the driving member 235, which carries the roller 245. From this it will be seen that as the driving member 235 is repeatedly actuated by the fork member 246 of the lever 247, the storage roll 230 will be gradually increased. As this storage roll 230 increases in diameter it will force the upper end of the arm 252 in a clockwise direction, shown in Fig. 11, while the arm 255, shown in Fig. 12, will be moved in an anticlockwise direction so that upon the return of the driving member 235, the said member will be arrested in different positions by the arm 255. The free end of the arm 252 is held in contact with the storage roller 230 by a spring 256, the ends of which are attached to the arm 255 and the driving member 235. This spring 256 also returns the driving member until arrested by the arm 255. It will be seen by this variable movement of the driving member 235, which movement is controlled by the size of the storage roll 230, that the record strip will be fed the same amount upon each operation of the machine.

An inking ribbon 257 is interposed between the record strip 200 and the type plungers 198. The ends of this ribbon are attached to spools 258 and 259, the rotation of which spools is automatically reversed when the ribbon is nearly exhausted from one of said spools. The specific mechanism employed for automatically reversing the feed of the ribbon will not be described as it will not be claimed in this application, it being sufficient to state that the ribbon is fed from one spool to another and that any of the well known devices for accomplishing this purpose may be used instead of the particular device shown.

Additional devices are provided for elevating the type hammers 211 so that in case the springs of the plungers 225 (Fig. 11) become weak and ineffective, the type hammers 211 will be moved so as not to interfere with the type plungers during the positioning of the type carriers. Pivoted upon a stub shaft 525 projecting from a frame 526 of the printing mechanism is a plate 527 (Figs. 11 and 12) having projecting therefrom a rod 528 which lies normally below a shoulder 529 formed upon each of the type hammers 211. This plate 527 is also provided with a pin 530 projecting from the opposite side of the said plate 527 from that in which the rod 528 projects, and this pin plays in a forked portion 531 of one arm of a bell crank lever 532, the other arm being provided at the end thereof with an elongated slot 533, in which extends a pin 534 projecting from the bell crank 249. This bell crank, as described in connection with the record strip feeding mechanism, is given an oscillatory movement at each operation of the machine, and at the beginning of the operation of the machine it is moved in an anti-clockwise direction (Fig. 12) and through the slot and pin connection 533 and 534 rocks the bell crank 532 in a clockwise direction, which bell crank, through the forked portion 531 of the same and pin 530 will rock the plate 527 in an anticlockwise direction, so that the rod 528 projecting from said plate will contact with the shoulders 529 of the type hammers 211 and slightly elevate said type hammers. After the type carriers have been positioned, the bell crank 532 will be returned to its normal position, thereby permitting the rod 528 carried by the plate 527 to move out of engagement with the shoulders 529 of the hammers 211, so as not to obstruct the printing blow of said hammers, as previously described. This plate 527 is provided with an enlarged recess 535 into which extends a pin 536 projecting from the printer frame so as to limit the movement of said plate.

*Book-printer.*—While this mechanism is primarily designed for printing upon an inserted book, yet it is to be understood that it is not to be limited for this specific purpose but may print upon any form of record material which may be placed in the holder therefor.

As shown in Figs. 1 and 8, each of the books 260 has a serial number and is divided into columns having suitable headings, in which columns the different entries are made, so as to indicate whether the depositor has paid money into the association or received money therefrom and the date of the transaction. A third column is provided in which the balances are entered. In alinement with the amount entries as they are made upon the book is printed the date of same, which date is printed in the column headed by the serial number. As each book has a serial number printed thereon, it is not necessary to print this number with the amounts entered in the book, but the number of each book is set up by the book number keys 1, which number is printed on the record strip, (Fig. 9) as previously described, to identify the amounts entered in alinement therewith. From the record strip the various amounts shown thereon may be posted readily without danger of mistake.

The amount type carriers 261 (Figs. 5 and 6) for printing upon the books are in the form of pinions and are mounted upon a transverse rod 262 which is suitably supported in the machine frame. Meshing with these type carriers 261 are segments 263 which are mounted upon the heretofore described shaft 185. These segments are connected by links 264 to arms 265 secured to the shafts 189, which shafts, as previously described, are rocked differentially under the control of the actuators 23.

After the amount type carriers 261 have been positioned a holder 266 for the book is rocked from a substantially vertical to an inclined position so as to bring the book in juxtaposition to the type carriers 261, after which a platen 267 is operated to take an impression upon said book from the type carriers 261. The book-holder 266 has a supporting plate 268 (Figs. 3, 5 and 10) which plate is fastened to arms 268' which in turn are loosely mounted upon a transverse rod 269. Projecting forwardly from the arms 268' are extensions 270 to which are connected the upper ends of links 271, the lower ends of said links being connected to arms 272 projecting forwardly from a rock shaft 273. As previously described, secured to this shaft 273 is a forked lever 274 (Figs. 2 and 3) the prongs 275 and 276 of which are equipped with rollers 277 and 278 respectively. These rollers engage with cams 279 and 280 respectively, which are secured to the main operating shaft 69. Pivotally mounted as at 281 to the back plate 268 (Fig. 10) is a spring operated clamping plate 282 which is normally forced into contact with said back plate 268. A tab 283 of the clamping plate 282 extends on the opposite side of the pivotal point 281 from said clamping plate 282, by which means the said plate 282 is operated, when it is desired to insert a book 260 to have an item entered thereon from the type carriers 261. The back plate 268 is provided with a recess 284 through which the platen 267 projects in taking an impression upon the book from the type carriers. The clamping plate 282 is also cut out so that the book may be forced against the type carriers by the platen 267. The clamping plate 282 is provided with pointers 285 which point to the line upon which the entry is to be made upon the book. The book plate 268 is provided with guide strips 286 against which the book contacts when said book has been properly inserted within the holder. It is, of course, to be understood that two machines are to be used, one by the paying and one by the receiving teller. These guide strips 286 are located in different positions upon the different machines so that the entries may be made in their proper columns. After the book has been inserted in the holder 266 and the operation of the machine begun, the cam 280 (Fig. 2) will engage with a roller 278 and rock the lever 274 in an anti-clockwise direction, which movement, through the links 271, will rock the holder 266 (Fig. 3) in a similar direction about the rod 269 so as to bring said holder into operative relation with the type carriers 261. After the type carriers 261 have been properly positioned and the book holder 266 brought into operative relation thereto, the platen 267 will be released to take an impression from said type carriers. This platen is supported in the upper end of a forked arm 287 (Figs. 5 and 10) which is loosely mounted upon the rod 269. This arm 287 extends forward of the rod 269 and is provided with pins 288 and 289. The pin 288 is normally held in contact with a shoulder 290 formed upon the upper end of a lever 291, which is centrally pivoted upon the rock shaft 273, by a spring 292, one end of which is secured to an arm 293 secured to the lever 291 at its pivotal point, while the other end of said spring is attached to the pin 288. Near the end of the operation of the machine a pin 294 (Fig. 5) projecting from the cam 280, contacts with the lower end of the supporting lever 291 and rocks said lever in an anti-clockwise direction so as to withdraw the shoulder 290, formed upon the upper end of said lever, from engagement with the pin 288 projecting from the arm 287, which movement will permit the spring 292 to rock the arm 287 carrying the platen 267 in an anticlockwise direction so the latter may take an impression upon the book 260 from the type carriers 261. After an impression has been taken upon the book 260, the cam 279 (Fig. 2) will engage with the roller 277 and rock the forked lever 274 in a clockwise direction, which movement will be conveyed to the book-holder 266 (Fig. 3) by the link 271 so as to return said book-holder to its normal position. The back plate 268 of the book-holder is provided with a bumper 295 (Fig. 5) which contacts with the arm 287 carrying the platen 267 and thereby returns said arm and platen upon the return movement of the book-holder. This bumper 295 normally holds the platen 267 from the back of the book 260, when said book is inserted in the holder, but there is sufficient give to said bumper, so that, when the platen 267 is released after the book-holder has been positioned, the said platen will contact with the back of the book and force the said book in contact with the type carriers. The pin 289, which projects from the forward extension of the platen arm 287, plays in a slot 296 formed near the rear end of a pitman 297, the extreme rearward end of which is forked and straddles the rod 269, the forward end of said pitman being connected to the lower end of an alining frame 298 which is centrally pivoted as at 299 upon the frame work of the machine. The shape of the slot 296 formed in the pitman 297 is such, that when the platen rocks in an anti-clockwise direction to take an impression from the type carriers, the said pitman will be moved forwardly, which movement will rock the upper end of the alining frame 298 into engagement with the type carriers 261, thereby properly alining said type carriers previous to the taking of an impression from said carriers by the platen. When the platen is returned, as previously described, and the pin 288 reaches its normal position the spring 292 will draw the shoulder 290 of the lever 291 under said pin and lock said platen in its elevated position, as shown in several figures of the drawings.

In nearly all types of accounting machines, it is desirable when an amount employing the type carriers of the lower denominations is recorded to eliminate the zeros to the left of said amount up to the capacity of the machine, or print some arbitrary character which will, to a considerable degree, prevent the possibility of raising the amount entered, and it is clearly equally desirable when an amount employing one of the type carriers only of higher denomination is entered in the book to print the zeros to the right thereof, so as to prevent any possibility of mistake in reading the amount entered, and to accomplish these desirable features the following mechanism is provided: The type carriers 261, as shown, have twelve spaces, only eleven of which are brought into use, the twelfth space being provided merely for the purpose of economy in manufacturing, as dating type carriers of the same pitch and diameter are provided, which have twelve characters and the amount and dating type carriers are produced simultaneously upon the same machine in the manufacture of said type carriers. In this particular machine, the first three amount type carriers have zeros in normal printing position, while the next three type carriers have arbitrary characters in alinement with the zeros of the first three type carriers, the last carrier having the character "$" also, which characters will be printed if the machine is operated without depressing an amount key. If the extreme left hand type carrier shown in Fig. 7 is moved to bring one of the other characters thereon into printing position, it will control the two type carriers to the right thereof, to bring the zero characters on said type carriers into printing position, while if the second type carrier from the left in said figure is operated the arbitrary character on the extreme left carrier will remain in position and the zero of the type carrier to the right thereof will be brought into printing position.

It will be noticed by reference to the drawings that the zero characters of the type carriers, which are arranged to be brought into printing position when an amount of higher denomination is recorded, are upon the opposite side of the arbitrary characters, which normally stand in printing position, from that of the digit 1 characters, and in order to bring these zero characters into printing position, these type carriers are moved in an opposite direction from that in which they are moved when any of the other digits are to be recorded.

The two segments 263 which operate the type carriers 261 of the two highest denominations, that is, the hundreds of dollars and the thousands of dollars type carriers, have extensions 300 with camming portions 301. In Fig. 6 the machine is shown as partially operated with the segment for actuating the hundreds of dollars type carrier in an adjusted position, while the tens of dollars and thousands of dollars segments are in their normal position. This movement of the hundreds of dollars actuating segment 263 will rock a lever 302 in a clockwise direction, about a pivotal rod 303, against the tension of a spring 304, which spring is connected to the lower end of said lever and to the machine frame. There is a lever 302 for each of the extensions 300 and each of these levers 302 has mounted thereon a centrally pivoted pawl 305. The downward extensions of these pawls are normally in the path of a rod 306 projecting from the upper end of a lever 307 which is centrally pivoted upon the rock shaft 273. The lower end of this lever carries a roller 308, which is normally held into contact with the periphery of a cam 309, secured to the shaft 69, by a spring 310, which is coiled about the shaft 273 and has its ends secured to the arm 293 and the lever 307, as shown in Figs. 5 and 6. When either of the hundreds or thousand dollars type carriers have been moved by the segments, the cam portion 301 of the extension 300 will rock its companion lever 302 in a clockwise direction, so that, when the pawl 305 carried by said lever 302 is rocked by the rod 306 of the lever 307, the upper end of said pawl will contact with a pin 311 carried by the segment 263 for actuating the type carrier of the next lower denomination, and move said segment a sufficient distance in the opposite direction from which it is normally moved, so as to bring the zero character of the type carrier actuated by said segment into printing position. Upon the movement of the segment 263 for actuating the thousands dollar type carrier the lever 302 rocked thereby will, through a pin 312, contact with the lever 302 coöperating with the actuating segment of the next lower denomination and rock said lever so that the pawls carried by both of said levers will be rocked sufficiently by movement of the rod 306 to rotate the actuating segments for the hundreds and the tens of dollars type carriers one space, thereby bringing the zero characters of said type carriers into printing position. The tens and hundreds of dollars type carriers as shown are the only ones which are adjusted to bring the zero characters to printing position by the type carriers of higher denomination, but it is to be understood that the other type carriers, if desired, may be similarly adjusted. As previously stated, in bringing the zero characters of the tens and hundreds of dollars to printing position, the actuating segments therefor are moved in an opposite direction from that in which they are moved when actuating their type carriers to bring the digits one to nine to printing position, and in order to permit this movement of the actuating segments independent of the shafts 189, the links 264 are connected to the arms 265 by springs 313, which as plainly shown in Fig. 6 permits this independent movement of the segments 263.

The lever 307 is given an invariable extent of movement at each operation of the machine, and if the segments 263 for actuating the hundreds and thousands of dollars type carriers have not been moved, the pawls 305 carried by the levers 302 will be slightly actuated by the rod 306 of the lever but not enough to move the segments of the adjoining type carriers.

With this construction it will be seen a single platen may be employed for taking an impression from the type carriers without printing undesirable characters to the left of an amount recorded, thereby doing away with the individual hammers for the type carriers and numerous parts controlling the actuation thereof. This type of printing mechanism may also be employed in the recording of items upon the record strip.

When the segments 263 are returned to their normal position, the levers 302 will be forced by the springs 304 into contact with the reduced portion of the extension 300 of the segments 263, thereby carrying the ends of the pawls 305 out of the path of the pins 311 carried by said segment. This movement of the levers 302 on to the reduced portion of the extensions 300 occurs during the last increment of movement of said segment.

While it is not broadly new to provide a type carrier with more than ten spaces so as to eliminate the printing of undesirable characters, in all instances of which applicant is aware, these type carriers were moved in the same direction to bring any one of the characters thereon into printing position. With applicant's construction the zero characters are brought into printing position by moving the type carriers in an opposite direction from that in which they were moved when the other digits are to be recorded, and applicant desires to claim this feature of the invention broadly and not to be limited to the mechanism shown, which mechanism is shown only as a preferred form for accomplishing this object.

Adjacent to the amount type carriers 261 is located a frame 314, which is supported by the rod 262 and a similar rod 315 (Figs. 3 and 7). Within this frame are mounted type carriers 316 for recording the date upon the book in connection with the amount. These type carriers are similar to the amount type carriers and are in the form of pinions, which mesh with pinions 317 having characters thereon corresponding to the characters carried by the dating wheels 316. These characters may be seen through an opening 318 in the cabinet 37 (Fig. 1) and through which opening the dating wheels 316 may be altered by manipulating the pinions 317. Also mounted in the frame 314 are spring pressed retaining pawls 319 which are mounted upon a rod 320 carried by said frame, and which engage with ratchet wheels 321 secured to the pinions 317 so as to prevent accidental movement of said pinions and the dating wheels 316 with which they mesh. This frame has pivoted thereto a latching lever 322 which is notched so as to engage with annular grooves 324 formed in the rod 315. This frame 314 carrying the dating wheels may be adjusted laterally on the rods 262 and 315 relative to the amount type carriers 261, which, in connection with the guide strips 286 (Fig. 10) which also may be adjusted upon the back plate 268, enables any one of the machines to print in the different columns upon the book 260. With this adjustment of the guide strip and the frame carrying the dating type carriers a single machine may be used for recording the amounts deposited and withdrawn if either one of the machines should become inoperative. Where the single machine is used for the dual purpose of entering deposits and withdrawals, the totalizers would not be taken into consideration but the desired information would be obtained from the record strip whereon would be printed opposite each amount a suitable character designating whether the amount was paid in by the depositor or received from the bank by him. The lever 322 on the frame 314 and the grooves 324 in the rod 315 are for the purpose of latching the frame 314 in its adjusted position.

The opening 318 shown in Fig. 1 is formed in a hood portion 325 of the cabinet 37, which hood covers the dating and amount type carriers for printing upon the book. This hood also covers a special counter 326 (Fig. 7) which is suitably supported beneath said hood and is actuated upon each operation of the machine by a multi-prong pawl 327 through a link 328 (Fig. 3) which is connected to the rock shaft 273. This counter is used, as is well known, for simply recording the number of operations or entries made upon the machine.

An inking ribbon 329 with its ends attached to spools 330 is fed between the type carriers and the bookholder by a novel form of mechanism which automatically reverses the movement of said ribbon, but as this form of feeding mechanism for the ribbon is not claimed in this application, it is not thought necessary to describe same as any other well known form of feeding devices for the inking ribbon may be employed. This ribbon 329, as shown in Figs. 3 and 5, is of two colors, the joining line of which is in the center of the type characters which are in printing position so that the characters recorded upon the book will be in two colors, thereby rendering it difficult fraudulently to alter the figures recorded on the book.

*Totalizing mechanism.*

Under this heading will be described the mechanism for printing a record of the total shown on either totalizer and leaving the totalizer clear, or retaining the total on said totalizer, the latter being commonly known in the art as a taking of a "subtotal" while the former is known as the taking of a "grand total." This totalizing mechanism includes manipulative devices which control the recording of the sub and grand totals, and also controls the positioning of type carriers to indicate the recording of either the sub or grand total and also the totalizer from which it is obtained.

In Fig. 1 manipulative devices 331 are shown as projecting through a cover 332, which cover is normally locked so as to prevent operation of said devices. When the cover 332 is unlocked and moved from over the manipulative devices 331 it discloses a plate 333 (Fig. 25) having slots 334 and 335 through which the said manipulative devices extend. The manipulative device which controls the recording of the sub and grand total from the daily totalizer, which is the front totalizer shown in the machine, normally stands in the center of the slot 334 and when it is desired to record a subtotal, the manipulative device 331 is moved forwardly toward the words, "Read daily total" and the machine then operated, which operation will record the total shown on the front totalizer on the record strip, and through the indicator plates 227, carried by the type carriers 197 for recording upon the record strip, the amount of said subtotal may be read through the opening 228 of the cabinet 37 as shown in Fig. 1. When it is desired to obtain a grand total of the daily totalizer the manipulative device projecting through the slot 334 is moved rearwardly and the machine operated, which operation will print the daily total and also clear or reset the totalizer. The manipulative device 331 coöperating with the grand totalizer controls the recording of the totals therefrom in identically the same way as the manipulative device for the daily totalizer.

In some associations it is desirable to have the grand totalizer represent the amount of withdrawals or deposits for a certain length of time, such as six months or a year, in which case the index plate 333 has a lock 333ª (Fig. 25) attached thereto, the bolt 334ª of which passes in the rear of the manipulative device 331, which controls the recording of the sub and grand totals from the grand totalizer. By this method it will be seen that the grand total is prevented from being taken from the grand totalizer by the taking of which the said totalizer would be cleared or reset to zero. The keys to this lock are to be placed in the custody of the auditing committee of the association under whose supervision the grand total is taken.

Referring now to Figs. 20 and 23, it will be seen that the manipulative devices 331 are mounted upon studs 336 projecting from intermediate supporting frames 337 of the machine, and have at their pivotal points secured thereto levers 338 which carry at their extreme ends rollers 339 and 340. When it is desired to record a subtotal of the daily totalizer, the upper end of the right hand manipulative device 331 is moved forwardly, which movement of said manipulative device will, through the roller 339, rock a bell crank lever 341 clockwise about a stud 342 projecting from the intermediate frame 337. The extreme rearward end of the bell crank lever 341 is forked and straddles a roller 343 projecting from a lever 344, which is pivotally mounted upon a stud 345 secured to the frame 337, and thereby rock said lever 344 in a counter clockwise direction. This lever 344 has a roller 346 projecting laterally therefrom, which roller, as the lever 344 is moved, comes in contact with a downwardly extending prong 347 of a three-pronged lever 348 which is also mounted upon the stud 345. The prong 347 of the lever 348, as the latter is rocked, will contact with a pin 349 projecting laterally from the downwardly extending arm of a lever 350 which is centrally pivoted upon the stud 345 (Figs. 20 and 21). The upper end of this lever 350 is connected to the forward end of a slide 351, which is supported by arms 352 of bell crank levers 353, which, as shown in Fig. 22, are pivoted upon one of the intermediate frames 337. The other arms 354 of the bell cranks 353 are secured to links 355, the extreme rearward ends of which are forked so as to straddle studs 356 projecting upwardly from the forward ends of centrally pivoted levers 357. The rearward end of the lever 357 appropriate to the daily total lever 331 has pin 358 that projects through a longitudinal slot 359 formed in the enlarged head of the lever 118, which lever is used for shifting the daily totalizer into and out of engagement with the actuators 23. This enlarged head of the shifting lever 118 is provided with a cylindrical recess in which the previously mentioned elongated roller 122 plays. This roller 122 is provided with an annular groove 360 into which projects the pin 358 extending from the rear end of the lever 357. From this description of the movement of the manipulative device 331 for the purpose of recording the subtotal of the daily totalizer, it will be seen that the slide 351 supported by the bell cranks 353 will be moved forwardly, which movement will rock said bell cranks (Fig. 22) in an anticlockwise direction and thereby shift the link 355 to the right. This movement of the link 355, through the forked end thereof engaging the stud 356, will rock the lever 357 and withdraw that portion of the roller 122, which stands normally in the cam slot 123 of the disk 124, from out of said cam slot, so that upon the rotation of the main operating shaft 69 carrying the disk 124, the throwing lever 118 of the daily totalizer will not be moved, and consequently the elements 110 of said totalizer will remain in mesh with the actuators during an operation of the machine. When the lever 344 is rocked (Fig. 20) by the forward movement of the manipulative device 331 an upward extending portion 361 of said lever will draw a link 362 forwardly. The rear end of this link is connected to the lower end of a lever 363, which is centrally pivoted upon the rock shaft 47. The upward extension of the lever 363 is provided with a roller 365, which normally contacts with an arm 366 secured to the shaft 47, so that when said lever 363 is rocked, by the operation of the manipulative device 331, the shaft 47 will also be rocked. This shaft as described in connection with the keyboard mechanism has downwardly extending arms 46, which have forward extensions 367 (Figs. 2 and 14) that engage with the underside of the pins 42 projecting from the zero stops 43. Upon the rocking of this shaft 47, as previously described, these extensions 367 will elevate the zero stops 43 so that the actuators 23 are free to move upon the operation of the machine, which movement of the actuators will continue until the enlarged teeth 164 of the totalizer elements come in contact with shoulders 368 (Figs. 2 and 17) of the trip pawls 165. As these totalizer elements are normally advanced in the opposite direction from which they are rotated in the resetting of a totalizer, it will be seen that the said elements will be returned to their normal zero position, which is with the enlarged teeth 164 in contact with the shoulders 368, the distance they are advanced from zero position. The engagement of the enlarged teeth 164 with the shoulders 168 will arrest the wheels 110 at zero and also serve to arrest the actuators in positions representing the amount cleared from the totalizer. After the positioning of the actuators by the returning of the totalizer elements 110 to normal position the hook arms 151 fast to the shaft 78, will adjust the strip printing type carriers 197 and the book printing type carriers 261 proportionately, but as no book is inserted in the holder 266 at this operation no record will be obtained from the book printing type carriers 261, while the total will nevertheless be recorded upon the record strip 200 by the hammer operating devices as described under the heading of the recording mechanism. As the roller 122 carried by the throwing lever 118 is still out of the cam groove 123 of the disk 124, the totalizer elements 110 will be restored to the previous position upon the return of the actuators 23 to normal position by the restoring bar 136. The rocking of the shaft 47 (Figs. 2, 14 and 20) by the operation of the manipulative device 331, will carry the rod 45, which is supported by the arms 46, over the extension 40 of the levers 18 which supports the rear ends of the latching plates or detents 15, and thereby prevent the rocking of the levers 18 in an anti-clockwise direction and consequently prevent the operation of the keys 1 and 2.

As it is desirable to prevent the necessity of holding the manipulative device 331 in its adjusted position by the operator during the operation of the machine, the downward extension of the bell crank 341 (Fig. 20) is constructed to pass in front of a lug 369, projecting from an arm 370, secured to a rock shaft 371, suitably mounted in the frame-work of the machine. During the operation of the machine a cam 372 (Fig. 19) by contacting with a roller 373 projecting from the horizontal arm of a bell crank lever 374, will rock said bell crank in a counter-clockwise direction, which movement will move a slide 375 forwardly. At its forward end this slide is forked and straddles the rock shaft 371 and also near its forward end is provided with a finger 376, which, as said slide is moved forwardly, contacts with a pin 377 (Fig. 20) projecting from an arm 378 secured to the shaft 371, and thereby rock said shaft, which movement will carry the lug 369, projecting from the arm 370, in the rear of the bell crank 341 and hold said bell crank into its adjusted position. This bell crank, near the end of the horizontal arm, is provided with a hook portion 379, which hooks over the roller 339 of the lever 338 secured to the manipulative device 331 and thereby holds said manipulative device in its adjusted position. In the operation of the machine in which items are entered upon the totalizers, the shaft 371 will be rocked in a manner similar to that just described and the lug 369, projecting from the arm 370, will pass in front of the downward extension of the bell crank 341 and thereby prevent the operation of the manipulative device 331 during the operation of the machine. The shape of the cam 372 (Fig. 19), which rocks the shaft 371, is such that the shaft is not permitted to return to its normal position until the very end of the operation of the machine, when said shaft will be returned by a spring 380, which is connected to the frame-work of the machine and to the arm 378.

Mounted upon the stud 342 (Figs. 20 and 23), adjacent to the bell crank 341, is another bell crank lever 381 which is in the path of movement of the roller 339 and, consequently, when the manipulative device 331 is moved forwardly, the said bell crank 381 will be rocked clockwise against the tension of a spring 382 which is coiled about the stud 342. The vertical portion of the bell crank 381 is forked at its upper end and straddles a pin 383 projecting from the actuating arm 384 of an ordinary Veeder counter 385. From this it will be seen that upon each movement of the manipulative device 331 in a forward direction, the counter will be actuated one step and will display the number of times the manipulative device 331 has been moved forwardly to obtain a sub-total from the daily totalizer, which number appears through an opening 386 in the plate 333 (Fig. 25).

When it is desired to record a grand total from the daily totalizer, the upper end of the manipulative device 331 is moved rearwardly in the slot 334, which movement will cause the roller 340, carried by the lever 338 secured to the manipulative device 331, directly to engage the forward prong of the three-prong lever 348 instead of actuating said lever through the roller 346 carried by the lever 344. This direct movement of the three-prong lever 348 will impart a corresponding extent of movement to the centrally pivoted lever 350, the upper end of which is connected to the slide 351, and thereby impart a greater degree of movement to said slide (Figs. 20, 21 and 22). This increased movement of the slide 351, will, consequently impart a corresponding increase in the extent of the movement of the bell cranks 353, which will be sufficient to slide the roller 122, mounted in the enlarged head of the throwing lever 118 for the daily totalizer, into a cam groove 389 of a disk 390 secured to the shaft 69. This cam groove 389 is shown by light broken lines in Figs. 18 and 21, and the shape of said groove is such that the totalizer elements 110 are maintained in engagement with the actuators, while said actuators are free to move in an anti-clockwise direction, as shown in Figs. 2 and 17, so that said totalizer elements may be turned backwardly until the enlarged teeth 164 of said elements are brought into contact with the shoulders 368 of the retaining pawls 165. After the type carriers have been positioned to an extent determined by the movement of the actuators, the cam groove 389 will rock the lever 118 and move the daily totalizer out of engagement with the actuators 23, after which the restoring bar 136 will return the said actuators to their normal position while the totalizers are out of engagement therewith. At the very end of the operation of the machine the lever 118 will be rocked and thereby shift the totalizer elements 110 back into engagement with the actuators.

The bell crank 341 (Fig. 20) is moved in a clockwise direction when the manipulative device is moved rearwardly, the same as when said manipulative device is moved forwardly. This is accomplished by the roller 343 which projects from the lever 344 actuated by the roller 340. In the rocking of the lever 344 by the roller 340 a hook portion 391 will pass over the roller 340 and hold said manipulative device in its adjusted position during the operation of the machine, the bell crank 341 and the lever 344 being held by the stud 369, projecting from the arm of the rock shaft 371, which passes in the rear of the downward extension of the bell crank 341. The release of this manipulative device 331 occurs at the last part of the operation of the machine, as previously described in connection with the recording of the subtotal.

A spring 392 (Figs. 20 and 23) extends from the downward extension of the bell crank 341 to the roll 349 carried by the lever 350, which causes the horizontal arm of the bell crank 341 and the forwardly extending arm of the three prong lever 348 to contact with the rollers 339 and 340 respectively of the manipulative device 331 and thereby resiliently hold the said manipulative device in its central or vertical position.

A bell crank 393 is mounted upon the stud 345 adjacent to the levers 344 and 348 and this bell crank is actuated by the roller 340 when the manipulative device 331 is moved rearwardly. This movement of the bell crank 393 by the roller 340 will actuate a counter 394 of the Veeder principle in a manner similar to that in which the previously mentioned counter 385 is actuated. This counter 394 may be read through an opening 395 formed in the plate 333, and displays the number of times a grand total has been recorded of the daily totalizer.

The parts coöperating with the manipulative device 331, which controls the recording of the totals from the grand totalizer, are identical with the parts which coöperate with the manipulative device 331 controlling the recording of the sub and grand total from the daily totalizer, and the same reference numerals will be used to identify like parts. With the present arrangement of the totalizers, it is essential that in the recording of the total from one of the said totalizers, the other totalizer be maintained out of operative relation with the actuators, during the operation of the machine, in order to obtain the proper record of the total shown on the totalizer from which it is desired to record the total. It is obvious that if both totalizers remain in engagement with the actuators during the recording of a total, a wrong total would be recorded, because the amount shown on the grand totalizer is the accumulation of the totals of the daily totalizer and therefore differs from the amount on the daily totalizer after the first day's business.

As previously described in connection with the recording of the subtotal and the grand total from the daily totalizer, the lever 344 mounted upon the stud 345 will be rocked in an anti-clockwise direction, which movement, through the link 362, will rock the bell crank 363, loosely mounted upon the rock shaft 47, in a clockwise direction (Fig. 20). This bell crank 363 (Fig. 24) has connected thereto at its pivotal point, one end of a sleeve 396, the other end of said sleeve being provided with an extension 397 (Figs. 20, 21 and 24). This extension has pivoted thereto the upper end of a link 398, the lower end of which is provided with a pin 399 that plays in an elongated slot 400 of an arm 401 secured to a rock shaft 402 which is supported by arms 403 that in turn are supported by the main operating shaft 69 and the rock shaft 78. This shaft 402 has extending downwardly from one end thereof an arm 404 which is connected to a centrally pivoted lever 405 by a link 406. This lever 405, at its free end, is provided with a roller 407 which plays upon the periphery of a cam 408 secured to the main operating shaft 69. This lever 405 is mounted on one of the arms 403 previously mentioned. From this it will be seen that the shaft 402 is rocked upon each operation of the machine. Adjacent to the arm 401 is a hook arm 409 which is loosely mounted upon the shaft 402. One end of a yoke 410 (Fig. 24) is secured to the arm 409 and the other end of said yoke is connected to an upwardly extending arm 411 which is also loosely mounted upon the shaft 402. The upper end of this arm 411 normally rests in contact with a pin 412 (Figs. 20 and 21) extending from the slide 351 controlled by the manipulative device 331 of the grand totalizer. Now, when the manipulative device 331, which controls the daily totalizer, is moved either forwardly or backwardly the lower end of the link 398, carrying the pin 399, will be lowered so that said pin 399 will connect the arm 401 fast to the shaft, with the hook arm 409 loose on said shaft, so that when the said shaft 402 is rocked by the cam 408 the upwardly extending arm 411, connected to the hook arm 409 will move the slide 351 of the grand totalizer forwardly. This movement does not occur until the cam 127, which operates the throwing lever 118 for the grand totalizer, has moved said totalizer out of operative relation with the actuators, and also after the said actuators have been positioned by the return of the elements 110 of the daily totalizer to zero position. This forward movement of the slide 351, cooperating with the grand totalizer, will shift the roller 128 (Fig. 22) from the disk 127 into a cam groove 413 of a disk 414 secured to the main operating shaft 69. This shifting of the roller 128 occurs while the grand totalizer is disengaged from the actuators and said roller is moved into that portion of the cam groove 413 which retains the totalizer out of operative relation with the actuators until the very end of the operation of the machine. At the end of the operation of the machine the daily totalizer manipulative device 331 is released and restored to its normal position by the spring 392 (Fig. 20). The slide 351, which controls the disengaging of the grand totalizer and actuators is returned to its normal position by a spring similar to the spring 392, which spring, as shown in Fig. 23, is connected to the levers 341 and 350, the latter being connected to said slide 351. Upon the movement of the manipulative device 331, which controls the recording of the different totals from the grand totalizer, the right hand bell crank lever 363, as shown in Fig. 24, will be rocked, and, through the sleeve 396 and extension 397 will lower the link 398 connected to said lever. The pin 399 extending from the lower end of the link 398 will connect the right hand arm 401 (Fig. 24) which is fastened to the shaft 402, to a hooked lever 415 which is centrally and loosely pivoted upon the shaft 402. Upon the operation of the shaft 402 by the cam 408, as previously described, this hooked lever 415 will be rocked with said shaft, so that the upper end of said lever which engages with a pin 412 projecting from the slide 351 that controls the daily totalizer will move said slide forwardly. This movement of the slide 351 of the daily totalizer, will, through the bell cranks 353 and intervening connections, shift the roller 122 out of engagement with the cam groove of the disk 124 and into engagement with the cam groove 389 of the disk 390. This shifting of the roller 122 occurs similarly to the shifting of the roller 128 which is actuated by the cams 127 and 414, that is, the roller 122 is shifted to that portion of the cam 390 which will maintain the totalizer out of operative relation with the actuators until the end of the operation of the machine.

It is necessary to provide some mechanism for identifying whether a total is a subtotal or a grand total and from which totalizer it is recorded, and in the construction disclosed a single type carrier is provided which is adjusted differentially in opposite directions by the operation of the manipulative devices 331, but it is to be understood that this part of the invention is not to be limited to this precise construction, as instead of a single type carrier, individual carriers may be provided which are brought into printing position under the control of these manipulative devices and instead of providing a single manipulative device for recording a total and sub-total from the totalizer, independent manipulative devices may be provided, the operation of which would control the functions for which it is intended.

The manipulative device 331, which controls the recording of the sub and grand total from the daily totalizer, as previously explained, rocks the three-pronged lever 348 different distances depending upon whether said manipulative device is moved forwardly or rearwardly. On the forward movement of said manipulative device (Fig. 20) the three-pronged lever 348 will be rocked in a counter-clockwise direction through the intervention of the roller 346 carried by the lever 344, and when said manipulative device is moved rearwardly, the roller 340 contacts directly with the forward prong of said lever and thereby moves the lever 348 a greater distance than it is moved when the manipulative device is moved forwardly. This differential movement of said lever 348 is used for setting the special type carrier to indicate the kind of total and the totalizer from which said total is recorded. Connected to the rear prong of the lever 348 (Fig. 20) is a lower end of a link 416, the upper end of which is provided with an elongated slot 417 through which extends the rock shaft 47. Near its center this link is provided with an inverted L shaped slot 418, in the elbow of which normally rests a roller 419 projecting from the lower end of a lever 420, which is centrally pivoted upon the rock shaft 47. The upper end of this lever has a pin 421 projecting therefrom, which extends into the lower forked portion of a lever 422, which is fastened at its upper end to the shaft 34 which supports the metal plates 33 carrying the indicators 35. Near its right hand end this shaft 34 has extending downwardly therefrom (Figs. 11 and 13) an arm 423, which is connected to a special type carrier 424 by a link 425. The elongated portion of the L shaped slot 418, formed in the link 416, is formed at an angle to the direction of movement of said link, so that the differential movement imparted to the link 416 by the forwardly and rearwardly movement of the manipulative device 331 will rock the shaft 34 differentially, which will bring type blocks or plungers 426 and 427 into printing position to record characters designating a subtotal or a grand total of the daily totalizer. At the top of Fig. 9 is recorded the sum of $870.90, which is the total of the entries shown on the strip 200 in said figure, and at the extreme left hand side of the strip and in alinement with the total, are the characters D-R.D., which stand for daily read of the daily totalizer or the subtotal thereof. When the grand total of the daily totalizer is recorded, the characters D-R.S. will appear opposite the total, which characters will stand for daily reset of the daily totalizer.

Connected to the rearwardly extending prong of the three-pronged lever 348, which is controlled by the manipulative device 331 of the grand totalizer, is a link 428, (Fig. 21) which is similar to the previously described link 416. This link is provided with elongated slot 429 at its upper end, through which the rock shaft 47 extends. This link is also provided, near its center, with an inverted L-shaped slot 430, which is similar to the slot 418 formed in link 416. A pin 431 normally rests in the elbow of the slot 430, which pin projects from the downward extension of a lever 432, which is centrally pivoted upon the rock shaft 47. When the manipulative device 331 of the grand totalizer is pulled forwardly to control the taking of a subtotal from said totalizer, the link 428 will be partially elevated, which movement, through the slot 430 and pin 431, will rock the lever 432 in a clockwise direction. This lever is provided with a pin 433 at its upper end, which pin plays in the forked portion of an arm 434 which is secured to the shaft 34 similar to the arm 422 shown in Fig. 20, and which is described in connection with the manipulative device 331 controlling the daily totalizer. The movement of the lever 432 in a clockwise direction, will rock the shaft 34 in an anti-clockwise direction, as shown in Figs. 13 and 21ª, which movement, through the arm 423 and link 425, will position the special type carrier 424 to bring a type plunger 435 carried thereby into printing position, the latter position being designated by the arrow shown in Fig. 13.

In the taking of a grand total from the grand totalizer, the manipulative device 331 therefor is moved rearwardly, which movement will rock the three-prong lever 348 coöperating therewith a greater extent than when the manipulative device is moved forwardly. This movement of the grand totalizer manipulative device 331 is identical with the operation of the manipulative device 331 coöperating with the daily totalizer, when this latter manipulative device is moved rearwardly to take a grand total from the daily totalizer. The additional movement imparted to the lever 348 by the rearward movement of the grand totalizer manipulative device, will, through the link 428 and the vertical portion of the L shaped slot 430 formed therein, move the lever 432 a greater distance than when rocked by forward movement of the total manipulative device 331. This additional rocking of the lever 432, will, through the arm 434 (Fig. 21ª), shaft 34, arm 423 (Figs. 11 and 13), and link 425, move the special type carrier 424 a corresponding distance, and thereby bring a special type plunger 435ª into printing position, which is designated by the arrow in Fig. 13. This type plunger 435ª is provided with suitable characters which differentiate the grand total from the subtotal of the grand totalizer.

The slots 418 and 430 of the links 416 and 428 respectively (Figs. 20 and 21) are inclined at different angles with the horizontal portion of said slots extending in opposite directions. The object of this is to prevent simultaneous operation of manipulative devices 331. When one of these manipulative devices 331, say, for instance, the one controlling the daily totalizer, is moved, the link 416 will be elevated and through the cam slot 418 rock the lever 420 in a clockwise direction which movement, through the arm 422, will rock the shaft 34 as shown in Fig. 21ª in a clockwise direction also. This movement of the shaft 34 will, through the arm 434, rock the lever 432 (Figs. 21 and 21ª) in an anticlockwise direction, which movement will carry the roller 431 into the horizontal portion of the slot 430 of the link 428 and thereby prevent the operation of the manipulative device 331 which controls the grand totalizer. Upon the operation of the manipulative device 331 of the grand totalizer, the roller 419 of the arm 420 will be carried into the horizontal portion of the slot 418 of the link 416 and thereby lock the manipulative device 331 of the daily totalizer. When the manipulative device 331 of the grand totalizer is moved forwardly for the purpose of controlling the recording of a subtotal from said totalizer, a counter 436 is actuated in a similar manner to the counter 385 which coöperates with the manipulative device 331 of the daily totalizer. This counter 436 is suitably mounted upon the frame-work of the machine and may be read through an opening 437 formed in the plate 333 (Fig. 25).

A special counter 437ª is suitably secured to one of the intermediate frames 337 adjacent to the special counter 394 (Fig. 23), and this counter is arranged to be actuated in a manner similar to the counter 394, when the total manipulative device 331 of the grand totalizer is moved rearwardly for the purpose of obtaining a grand total from said totalizer. The figures on the counter 437ᵃ may be read through an opening 438ᵃ formed in the index plate 333 (Fig. 25).

Adjustably mounted upon the special type carrier 424 by slot and pins 438 and 439 respectively, is a plate 440, (Fig. 13) which carries two type plungers 441 and 442 having suitable characters for designating whether an amount was received from or paid in to the association by the depositor, that is, when amounts are accumulated and recorded, one of these type carriers, depending upon the purpose for which the machine is used, will normally be in position for recording in alinement with the amounts recorded on the record strip. The plate 440 carrying the special type carriers 441 and 442 is adjustable upon the type carrier 424 and is frictionally held in its adjusted position by a spring pressed pawl 443, which is pivotally mounted upon the type carrier 424, which pawl contacts with one of the pins 439, which projects from the plate 440 carrying the type carriers 441 and 442. It is to be understood that the plate 440 carrying the type carriers, is to be positioned to print a character corresponding to the character which is in position to print upon the inserted book 260, and which character is carried by one of the special type carriers 316 mounted in the frame 314 (Figs. 3 and 7).

The special type carrier 424 is moved directly upon the movement of the manipulative device 331, and as the segmental plates 195, to which the amount and book number type carriers 197 (Fig. 11) are connected, are engaged by the alining frame 205 when the machine is at rest or in normal position, it will be seen that it is necessary to provide the special type carrier with a special aliner, which normally is out of engagement with the said special type carrier 424. This special type carrier 424 has a rack portion 444 (Figs. 11 and 13) between the teeth of which a pin 445, projecting from a bell crank lever 446 (Fig. 26) is moved upon the release of the machine. The downwardly extending portion of the bell crank 446 is forked as at 447 so as to straddle a pin 448 projecting from the upper end of the lever 64 (Fig. 26), which lever, when the push button 53 is operated, will be rocked in a clockwise direction. This movement of the lever 64 will rock the bell crank 446 in an opposite or counter clockwise direction and thereby cause the alinement of the special type carrier 424. This alining lever 446 will remain in this position until near the end of the operation of the machine, when the roller 83 will restore the lever 64 to its normal locking position.

As is well known in the art, in machines of the type wherein the type carriers are positioned for the recording of a total by the resetting of the totalizer elements through the actuators therefor, and wherein the said actuators are given an additional degree of movement for the purpose of effecting the transfer, it is essential, for the correct recording of the total, that the actuators be restored to normal position after a transfer has taken place previous to the recording of the total, which restoration is accomplished by an idle operation of the machine, and to compel this idle operation the following mechanism is employed: Each of the segments 195 (Figs. 11 and 27) to which the book number and the amount type carriers 197 are connected, is provided with an opening 600, the upper wall of which has a cam portion 601. A rod 602 is held in front of the cam portion 601 when the segments 195 and type carriers are in their normal or zero printing position, by spring 603. This rod projects from the horizontal portion of a bell crank lever 604 which is pivoted upon a stud 605 projecting from the machine frame. The downwardly extending portion of the bell crank 604 has a lever 606 centrally pivoted thereon, the lower end of said lever being provided with a shoulder 607, and projecting from the upper end of said lever is a pin 608, to one end of which the spring 603 is connected, while the other end of said spring is suitably secured to the machine frame. This pin normally contacts with the forward edge of the downwardly extending portion of the bell crank lever 604, in which position it is held by the spring 603, as shown in Fig. 11. From this it will be seen that upon the movement of any one of the segments 195 the cam portion 601 thereof will contact with the rod 602 and rock the lever 604 in a clockwise direction, which movement will carry the shoulder 607 of the lever 606 over a stud 609 (Fig. 11ᵃ) projecting from the forward end of an arm 610, which is secured at its rear end to the rock shaft 47. It will be recalled that in the description of the record strip printer under the main heading of the recording mechanism, that the segments 195 and type carriers connected thereto, will be held in their adjusted position by the alining frame 205 at the end of the operation of the machine, in which position of the segment 195 the bell crank 604 will have been rocked so as to carry the shoulder 607 over the pin 609 of the arm 610 secured to the shaft 47. This shaft 47, as previously described, is constructed to be rocked in a clockwise direction (Figs. 11, 11ᵃ and 20) upon the operation of either of the totalizer manipulative devices 331. From this it will be seen that when the ends of the segments 195 stand in their adjusted positions from the previous operation of the machine, the shoulder 607 of the lever 606 will stand above the pin 609 and thereby prevent the rocking of the shaft 47 by the manipulative devices 331 and consequently prevent the operation of said devices which control the recording of the totals. Now, when it is desired to record a total from either of the totalizers, it will be necessary to perform a blank or idle operation of the machine, which operation will restore the segments 195 and type carriers 197 to their normal or zero position, as shown in Fig. 11, in which position the rod 602 rests in front of the camming portion 601 of the segments, with the shoulder 607 out of the path of movement of the pin 609, so that the total manipulative devices 331 are now free to be operated in the adjustment of the segments 195 and the type carriers 197 for the printing of the total. In the recording of a total the cam portions 601 of the segment 195 will rock the bell crank 604 in a manner similar to that in which it is rocked when items are entered in the totalizer, from which construction will be seen the necessity of having the lever 606 flexibly mounted upon the bell crank 604, as the pin 609 stands in the path of movement of the said lever and causes the rocking of the lever 606 about its pivotal point against the tension of the spring 603. Upon the release of the operative manipulative device 331 at the end of the operation of the machine, as previously described, the shaft 47 will be rocked to normal position carrying the pin 609 from in front of the lever 606, thereby permitting the spring 603 to return the lever 606 to normal position with its pin 608 in contact with the forward edge of the downwardly extending arm of the bell crank lever 604, in which position the shoulder 607 of said lever will have passed above the pin 609 and prevent the operation of either of the total manipulative devices until another blank operation of the machine has been performed.

In connection with the description of the keyboard mechanism, it will be recalled that the shaft 91 (Fig. 26) upon which the arms 92, carrying the release rod 93, is mounted, is rocked beyond its normal position near the end of the operation of the machine by the roller 83 contacting with the rearwardly extending portion 85 of the lever 64. This excess movement of the shaft 91 is to release the depressed keys by the rod 93 contacting with the under side of the extensions 96 (Figs. 2 and 15) of the links 17 which support the forward end of the latching plate or detents 15 and thereby carry said detents 15 forwardly. As the detents move forwardly the studs 14 will pass out of engagement with the shoulders 13 of the depressed keys 1 and 2, after which the rock shaft 91 and releasing rod 93 are returned to their normal position, as fully described in connection with the keyboard mechanism.

From Figs. 2, 14 and 15, it will be seen that the forward movement of the plates 70 or detents 15 will rock the links 18, supporting the rear ends of said detents, in an anti-clockwise direction, but in the recording of the totals the rod 45, carried by the arms 46, which extend downwardly from the rock shaft 47, passes above the rearward extensions 40 of the links 18 and thereby prevents the rocking of said links in an anti-clockwise direction, thus making it necessary to render the key release mechanism inoperative during the recording of the total. This is accomplished in the following manner: It will be recalled that upon the operation of either of the manipulative devices 331 in preparation for recording a total, the shaft 47 will be rocked in a clockwise direction (Fig. 20), and this shaft, near its right hand end (Fig. 26), has a downwardly and rearwardly extending arm 449, to which is connected one end of a link 450, while a lever 451 is connected to the other end of said link. This lever 451 is pivoted upon a stud 452 projecting from one of the machine frames and is provided with an elongated slot 453, in which slot projects the pin 88 from the link 89, by which link the shaft 91 is rocked. From this it will be seen that when the shaft 47 is rocked in a clockwise direction by the operation of either of the manipulative devices 331, the lever 451 will be rocked in an anti-clockwise direction, which movement will carry the pin 88 out of the recess or notch 87, formed in the lower edge of the spring operated bell crank 60, and into a recess 454 formed in a stationary plate 455 suitably secured to one of the machine frames. With the pin 88 in the recess 454 of the plate 455 it will be seen that the excess movement imparted to the lever 64 by the roller 83, which, in the ordinary operation of the machine is used for releasing the keys, will not be imparted to the rock shaft 91 and the release rod 93 owing to the disconnection of the link 89 from the bell crank 60, which is connected to the lever 64, and consequently the detents 15 and the links 18 having the rearward extensions 40, will not be rocked. At the end of the operation of the machine in which a total is recorded, the rock shaft 47 will be returned to its normal position, and, through the link 450 and lever 451, return the pin 88 to the recess 87 of the bell crank 60, in which position the key releasing mechanism will be operated upon each operation of the machine.

If it were not for the fact that it is desirable to retain the manipulative device 331 in its adjusted position, in the recording of a total, until the very end of the operation of the machine, it might be possible to successively release the manipulative devices and the keys, by which means it would not be necessary to disconnect the key releasing mechanism as the cross rod 45 carried by arms 46, which are secured to the shaft 47, would have moved from above the extensions 40 of the links 18. In fact this is the case in the present machine, but in practice it has been found that in rapidly operating machines, such as power driven machines, that in some intsances the devices for returning the shaft 47 would act sluggishly, in which case the key releasing mechanism would be operated before the cross rod 45 had passed from over the extensions 40 with the inevitable result that some of the parts were broken and for this reason it has been found advisable to disconnect the key releasing mechanism whenever a total is to be recorded.

In most savings associations, for which this machine is principally designed, they have rules limiting the amount of individual deposits received at one time, which, in most cases, run below $10,000.00, and for this reason the hood 3 (Fig. 1) is provided to cover the keys of higher denomination. These higher denominational keys are used principally for entering the total amount of deposits of the savings association or bank at the time the machine is first installed.

With this detailed description it is thought that the invention is clearly described but in order to refresh the memory a résumé of the operation of the machine will now be given.

Assuming the depositor having pass book No. 723 desires to make a deposit, he hands his book with the amount, say, $50.00, which he wishes to deposit, to the receiving teller. The teller places the book of the association. The teller places the book in the bookholder 266 and depresses the book-number keys 1 corresponding to the number of the book, namely, 7, 2 and 3 of the hundreds, tens and units bank of keys respectively and then depresses the $50.00 key in the fourth bank of keys marked 2. He then depresses the push-button 53, which releases the operating handle 82 if it is a manually operated machine, or closes contacts if the machine is electrically operated. This depressing of the keys will directly adjust indicators 35 (Fig. 14) so that the amount and book number will appear through openings 36 formed in the cabinet (Fig. 1). The zero stops 43 for the actuators 23 (Fig. 2), for the banks in which the keys are depressed, will be withdrawn and studs 20 connected to the depressed keys will be interposed in the path of the actuators. Now, upon the rotation of the main operating shaft 69 (Fig. 17) by either the crank 82 or suitable power devices, cam 130 secured to said shaft will rock the lever 251 in a clockwise direction which, by the segmental portion 133 of said lever meshing with the rack portion 134 of the arm 135, will rock said arm in a counterclockwise direction. This arm carries at its free end a cross bar 136, which is supported at its other end by an arm similar to the arm 135, and which has a rack portion 134 that coöperates with the rack 133 of the lever similar to the lever 251, but located at the opposite side of the machine. Upon the movement of the bar 136 which, with the arms 135 of the actuators 23 will form a frame, all of the actuators 23 will be moved in a direction similar to the bar 136 by their springs 140. The actuators corresponding to the banks in which no keys have been depressed will be arrested by their zero stops 43, while those actuators corresponding to the banks in which keys have been depressed will be arrested by the studs 20 connected to the depressed keys. Previous to the movement of the actuators, the totalizer elements of the daily and grand totalizers will be moved out of engagement with the auxiliary members 108 of the actuators. This movement of the totalizers occurs through the rocking of the levers 118 (Fig. 18) by cam disks 124 and 127 (Fig. 22). The extreme ends of the levers 118, opposite from the ends which coöperate with cam disks 124 and 127, are provided with cam slots 125 (Fig. 18) which, previous to the disengagement of the totalizer elements 110 from the auxiliary members 108 of the actuators, will move alining bars 117 into engagement with said totalizer bars, after which the said elements and the alining bars 117 will be moved together to permit the disengagement of the elements from the actuators. After the actuators have been positioned corresponding to the keys depressed, the bar 136 (Figs. 2, 17 and 19) will be moved radially by the bell cranks 143, into the forked members of which studs 138, projecting from the bar 136 pass at the end of the anti-clockwise movement of said bar. The bell cranks 143, of which there is one located at the opposite sides of the machine, are rocked in a clockwise direction by rollers 147 (Fig. 19) carried at the lower end of bell cranks 146, which rollers engage with cam portions 148 of bell cranks 143. The horizontal arm of the bell cranks 146 carry rollers 145 which coöperate with cams 144, secured to the rotation shaft 69, by which cams the bell cranks 146 are rocked in an anti-clockwise direction. This radial movement of the bar 136 causes a groove 150 formed on the inside of said bar, to pass over teeth of the actuators 23 and temporarily hold said actuators in their adjusted position. Pivoted to the actuators are links 182 (Fig. 2) which approximately at their centers carry anti-friction rollers 199. The aforesaid bell cranks 146 are secured to the shaft 78, and this shaft has also secured thereto hooked arms 151, of which there is one for each actuator. As the bell cranks are rocked, as previously described, by the cams 144, the hooked arms 151 will be rocked in a similar direction. During this rocking movement of the arms 151 the walls of the hooked portion thereof will contact with the rollers 199 and position the links 188 in accordance with the position of the actuators 23. The rear end of the links 182 are connected with the lower ends of links 183, the upper ends of the latter being connected with arms 184 suitably mounted upon a shaft 185. Some of the arms 184 project forwardly of the shaft 185 (Figs. 2 and 3) and have the upper end of links 187 connected thereto, the lower ends of the latter being connected to arms 188 projecting from a vertical row of shafts 189. The arms 184 which do not project forwardly of the shaft 185, have secured thereto the upper end of links 190, the lower ends of which are secured to arms 191 projecting from a second row of shafts 189. These shafts 189 are connected to separate sets of type carriers which are arranged to print upon a record strip and also upon an inserted book, as hereinafter described.

Immediately after the rocking of the shafts 189 by means of the links 182 connected to the actuators 23, and the above described intervening mechanism, cams 152, of which there is only one shown as secured to the shaft 69, will engage with rollers 153 of the bell cranks 146 and rock said bell cranks in a clockwise direction (Fig. 19). At the end of the movement of the bell cranks 146 in this clockwise direction, the rollers 147 will contact with the hooks 154 of the bell cranks 143 and rock the latter in an anti-clockwise direction by which means the bar 136 is disengaged from the actuators 23 and is returned to normal position by the levers 251 (Fig. 17). These levers 251 are returned to normal position by cams 155 contacting with rollers 156 projecting from arms 157 of said levers 251. This return movement of the bar 136 will return the actuators to normal position, but previous to this return movement of the actuators, the totalizer elements 110 will be moved back into engagement with said actuators by the return movement of the levers 118 through the cam disks 124 and 127. If no transfer takes place upon the return of the actuators 23, the auxiliary portions 108 of said actuators will be separated from the main portion of said actuators by retaining pawls 169, the inner ends of which contact with studs 170 projecting from the auxiliary portion of said actuators, and prevent the movement of the latter during the last increment of movement of the main portion of the actuators 23. The main portion and the auxiliary portion of the actuators are connected by springs 109 which have a tendency to draw the different portions of the actuator into contact with each other so that each of said actuators may act as a single unit. This principle of transfer is well known in the art but it is believed that this particular construction is new, that is, an actuator having a main and an auxiliary portion.

The right hand ends of the shafts 189, shown at the left in Fig. 11ᵇ, have arms 192 secured thereto which project forwardly and rearwardly from said shafts. These arms are connected by links 193 to arms 194 of segmental plates 195. These plates 195 are connected by links 196 to the amount type carriers 197, which type carriers are provided with type plungers 198. From this construction it will be seen that the type carriers are positioned in accordance with the extent of movement of the shafts 189, which movement is controlled by the depressed keys. After the type carriers have been positioned the type hammers 211 are released to drive the type plungers 198 into contact with the platen 224 around which the record strip passes, by the following mechanism: Each of the type hammers is provided with a pawl 213 which is provided with a hooked portion 214 at one end and a stud 215 at the other end. The hooked portion of these pawls, with the exception of those attached to the hammers cooperating with the type carriers of the two lowest denominations, are normally out of the path of a rod 217, carried by arms 218, which are pivoted upon a rod 212 which also supports the type hammers 211. When the type carrier of the tens of dollars denomination is moved, as in the example given, a raised extension of the type carriers will engage with the stud 215 of the pawl 213 and rock the hooked portion of said pawl in the path of movement of the rod 217 so that when said rod is moved in a clockwise direction, the pawl and type hammers to which it is connected will be moved in the same direction against the tension of its spring 222. This rocking of the rod 217 and the arms 218 carrying said rod, is caused by the roller 221 which contacts with the extension 220 of one of the arms 218 near the end of the rotation of the gear 77. At the end of the rotation of the gear 77, the roller 221 passes from engagement with the extension 220, thereby permitting operation of the type hammer 211 cooperating with the type carrier bearing the tens of dollars characters. Each of the pawls 213 is provided with an extension 219, which overlaps the pawl of the next lower denomination so that when one of the type carriers of higher denomination is operated, the pawl carried by the hammer coöperating with that particular type carrier and all of the pawls carried by the hammers coöperating with the type carriers of lower denominations are moved into the path of the rod 217 so that when said rod is rocked, all of the type hammers 211 coöperating with the type carriers below the adjusted type carrier will be operated as well as the hammer coöperating with the adjusted type carrier.

The segmental plates 195, which are connected to the type carriers 197 for recording the book-numbers, are connected to yoke members 210 (Fig. 11$^b$) which are loosely mounted upon the shafts 185 and 189, and these yoke members at their inner ends are suitably connected to the links 183. The purpose of employing these yoke members 210 is to reduce to a minimum the number of shafts 189. This yoke connection between the plates 195 and links 183 is true of all of the plates 195 which are controlled by the book-number keys with the exception of one of said plates, and this plate is connected through the lowermost one of the right hand column of shafts 189 to the links 183 in a manner similar to the connection between said links and the plates 195 which are connected to the amount type carriers. These segmental plates 195 are provided with teeth 207 (Figs. 11 and 27) with which alining frame 205 engages so as to insure the proper alinement of the type carriers. This alining frame is pivoted upon stub shaft 206 and is connected to a forked lever 203 by link 204. Rollers 202 and 209 project from the forks of the lever 203, and these rollers coöperate respectively with cams 201 and 208 secured to the main rotation shaft 69, and through these cams this lever 203 and alining frame 205 are rocked during each operation of the machine, the timing of which is such that at the beginning of each operation, the frame 205 is drawn from the teeth 207 of the plates 195 and just before the release of the printing hammers 211 said alining frame is rocked into engagement with the teeth 207 of the plates 195.

The amount and book-number type carriers 197 for recording upon the record strip 200 are provided with segmental indicator plates 227 (Figs. 1 and 11), the numbers of which appear singly through an opening 228 in the cabinet of the machine and indicate the amount last recorded and also the number of the book upon which the said amount has been recorded.

The record strip is fed from the supply roller 229 (Fig. 11) around the platen 224 and thence to a storage roller 230. This storage roller has connected thereto one member 233 of a clutch and is frictionally driven by rolls 238 (Fig. 12) mounted upon the driving member 235 of said clutch. A stud 245 projecting from the driving member 235 of the clutch, extends into a forked portion 246 of a lever 247 which is pivoted upon a stub shaft 248. Connected to this lever 247 is a bell crank lever 249, the vertical arm of which is connected by link 250 to one of the bell crank levers 251 (Fig. 17) which is given an invariable excursion at each operation of the machine. Contacting with the underside of a projecting part of the driving member 235 (Fig. 12) of the clutch is an arm 255 which is secured to one end of a sleeve 254, the other end of said sleeve having an arm 252 (Fig. 11) which rests upon the storage roll. As this roll increases in diameter the arm 252 is rocked in a clockwise direction (Fig. 11) and the arm 255 in an anti-clockwise direction (Fig. 12), by which movement the latter arm moves the driving member 235 in a clockwise direction about a stub shaft 234 and against the tension of a spring 256. From this it will be seen that as the diameter of the storage roll is increased the driving member 235 of the clutch will be given a less degree of movement than when the storage roll is smaller in diameter, the purpose of which is to equalize the feed of the record strip on the said storage roll. Connected to the bell crank lever 247 is mechanism for feeding the ink ribbon 257 from one to the other of the rollers which carry said ribbon. This is plainly shown in Fig. 12.

As each depositor's book is provided with a number, it is not necessary that type carriers should be provided for recording the number on said book, consequently in the system as outlined only the amounts will be recorded on the book, but it is obvious that if so desired an extra set of type carriers may be provided for printing the book numbers on the books as well as on the record strip.

Near the center of the machine some of the shafts 189 have extending therefrom, both forwardly and rearwardly, arms 365 (Fig. 5) which are similar to the arms 188 and 191 (Figs. 2 and 3). Only six of these shafts are shown as being provided with these arms, as there are only six banks of amount keys that are normally free to be operated, and these banks of keys control shafts 189 to which the arms 365 are connected. The free ends of these arms 365 are connected by links 264 to segmental plates 263, which segments mesh with type carriers 261 in the form of pinions. From this description it will be seen that the movement of the shafts 189 which is controlled by the banks of amount keys, will be conveyed to the pinions 261 and thereby position corresponding characters on said pinions or type carriers to print upon the book 260. This book 260 is clamped between the book plate 268 and a clamping plate 282 of a book-holder 266 (Figs. 1, 3, 5 and 10) and said book-holder is supported by arms 268' which in turn are supported upon a shaft 269. Each arm 268' has a projection 270 extending forwardly of the shaft 269 and at the forward end thereof the upper end of a link 271 is connected, the lower end of which is connected to an arm 272 secured to a rock shaft 273. This shaft has secured thereto a downwardly and forwardly extending forked member 274 (Fig. 2), the forks of which carry rollers 277 and 278, these rollers in turn meshing with cams 279 and 280 respectively, which cams are secured to the main rotation shaft 69. Upon an operation of the machine the forked member 274 will be rocked first in an anti-clockwise direction and then back to its normal position, thereby rocking the shaft 273 in a similar manner. The rocking of this shaft will rock the book-holder in a similar direction, by the previously described linked connections, to a position in juxtaposition to the type carriers 261. After the positioning of the book-holder a pin 294 (Fig. 5) will contact with the lower end of a centrally pivoted lever 291 and rock said lever in a counter-clockwise direction. At its upper end this lever is provided with a shoulder 290 which normally supports a pin 288 projecting from the forward extension of yoke shaped arm 287 which is pivoted upon the shaft 269. This yoke shaped arm 287 carries the platen 267. When the centrally pivoted arm 291 is rocked by the engagement of the pin 294 therewith, the shoulder 290 of said arm will be withdrawn from engagement with the pin 288 so that a spring 292, the ends of which are connected to the pin 288 and an arm 293 projecting from a shaft 273, will rock the platen carrying arm 287 in a counter-clockwise direction, during which movement the platen will strike the book and force said book into contact with the type carriers to receive an impression therefrom. As the shaft 273 is rocked in a clockwise direction by the cams 279 and 280 the book-holder 266, through the arms 272 and links 271, will be returned to its normal position, as shown in the drawings. This return movement of the book-holder will also return the platen by the bumper 295, carried by the book plate 268 of the book-holder, contacting with the yoke shaped arm 287 which supports said platen.

Adjacent to the amount type carriers 261 is a frame 314 which supports type carriers 316, which type carriers are arranged to print the date of the amount deposited and a character to indicate that the amount has been paid into the association. These latter type carriers, which are also in the form of pinions, mesh with pinions 317 which may be adjusted through an opening 318 (Fig. 1) of the cabinet so as to change the date, and, if necessary, the character type for indicating whether the amount was paid in by the depositor or received by the depositor from the association. A two-color ink ribbon passes around the type carriers and this ribbon is so arranged that the dividing line between the colors of said ribbon passes in the center of the type characters that are in printing position, so that the amount recorded upon the book will be in two colors, thereby rendering it very difficult to alter the amount. The type carriers are provided with eleven or more spaces and a novel form of mechanism is provided for bringing the zero characters of the type carriers to the right of the adjusted type carrier into printing position, but as this mechanism is described thoroughly in the detailed description, no further description of same will be given here.

A manipulative device 331 (Figs. 1, 20 and 23) is provided for each totalizer, which device controls the recording of a sub-total and a grand total from its respective totalizer. In the taking of a sub-total from the daily totalizer the right hand one of said manipulative devices 331 (Figs. 1 and 23) is moved forwardly, by which movement it will advance the slide 351 as described in detail under the heading of the totalizer mechanism. This forward movement of the slide 351, will, through the bell cranks 353 and the link 355 (Fig. 22) rock the arm 357 so as to carry the roller 122 out of the cam groove 123 formed in the disk 124. Upon the operation of the machine with the roller 122 in this position it will be seen that the throwing lever 118 carrying said roller will not be moved and consequently the daily totalizer will remain in engagement with the actuators during the forward and return movement thereof. This forward movement of the manipulative device 331 will rock the link 398 (Figs. 20 and 24) so that a pin 399 projecting therefrom will connect an arm 401 fast upon the shaft 402 to an arm 409 which is loosely mounted upon the shaft. To this arm 409 is connected one end of a yoke 410, the other end of which is connected to an arm 411, the upper end of which contacts with a pin 412 (Fig. 21) of the slide 351 which controls the lever 118 coöperating with the grand totalizer. The cam 408 (Figs. 20 and 21) will, through suitable intervening mechanism, rock the shaft 402, but the timing of said cam is such that the shaft 402 is not rocked until after the disengagement of the grand totalizer elements 110 from the actuators 23. When the shaft 402 is rocked by the cam 408 the slide 351, which controls the grand totalizer lever 118, will be moved forwardly to such an extent that the roller 128 (Fig. 21) will be shifted out of the cam race of the disk 127, and into the cam race 413 of the disk 414. At this point of operation of the machine the cam race 413 (Fig. 21) is in such position that that portion with which the roller 128 engages will hold the grand totalizer in its disengaged position until the very end of the operation of the machine, when the totalizer elements will be shifted back into engagement with the actuators, but by which time the actuators have been returned to their normal position. In the taking of a grand total from the daily totalizer the lever 331 is moved rearwardly and this movement of the manipulative device 331 controls the throwing lever 118 of the grand totalizer in exactly the same manner as that just described in connection with the recording of a sub-total from the daily totalizer. This rearward movement of the manipulative device 331 in the controlling of the recording of the grand total from the daily totalizer shifts the slide 331 of said daily totalizer forwardly a greater extent than said slide is shifted when the manipulative device is moved forwardly and by this additional movement of the slide 351 the roller 122 (Fig. 22) is carried directly from the cam groove 123 of the disk 124 into the cam groove 389 of the disk 390. The shape of the latter groove is such that the daily totalizer is maintained in engagement with the actuators during the downward movement of said actuators, and after said actuators have come to rest, due to the enlarged teeth 164 engaging with the shoulders 368 of the trip pawls 165 (Fig. 17), the totalizer elements will be shifted out of engagement with said actuators, and they are retained in this position until the actuators are returned to their normal position, thereby clearing or resetting the totalizer elements to zero. It is, of course, to be understood that the positioning of the actuators under the control of the totalizer element controls the printing devices for recording the sub and grand total of the daily totalizer upon the record strip 200.

In the recording of the sub and grand total of the grand totalizer the left hand manipulative device 331 (Figs. 1 and 23) is moved either forwardly or rearwardly depending upon the total desired to be recorded. In the forward movement of the grand totalizer manipulative device 331 the roller 128 (Fig. 22) will be shifted to an intermediate position between the cam disks 127 and 414, in which position the grand totalizer elements 110 will remain in engagement with the actuators 23 during the complete operation of the machine. In the rearward movement of this manipulative device 331 to obtain a grand total from the grand totalizer, the roller 128 is shifted directly from the cam groove formed in the disk 127 into the cam groove 413 of the disk 414 and the shape of this latter groove is such, that, after the actuators 23 and type carriers controlled thereby have been positioned by the return of the grand totalizer elements to normal zero position, the said elements will be disengaged from the totalizer and retained in this position until the actuators 23 are returned to their normal zero position, and at which time the totalizer elements are reëngaged with said actuators. This forward and rearward movement of the grand totalizer manipulative device 331 connects the slide 351 of the daily totalizer with the operating mechanism of the machine, so that the roller 122 mounted in the throwing lever 118 of the daily totalizer, will be shifted from the cam groove 123 of the disk 124 into the cam groove 389 of the disk 390 while the elements 110 of the daily totalizer are out of engagement with the actuators, the shape of the cam groove 389 at this point being such as to maintain the daily totalizer out of engagement with the actuators until the very end of the operation of the machine, by which time the actuators are in their normal position. These manipulative devices 331 shift a special type carrier (Fig. 13) differentially in opposite directions so as to bring type plungers bearing different characters into printing position to designate the different kinds of totals recorded from the daily and grand totalizers, which mechanism is described in detail under the heading of the totalizer mechanism.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In an accounting machine, the combination with a totalizer comprising a plurality of movable elements, of a set of main actuators therefor, auxiliary actuators for the totalizer elements movable with the main actuators, means for moving the main actuators, and means for imparting to each auxiliary actuator a unit of movement independent of the movement of its main actuator for the purpose of effecting transfers between the elements of the totalizer.

2. In an accounting machine, the combination with a totalizer comprising a plurality of movable elements, of a set of main actuators therefor, a shaft upon which said actuators are pivoted, auxiliary actuators for the totalizer elements movable with the main actuators and also pivoted upon the aforementioned shaft, means for moving the main actuators, and means for imparting to each auxiliary actuator a unit of movement, independent of the movement of its main actuator for the purpose of effecting transfers between the elements of the totalizer.

3. In an accounting machine, the combination with a totalizer element, of an actuating rack therefor composed of two parts, and means for moving one part of said rack independently of the other part for the purpose of effecting a transfer.

4. In an accounting machine, the combination with a totalizer comprising a plurality of movable elements, of actuators therefor each composed of two parts, means for differentially positioning said actuators and then returning same to normal position, devices for arresting one part of the actuators during the last increment of movement of the other parts of said actuators, and means controlled by the totalizer elements for withdrawing the arresting devices out of operative position when transfers are to be effected between the corresponding elements of the totalizer.

5. In an accounting machine, the combination with a totalizer comprising a plurality of movable elements, of spring drawn actuating racks therefor, each of said racks being composed of two parts, keys for determining the movement of said racks, a restoring frame for said racks having an invariable extent of movement actuated upon each operation of the machine, devices for arresting one part of the racks during the last increment of movement of the restoring frame, and means controlled by the totalizer elements for rendering the arresting devices inoperative when transfers are to be effected between the corresponding elements of the totalizer.

6. In an accounting machine, the combination with a totalizer comprising a plurality of movable elements, of spring drawn actuating racks therefor, each of said racks being composed of two parts, keys for determining the movement of said racks, a restoring frame for the racks actuated at each operation of the machine, devices for arresting one part of the racks during the last increment of movement of the restoring frame, and pawls for holding the arresting devices in operative position constructed to be operated by the totalizer elements thereby permitting the parts of the racks that are normally arrested by said devices to move an additional distance to effect transfers between the corresponding elements of the totalizer.

7. In an accounting machine, the combination with a plurality of totalizers each comprising a plurality of movable elements, of a single set of main actuators for the elements of all of the totalizers, auxiliary actuators for the elements of each totalizer which are movable with the main actuators, means for moving the main actuators, and means for imparting to each auxiliary actuator a unit of movement independent of the movement of the main actuators for effecting transfers between the elements of the totalizers.

8. In an accounting machine, the combination with a plurality of totalizers each comprising a plurality of movable elements, of a single set of main actuators for the elements of all of the totalizers, auxiliary actuators for the elements of each totalizer which are movable with the main actuators, means for moving the main actuators, devices for arresting the auxiliary actuators during the last increment of movement of the main actuators, and means under the control of the totalizer elements for rendering the arresting devices inoperative so that the auxiliary elements may move with their main actuators during the last increment of movement of said main actuators and thereby effect transfers between the elements of the totalizers.

9. In an accounting machine, the combination with a totalizer comprising a plurality of movable elements, movable actuators therefor each composed of a plurality of relatively movable parts, means operatively connecting the movable parts to cause them to move together and means controlled by the totalizer elements for preventing the movement of all of the parts of the actuator as a whole during a portion of the movement of said actuators.

10. In an accounting machine, the combination with a totalizer of a variable length actuating rack therefor, means for causing relative movement between the actuating rack and the totalizer, and means controlled by the totalizer for varying the length of the actuating rack.

11. In an accounting machine, the combination with a totalizer, an adjustable actuating rack therefor, means for causing relative movement between the actuating rack and the totalizer and means for varying the number of teeth in the effective length of the actuating rack.

12. In an accounting machine, the combination with a plurality of totalizers, of a main actuator provided with a rack portion for each totalizer, means for causing relative movement between the main actuator and the totalizer, and means controlled by each totalizer for varying the number of teeth in the effective portion of its corresponding rack portion.

13. In a machine of the class described, the combination with a totalizer, of a totalizer actuating rack, a second rack mounted in alinement with said first mentioned rack and movable therewith, means for differentially actuating the racks, means for stopping one of said racks before the other rack reaches the end of its stroke, a spring connecting the two racks, and a transfer device for disabling said means for stopping one of the racks.

14. In an accounting machine, the combination with a totalizer comprising a plurality of movable elements, of actuators for said elements normally in engagement therewith, a movable frame for supporting the totalizer elements, a device mounted in the movable frame for alining the elements, and means actuated upon the operation of the machine for first moving the alining device into engagement with the totalizer elements and then moving the frame so as to carry the totalizer elements out of engagement with the actuators.

15. In an accounting machine, the combination with a totalizer comprising a plurality of movable elements, of actuators for said elements normally in engagement therewith, a movable frame for supporting the totalizer elements, a device mounted in the movable frame for alining the elements, and plates having cam slots formed therein actuated upon the operation of the machine for first moving the alining device into engagement with the totalizer elements and then moving the frame so as to carry the totalizer elements out of engagement with the actuators.

16. In an accounting machine, the combination with a totalizer comprising a plurality of movable elements, of oscillatory actuators for said elements normally in engagement therewith, manipulative devices for controlling the advance movement of said actuators, a bar for restoring the actuators to normal position, a movable frame for supporting the totalizer elements, a device mounted in the movable frame for alining the elements, cam plates actuated upon the operation of the machine for moving the alining device into engagement with the totalizer elements and then moving the frame so as to carry the totalizer elements out of engagement with the actuators, means for advancing the actuators to positions determined by the manipulative devices after the totalizer has been disengaged therefrom, means for operating the cam plates after the actuators have been positioned to return the totalizer elements into engagement with the actuators while in their advance position and to withdraw the alining devices from engagement with said elements, and means actuated upon the further operation of the machine for operating the restoring bar and thereby returning the actuators to normal position so as to actuate the totalizer.

17. In an accounting machine, the combination with a totalizer comprising a plurality of movable elements, of actuators therefor, means for differentially adjusting said actuators, devices for moving the totalizer elements into and out of engagement with the actuators, a combined alining and restoring bar for the actuators, and means for moving the bar to aline the actuators previous to the engagement of the totalizer elements with said actuators and then restoring said actuators to normal position by said bar after the engagement of the totalizer with the actuators.

18. In an accounting machine, the combination with a totalizer comprising a plurality of movable elements, of actuators therefor, means for differentially adjusting said actuators, a bar, means for imparting thereto an oscillatory movement upon each operation of the machine, and means also operated upon the operation of the machine for moving said bar into engagement with the actuators and alining the same at the end of movement of said bar in one direction.

19. In an accounting machine, the combination with a totalizer, of actuators therefor, means for differentially adjusting said actuators, a bar having an oscillatory and a reciprocatory movement, means for imparting to said bar its reciprocatory movement for the purpose of alining the adjusted actuators, and means for imparting to said bar its oscillatory movement for returning the actuators to normal position.

20. In an accounting machine, the combination with a totalizer, of actuators therefor, means for differentially adjusting said actuators, a frame comprising side arms and a cross bar, pins projecting from the cross bar, means for imparting an oscillatory movement to the frame for the purpose of permitting movement of the actuators and to restore same to normal position, forked levers for receiving the pins of the bar at the end of the movement of said bar in one direction, and means for rocking the forked levers while the pins are in engagement therewith for the purpose of moving the bar to aline the actuators.

21. In an accounting machine, the combination with a plurality of totalizers, of differentially movable actuators for simultaneously operating said totalizers, the said totalizers and actuators being normally in engagement, means actuated during an operation of the machine for disengaging the totalizers from the actuators and positioning the said actuators and then reëngaging the totalizers and actuators and returning the latter to normal position thereby actuating the totalizers, mechanism controlled by the totalizers for recording the total of any one of the totalizers, manipulative devices for selecting the totalizer from which the total is to be recorded, and means controlled by the operated manipulative device for maintaining all but the selected totalizer out of engagement with the actuators while said actuators are being moved.

22. In an accounting machine, the combination with a plurality of totalizers, of differentially movable actuators for simultaneously operating said totalizers, the said totalizers and actuators being normally in engagement, means actuated during an operation of the machine in which items are entered in the totalizers for disengaging the totalizers from the actuators and positioning the said actuators and then reëngaging the totalizers and actuators and returning the latter to normal position thereby actuating the totalizers, mechanism controlled by the totalizers for recording the total of any one of the totalizers, manipulative devices for selecting the totalizers from which the total is to be recorded, and means controlled by the operated manipulative device for preventing the disengagement of the selected totalizer from the actuators while the total recording mechanism is being positioned and for maintaining the rest of the totalizers from engaging the actuators during the movement of the actuators in the total recording operation.

23. In an accounting machine, the combination with a plurality of totalizers, of differentially movable actuators for simultaneously operating said totalizers, the said totalizers and actuators being normally in engagement, means actuated during an operation of the machine in which items are entered in the totalizers for disengaging the totalizers from the actuators and positioning the said actuators and then reëngaging the totalizers and actuators and returning the latter to normal position thereby actuating the totalizers, mechanism controlled by the totalizers for recording the total of any one of the totalizers, manipulative devices for selecting the totalizer from which the total is to be recorded, devices brought into operation upon the actuation of any one of the manipulative devices for changing the timing of the totalizer disengaging means so that the totalizer selected by the operated manipulative device will remain in engagement with the actuators until the total recording mechanism is positioned while the rest of the totalizers will be disengaged from the actuators during the movement of the latter.

24. In an accounting machine, the combination with a plurality of totalizers, of differentially movable actuators for simultaneously operating said totalizers in the entering of items thereon, the said totalizers and actuators being normally in coöperative relation, means for obtaining a record of the total shown on any of the totalizers, and means operated as an accompaniment to the recording of the total of any of the totalizers for disestablishing the coöperative relation between the rest of the totalizers and the actuators during the movement of the latter.

25. In an accounting machine, the combination with a plurality of totalizers, of differentially movable actuators for simultaneously operating said totalizers in the entering of items thereon, the said totalizers and actuators being normally in coöperative relation, means including the actuators for obtaining a record of the total shown on any of the totalizers, manipulative devices for determining from which one of the totalizers a record of the total is to be obtained, and means controlled by the manipulative devices and operated as an accompaniment to the recording of the total of any of the totalizers for disestablishing the coöperative relation between the rest of the totalizers and the actuators during the movement of the latter.

26. In an accounting machine, the combination with a plurality of totalizers, of differentially movable actuators for simultaneously operating said totalizers in the entering of items thereon, the said totalizers and actuators being normally in coöperative relation, type carriers connected to the actuators for recording items entered in the totalizers and the totals thereof, a pair of operating cams for each totalizer one of which is used in the entering of items and the other of which is used in the recording of totals, and means operated as an accompaniment to the recording of a total from any of the totalizers for bringing each of the remaining totalizers under the control of both cams of its respective pair.

27. In an accounting machine, the combination with a totalizer, of differentially movable actuators for operating said totalizer in the entering of items thereon, means for obtaining a record from the totalizer and either leaving it at zero or retaining the total, means for moving the totalizer into and out of engagement with the actuators, a pair of cams for operating the moving means, one of which is used for actuating the moving means when items are entered in the totalizer and the other one of which is used for actuating the moving means when a total is to be recorded and the totalizer left at zero, a manipulative device for controlling the establishing of operative relation between the moving means and either of the cams and means also controlled by the manipulative device for maintaining the moving means out of operative relation with either cam when it is desired to obtain a record of the total and retain same upon the totalizer.

28. In an accounting machine, the combination with an operating mechanism, of type carriers, a device for holding record material, the said holding device being normally out of printing relation with the type carriers, means for taking an impression upon the record material from the type carriers, and means actuated by the operating mechanism for first positioning the holding device carrying the record material in printing relation with the type carriers and then actuating the impression means.

29. In an accounting machine, the combination with an operating mechanism, of type carriers, a pivoted device for holding record material, the said holding device being normally out of operative relation with the type carriers, a pivoted platen for taking an impression upon the record material from the type carriers, and means actuated by the operating mechanism for first rocking the holding device carrying the record material into operative relation with the type carriers and then actuating the platen for taking an impression upon the record material from the type carriers.

30. In an accounting machine, the combination with an operating mechanism, of type carriers, a device for holding record material, the said holding device being normally out of printing relation with the type carriers, means for taking an impression upon the record material from the type carriers, and means actuated by the operating mechanism for first positioning the holding device carrying the record material in printing relation with the type carriers, then actuating the impression means, and finally returning the holding device to normal position and through it the impression means.

31. In an accounting machine, the combination with an operating mechanism, of type carriers, a pivotal device for holding record material, the said holding device being normally out of operative relation with the type carriers, a pivoted platen for taking an impression upon the record material from the type carriers, a spring for operating said platen, means for latching the platen in an inoperative position against the tension of the spring, and means actuated by the operating mechanism for first rocking the holding device carrying the record material into operative relation with the type carriers, then tripping the latching means so as to enable the spring to operate the platen and finally restoring the holding device and platen to normal position.

32. In an accounting machine, the combination with a plurality of type carriers, each bearing the digital characters and an arbitrary character, the latter character of each type carrier being normally in printing position, of actuators for said type carriers, means for taking an impression of the characters in printing position, and means controlled by the actuation of any of the type carriers for bringing to printing position the zero characters of the type carriers to the right of the actuated type carrier.

33. In an accounting machine, the combination with a plurality of type carriers, each bearing the digital characters and an arbitrary character, the latter character of each type carrier being normally in printing position, of actuators for said type carriers, means for taking an impression of the characters in printing position, and means controlled by the actuation of any of the type carriers for moving the type carriers to the right thereof in an opposite direction from the direction of movement of the actuated type carrier for the purpose described.

34. In an accounting machine, the combination with a plurality of type carriers, each having a plurality of characters and means for differentially positioning the same, of means for taking an impression from the positioned type carriers, and means controlled by the positioning of any of the type carriers for moving the type carriers to the right thereof for the purpose described.

35. In an accounting machine, the combination with a plurality of type carriers and means for differentially positioning the same, of means for taking an impression from the positioned type carriers, devices positioned by the movement of any of the type carriers for positively moving the type carriers to the right of the moved type carrier, and means for operating said devices after the same have been positioned.

36. In an accounting machine, the combination with a plurality of type carriers, of actuating segments for differentially positioning said type carriers, means for taking an impression from the positioned type carriers, devices positioned by the movement of any of the segments in the positioning of its type carrier for positively moving the actuating segments to the right of the moved segment in an opposite direction from the direction of movement of the moved segment, and means for operating said devices after the same have been positioned.

37. In an accounting machine, the combination with a plurality of type carriers, each bearing the digital characters and a blank, the blank being normally in printing position, of differentially movable actuators for adjusting the type carriers thereby bringing into printing position any of the digital characters above zero, normally inoperative devices, rendered operative by the movement of any of the actuators, for bringing to printing position the zero digits of the type carriers to the right of the moved actuator, and means for operating the devices rendered operative by the movement of the actuator.

38. In an accounting machine, the combination with a plurality of type carriers, each bearing the digital characters and a blank, the blank being normally in printing position, of differentially movable actuators for adjusting the type carriers thereby bringing into printing position any of the digital characters above zero, normally inoperative devices for moving the actuators in an opposite direction from which they are moved in bringing the type characters above zero to printing position for the purpose of bringing the zero characters to printing position, a cam extension formed upon each actuator which when any actuator is moved renders operative the normally inoperative devices for the actuators to the right of the moved actuator.

39. In an accounting machine, the combination with two type carriers, each bearing a blank, and the digits one to nine on one side of the blank and the zero digit upon the other side of the blank, the blank being normally in printing position, of an actuator for each type carrier for bringing into printing position any one of the characters from one to nine inclusive, and means controlled by the movement of one of the type carriers into position to record any one of the characters from one to nine inclusive for moving the other type carrier so as to carry its zero character into printing position.

40. In an accounting machine, the combination with two type wheels, each bearing a blank, and the digits one to nine inclusive on one side of the blank and the zero digit upon the other side of the blank, the blank being normally in printing position, of an actuating segment for each type carrier for bringing into printing position any one of the characters from one to nine inclusive, a platen for taking an impression from the positioned type carriers, operating mechanism for actuating the platen, a device positioned by the movement of one of the type carriers into position to record any one of the characters from one to nine inclusive for moving the other type carriers so as to carry its zero character into printing position, and means operated by the operating mechanism for actuating the positioned device to move said other type carrier to bring its zero character into printing position.

41. In an accounting machine, the combination with two type wheels, each bearing a blank, and the digits one to nine inclusive on one side of the blank and the zero digit upon the other side of the blank, the blank being normally in printing position, of an actuating segment for each type carrier for bringing into printing position any one of the characters from one to nine inclusive, driving means for said segments, flexible connections between said segments and driving means, a platen for taking an impression from the positioned type carriers, a spring for operating said platen, a latch for holding said platen against the tension of the spring, operating mechanism for actuating the driving means for the segments and for tripping platen latch, devices positioned by the movement of one of the type carriers into position to record any one of the characters from one to nine inclusive, for moving the other type carrier so as to carry its zero character into printing position, and means operated by the operating mechanism for actuating the positioned devices to move their corresponding type carrier so as to bring its zero character into printing position.

42. In an accounting machine, the combination with a differentially movable type carrier, of a hammer for striking the type carrier a printing blow, a frame having an invariable extent of movement at each operation of the machine, means actuated by the movement of the type carrier for connecting the hammer and frame, and a spring for operating the hammer put under tension by the movement of the frame.

43. In an accounting machine, the combination with a differentially movable type carrier, of a hammer for striking the type carrier a printing blow, a frame having an invariable extent of movement at each operation of the machine, a pawl carried by the hammer and actuated by the movement of the type carrier for connecting the hammer and frame, and a spring for operating the hammer put under tension by the movement of the frame.

44. In an accounting machine, the combination with type carriers for listing items on a record strip, a storage roll for said strip including a female member of a clutch, driving means for said storage roll including the male member of the clutch, and means controlled by the size of the roll for varying the extent of movement of the male member of the clutch.

45. In an accounting machine, the combination with type carriers for listing items on a record strip, of a storage roll for said strip, a clutch for feeding the strip on to the roll, an invariable movable device for engaging one member of the clutch, and means controlled by the size of the roll for changing the time of engagement of the movable device and clutch member for the purpose described.

46. In an accounting machine, the combination with type carriers for listing items on a record strip, of a storage roll for said strip, a clutch member connected to the storage roll, a second member of the clutch for frictionally driving the first mentioned clutch member and thereby the storage roll, an invariable movable device for actuating the second member of the clutch, and a pair of arms, one of which engages the storage roll and the other of which engages the second member of the clutch for varying the movement of the second clutch member by the invariable movable device.

47. In an accounting machine, the combination with a totalizer, of means including a manipulative device movable in opposite directions for obtaining a record of the total shown on said totalizer and either retaining the total or clearing the totalizer of said total, and a type carrier controlled by said manipulative device for recording different characters to distinguish whether or not the totalizer has been cleared.

48. In an accounting machine, the combination with a totalizer, of means including a manipulative device movable in opposite directions for obtaining a record of the total shown on said totalizer and either retaining the total or clearing the totalizer of said total, and a type carrier differentially adjusted by said manipulative device for recording different characters thereby distinguishing whether or not the totalizer has been cleared.

49. In an accounting machine, the combination with a totalizer, of a manipulative device for controlling the recording on a record strip of either a subtotal or a grand total from said totalizer, a second totalizer, an additional manipulative device for controlling the recording of either a subtotal or a grand total therefrom, and a differentially movable type carrier controlled by said manipulative devices for recording on said record strip the kind of total and the totalizer from which it is recorded.

50. In an accounting machine, the combination with a plurality of totalizers, of manipulative devices one for each totalizer for controlling the recording on a record strip of the totals shown on said totalizers, and a differentially movable type carrier controlled by said manipulative devices for recording different characters on the record strip thereby identifying the totalizer from which the total is recorded.

51. In an accounting machine, the combination with a totalizer, of depressible keys for controlling the entering of items thereon, latching devices for said keys, means for releasing the latching devices during an operation of the machine, mechanism including a manipulative device for recording the total shown on the totalizer, and means controlled by the total manipulative device for preventing the operation of the releasing means during an operation of the machine in which a total is recorded.

52. In an accounting machine, the combination with a totalizer and keys for controlling the entering of items thereon, of latching devices for said keys, means for releasing the latching devices during an operation of the machine, mechanism for recording the total on a record strip and either clearing the totalizer or retaining the total thereon, and means controlled by the total recording mechanism for disabling the releasing means for the purpose described.

53. In an accounting machine, the combination with a totalizer and keys for controlling the entering of items thereon, of latching devices for said keys, means for releasing the latching devices during an operation of the machine, mechanism for recording the total on a record strip and either clearing the totalizer or retaining the total thereon, and means controlled by the total recording mechanism for preventing the operation of the latching devices and for disabling the releasing means therefor.

54. In a machine of the class described, the combination with a device for holding an article to be printed upon having an adjustable abutment for the side of said article, of two sets of type carriers for printing on said article adjustable toward and from each other, and means for causing relative movement between the device and the type carriers for printing on the article held in said device.

55. In a machine of the class described, the combination with a device for holding an article to be printed upon, of a plurality of sets of type carriers adjustable toward and from each other, and means for causing relative movement between the article holding device and the type carriers for taking an impression upon an article held in the former.

56. In a machine of the class described, the combination with a book holding device, of amount type carriers and date type carriers capable of adjustment toward and from each other, means for setting the amount type carriers, and means for causing relative movement between the book holding device and the type carriers for printing on a book held in the former.

57. In an accounting machine, the combination with a plurality of totalizers, of actuators therefor constructed to be moved differentially from normal position and returned during an operation of the machine, means for establishing coöperative relation between the actuators and totalizers previous to the return of said actuators for the purpose of simultaneously entering items in said totalizers, type carriers connected to the actuators for recording items entered in the totalizers and the total thereof, means for moving the actuators from normal position under the control of any of the totalizers in the recording of a total therefrom, and means operated as an accompaniment to the recording of the total of any of the totalizers for preventing the establishing of coöperative relation between the actuators and the rest of the totalizers during the return movement of the actuators.

58. In an accounting machine, the combination with a plurality of totalizers, of manipulative devices, one for each totalizer, for controlling the recording on a record strip of the totals shown on said totalizers, a differentially movable type carrier controlled by said manipulative devices for recording different characters on the record strip whereby the totalizer is identified from which the total is recorded, and interlocking mechanism for preventing the operation of more than one of said devices during a total recording operation.

59. In an accounting machine, the combination with a totalizer, of a manipulative device for controlling the recording on a record strip of either a subtotal or a grand total from said totalizer, a second totalizer, an additional manipulative device for controlling the recording of either a subtotal or a grand total therefrom, a differentially movable type carrier controlled by said manipulative devices for recording on said record strip the kind of total and the totalizer from which it is recorded, and interlocking mechanism between said manipulative devices for the purpose of preventing the operation of both of said manipulative devices during a total recording operation.

60. In an accounting machine, the combination with a totalizer, of a manipulative device for controlling the recording on a record strip of either a subtotal or a grand total from said totalizer, a second totalizer, an additional manipulative device for controlling the recording of either a subtotal or a grand total therefrom, a differentially movable type carrier controlled by said manipulative devices for recording on said record strip the kind of total and the totalizer from which it is recorded, and connections actuated by either manipulative device for preventing the operation of the other of said manipulative devices during a total recording operation.

61. In an accounting machine, the combination with a totalizer, of a differentially movable actuator therefor, means normally preventing movement of said actuator, a series of keys for disabling the preventing means and for determining the extent of movement of the actuator, and an indicator differentially positioned by said keys for indicating the extent of movement to be imparted to the actuator.

62. In an accounting machine, the combination with a totalizer, of a differentially movable actuator therefor, means normally preventing movement of said actuator, a series of keys for determining the extent of movement of the actuator, a detent for said keys, mechanism controlled by said detent for disabling the means for preventing movement of the actuator, and an indicator differentially positioned by said keys for indicating the extent of movement to be imparted to the actuator.

63. In an accounting machine, the combination with an operating mechanism, of type carriers, a device for holding record material the said holding device being normally out of printing relation with the type carriers, means movable independently of said holding device for taking an impression upon the record material from the type carriers, and means actuated by the operating mechanism for first positioning the holding device carrying the record material in printing relation with the type carriers and then actuating the impression means.

64. In an accounting machine, the combination with an operating mechanism, of type carriers, a pivoted device for holding record material, the said holding device being normally out of operative relation with the type carriers, a pivoted platen movable independently of said holding device for taking an impression on the record material from the type carriers, and means actuated by the operating mechanism for first rocking the holding device carrying the record material into operative relation with the type carriers and then actuating the platen for causing an impression upon the record material from the type carriers.

65. In an accounting machine, the combination with an operating mechanism, of type carriers, a device for holding record material the said holding device being normally out of printing relation with the type carriers, means movable independently of said holding device for taking an impression upon the record material from the type carriers and means actuated by the operating mechanism for first positioning the holding device carrying the record material in printing relation with the type carriers, then actuating the impression means, and finally returning the holding device to normal position and through it the impression means.

66. In an accounting machine, the combination with an operating mechanism, of type carriers, a pivotal device for holding record material, the said holding device being normally out of operative relation with the type carriers, a pivoted platen movable independently of said holding device for taking an impression upon the record material from the type carriers, a spring for operating said platen, means for latching the platen in an operative position against the tension of the spring, and means actuated by the operating mechanism for first rocking the holding device carrying the record material into operative relation with the type carriers then tripping the latching means so as to enable the spring to operate the platen and finally restore the holding device to normal position.

67. In an accounting machine, the combination with a totalizer comprising a plurality of movable elements, of actuators therefor each composed of two parts, means for differentially positioning said actuators and then returning the same to normal position and devices for arresting parts of the actuators during the last increment of movement of the other parts of said actuators whereby said arrested parts will remain in operative engagement with the totalizer elements between operations of the machine to prevent accidental displacement of said elements.

68. In an accounting machine, the combination with an operating mechanism, of type carriers, a device for holding record material, the said holding device being normally out of operative relation with the type carriers, means for taking an impression upon the record material from the type carriers, means actuated by the operating mechanism for first positioning the holding device carrying the record material in operative relation with the type carriers and then actuating the impression means, and means for alining said type carriers, said alining means being rendered effective by the movement of said impression means.

69. In an accounting machine, the combination with an operating mechanism, of type carriers, a pivoted device for holding record material, the said holding device being normally out of operative relation with the type carriers, a pivoted platen for taking an impression upon the record material from the type carriers, means actuated by the operating mechanism for first rocking the holding device carrying the record material into operative relation with the type-carriers and then actuating the platen for taking an impression upon the record material from the type carriers, and means for alining said type carriers rendered effective by the movement of said platen.

70. In an accounting machine, the combination with an operating mechanism, of type carriers, a device for holding record material, the said holding device being normally out of operative relation with the type carriers, means for taking an impression upon the record material from the type carriers, means actuated by the operating mechanism for first positioning the holding device carrying the record material in printing relation with the type carriers, then actuating the impression means, and finally returning the holding device to normal position and through it the impression means, and alining devices for said type carriers rendered effective by the movement of said impression means.

71. In an accounting machine, the combination with an operating mechanism, of type carriers, a pivotal device for holding record material, the said holding device being normally out of operative relation with the type carriers, a pivoted platen for taking an impression upon the record material from the type carriers, a spring for operating said platen, means for latching the platen in an inoperative position against the tension of the spring, means actuated by the operating mechanism for first rocking the holding device carrying the record material into operative relation with the type carriers, then tripping the latching means so as to enable the spring to operate the platen and finally restoring the holding device and platen to normal position, and alining means for said type carriers rendered effective by the movement of said platen.

72. In an accounting machine, the combination with type carriers, of means for taking an impression therefrom and alining means for said type carriers rendered effective by said impression means.

73. In an accounting machine, the combination with manipulative devices, of a set of totalizer elements, an actuator for each element, each actuator being composed of two parts, and means whereby one of said parts is controlled by the aforesaid manipulative devices and the other by the lower order totalizer element.

74. In an accounting machine, the combination with a plurality of rows of keys, of a set of totalizer elements, an actuator for each element, each actuator being composed of two parts, and means whereby one of said parts is controlled by the aforesaid keys and the other by the lower order totalizer element.

75. In an accounting machine, the combination with a plurality of movable totalizer elements, of actuators for said elements, means for moving the totalizer elements in and out of engagement with the actuators, and means for preventing rotation of the totalizer elements moved into engagement with said elements as a preliminary to disengaging the elements and the actuators and withdrawn from engagement after the totalizer elements are reëngaged with the actuators.

76. In an accounting machine, the combination with a plurality of type carriers bearing the digital characters, of actuators for the type carriers, manipulative devices, means controlled by the manipulative devices for effecting adjustment of the actuators and type carriers in one direction to bring any desired digital characters above zero to the printing position, and means controlled by a higher order type carrier for effecting adjustment of lower order actuators and type carriers in the opposite direction to bring zeros to the printing position.

77. In an accounting machine, the combination with a plurality of type carriers each bearing the digital characters, of actuators for the type carriers, means controlled by the associated manipulative devices for adjusting an actuator and its type carrier to print any desired character above zero, and means controlled by a higher order actuator for effecting simultaneous adjustment of a plurality of lower order actuators and type carriers to bring the zeros on the lower order type carriers to printing position.

78. In an accounting machine, the combination with a plurality of type carriers bearing the digital characters, of actuators for the type carriers, manipulative devices, means controlled by the manipulative devices for effecting adjustment of the actuators and type carriers in one direction to bring any desired digital characters above zero to the printing position, and means controlled by a higher order actuator for effecting simultaneous adjustment of a plurality of lower order actuators and type carriers in the opposite direction to bring zeros to the printing position.

79. In an accounting machine, the combination with a plurality of key banks, of a rotatable type carrier for each bank bearing digital characters, and means controlled by a higher order bank for effecting rotation of its type carrier in one direction and of a plurality of lower order carriers in the opposite direction to print any desired digit above zero from the higher order carrier and zero from each of the lower order carriers.

80. In an accounting machine, the combination with a plurality of sets of rotatable totalizer elements, of actuators normally rotating simultaneously elements in a plurality of the sets, and mechanism for controlling the engagement and disengagement of the totalizer elements and actuators whereby any one set of elements may be rotated by the actuators in one or both directions as desired.

81. In an accounting machine, the combination with a driving device, of a plurality of sets of rotatable totalizer elements, actuators normally rotating simultaneously totalizer elements in a plurality of the sets, manipulative devices, and means actuated by the driving device under control of the manipulative devices for effecting engagement and disengagement of the totalizer elements and actuators whereby any one set of elements may be rotated by the actuators in one or both directions as desired.

82. In an accounting machine, the combination with a totalizer and depressible keys for controlling the entering of items thereon, of devices for latching keys in depressed position, means for releasing the latching devices during an operation of the machine, mechanism for printing the total and either clearing the totalizer or retaining the total thereon, and means controlled by the total printing mechanism for holding the latching devices against movement to prevent depression of keys and for disabling the latching device releasing means.

83. In an accounting machine, the combination with a device for holding an article to be printed upon, of a plurality of sets of type carriers adjustable toward and from each other, and means for causing relative movement between the article holding device and the type carriers whereby to take an impression simultaneously from all the type carriers.

84. In an accounting machine, the combination with a main driving mechanism, of a totalizer, actuators for the totalizer operated upon an operation of the main driving mechanism, indicators, keys operable to predetermine the amount to be entered on the totalizer by said actuators during a subsequent operation of the actuators by the main driving mechanism, and means whereby operation of the keys will differentially adjust the indicators to indicate the amount to be entered on the totalizer.

85. In an accounting machine, the combination with a plurality of totalizers; of mechanism for operating the totalizers to add, read or reset; a plurality of manipulative devices each adjustable to three different positions to control said mechanism; a type carrier common to said manipulative devices; and connections controlled by the manipulative devices for setting said type carrier.

86. In an accounting machine; the combination with a plurality of totalizers; of mechanism for operating the totalizers to add, read or reset; a plurality of manipulative devices each having a normal position and adjustable to two other positions for controlling said mechanism, interlocking mechanism preventing movement of more than one manipulative device away from normal position; a type carrier common to the manipulative devices and having a normal printing position; and connections controlled by the manipulative devices for differentially adjusting the type carrier in either direction from said normal position.

87. In an accounting machine; the combination with a plurality of totalizers; of mechanism for simultaneously operating the totalizers to add or selectively operating them to read or reset; a manipulative device for each totalizer controlling said mechanism; a type carrier common to the manipulative devices and having a normal printing position; and connections controlled by the manipulative devices for differentially adjusting the type carrier in either direction from said normal position.

88. In an accounting machine; the combination with a plurality of totalizers; of mechanism for simultaneously operating the totalizers to add or selectively operating them either to read or reset; a manipulative device for each totalizer, each device having a normal position and adjustable to two other positions to control said mechanism; a type carrier common to the manipulative devices and having a normal position; and means whereby the type carrier may be differentially adjusted in either direction from said normal position by operation of the manipulative devices.

89. In an accounting machine; the combination with a plurality of totalizers; of mechanism for operating the totalizers to add, read or reset; a plurality of levers differentially adjustable to control said mechanism; a type carrier common to said levers; and connections controlled by the levers for setting the type carrier.

90. In an accounting machine; the combination with a plurality of totalizers; of mechanism for operating the totalizers to add, read or reset; a differentially adjustable lever for each totalizer connected to control said mechanism; a type carrier common to said levers; and connections controlled by the levers for setting said type carrier to represent the various positions of the levers.

91. In an accounting machine, the combination with a type carrier consisting of two parallel parts, each part carrying a portion of the type and the two parts being relatively adjustable to position the type on one part in different relationships to the type on the other, and means carried by the two parts for retaining the parts in their adjusted relationships.

92. In an accounting machine, the combination with a main type carrier differentially adjustable to a plurality of printing positions, of an auxiliary type carrier adjustably mounted on the main type carrier and having a plurality of type so spaced apart that only the type in alinement with one of the printing positions of the main type carrier can be printed from, and means for retaining the auxiliary type carrier in adjusted position.

93. In an accounting machine, the combination with a main type carrier differentially adjustable to various printing positions but normally held at one position; of an auxiliary type carrier adjustably mounted on the main type carrier and carrying a plurality of type any one of which may be set at the normal position of the main type carrier by adjustment of the auxiliary type carrier relative to the main type carrier, and means for retaining the auxiliary type carrier in adjusted position.

94. In an accounting machine, the combination with a main type carrier differentially adjustable to various printing positions but normally held at one position; of an auxiliary type carrier adjustably mounted on the main type carrier and carrying a plurality of type any one of which may be set at the normal position of the main type carrier by adjustment of the auxiliary carrier relative to the main carrier; and a pawl carried by the main type carrier and coöperating with the auxiliary type carrier to retain the latter in adjusted position.

In testimony whereof I affix my signature in the presence of two witnesses.

WILLIAM A. CHRYST.

Witnesses:
R. C. GLASS,
CARL W. BEUST.

DISCLAIMER.

1,198,418.—*William A. Chryst*, Dayton, Ohio. CASH REGISTERS. Patent dated September 19, 1916. Disclaimer filed July 19, 1926, by the assignee by mesne assignments, *The National Cash Register Company*.

Hereby enters this disclaimer to that part of the claims in said specification which is in the following words, to wit:

"28. In an accounting machine, the combination with an operating mechanism, of type carriers, a device for holding record material, the said holding device being normally out of printing relation with the type carriers, means for taking an impression upon the record material from the type carriers, and means actuated by the operating mechanism for first positioning the holding device carrying the record material in printing relation with the type carriers and then actuating the impression means.

"50. In an accounting machine, the combination with a plurality of totalizers, of manipulative devices one for each totalizer for controlling the recording on a record strip of the totals shown on said totalizers, and a differentially movable type carrier controlled by said manipulative devices for recording different characters on the record strip thereby identifying the totalizer from which the total is recorded.

"58. In an accounting machine, the combination with a plurality of totalizers, of manipulative devices, one for each totalizer, for controlling the recording on a record strip of the totals shown on said totalizers, a differentially movable type carrier controlled by said manipulative devices for recording different characters on the record strip whereby the totalizer is identified from which the total is recorded, and interlocking mechanism for preventing the operation of more than one of said devices during a total recording operation.

"68. In an accounting machine, the combination with an operating mechanism, of type carriers, a device for holding record material, the said holding device being normally out of operative relation with the type carriers, means for taking an impression upon the record material from the type carriers, means actuated by the operating mechanism for first positioning the holding device carrying the record material in operative relation with the type carriers and then actuating the impression means, and means for alining said type carriers, said alining means being rendered effective by the movement of said impression means.

"72. In an accounting machine, the combination with type carriers, of means for taking an impression therefrom and alining means for said type carriers rendered effective by said impression means."

[*Official Gazette August 17, 1926.*]